US008123616B2

(12) United States Patent
Wells et al.

(10) Patent No.: US 8,123,616 B2
(45) Date of Patent: Feb. 28, 2012

(54) METHODS AND APPARATUS FOR LIMITING ACCESS TO GAMES USING BIOMETRIC DATA

(75) Inventors: William R. Wells, Reno, NV (US); Harold E. Mattice, Gardnerville, NV (US); Chauncey W. Griswold, Reno, NV (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 933 days.

(21) Appl. No.: 10/395,963

(22) Filed: Mar. 25, 2003

(65) Prior Publication Data

US 2004/0192442 A1 Sep. 30, 2004

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. .............. 463/36; 463/25; 463/42; 380/251; 273/292; 382/127; 340/5.52

(58) Field of Classification Search .............. 463/12–13, 463/16–19, 25, 40–42; 273/292–293, 236–237, 273/143 R See application file for complete search history.

(56) References Cited

U.S. PATENT DOCUMENTS

| | | | | |
|---|---|---|---|---|
| 4,467,424 | A | 8/1984 | Hedges et al. | |
| 4,481,670 | A | 11/1984 | Freeburg | |
| 4,575,622 | A | 3/1986 | Pellegrini | |
| 5,056,141 | A | 10/1991 | Dyke | 340/5.27 |
| 5,128,980 | A | 7/1992 | Choi | |
| 5,153,918 | A | 10/1992 | Tuai | |
| 5,192,076 | A | 3/1993 | Komori | |
| 5,229,764 | A * | 7/1993 | Matchett et al. | 340/5.52 |
| 5,265,864 | A | 11/1993 | Roux et al. | |
| 5,265,874 | A | 11/1993 | Dickinson et al. | 273/138 A |
| 5,280,527 | A | 1/1994 | Gullman et al. | |
| 5,287,269 | A | 2/1994 | Dorrough et al. | |
| 5,326,104 | A | 7/1994 | Pease et al. | 273/138 A |
| 5,429,361 | A | 7/1995 | Raven et al. | |
| 5,459,458 | A | 10/1995 | Richardson et al. | |
| 5,473,671 | A | 12/1995 | Partridge | |
| 5,475,738 | A | 12/1995 | Penzias | |
| 5,505,449 | A | 4/1996 | Eberhardt et al. | 273/138 A |

(Continued)

FOREIGN PATENT DOCUMENTS

DE 19922862 * 12/2000

(Continued)

OTHER PUBLICATIONS

The Gaming Table by Fast Company.com, Issue 18, 2 pages, dated Sep. 1998.*

(Continued)

*Primary Examiner* — Paul A. D'Agostino
(74) *Attorney, Agent, or Firm* — Weaver Austin Villeneuve & Sampson LLP

(57) ABSTRACT

In a method of facilitating the playing of a game via a gaming apparatus, a wager may be received via a value input device. Biometric data associated with a game play selection of a game may be received, and whether to permit the game play selection may be determined based on the received biometric data. A video image relating to the game may be displayed on a display unit, and a value payout associated with an outcome of the game may be determined.

34 Claims, 28 Drawing Sheets

U.S. PATENT DOCUMENTS

| | | | | | |
|---|---|---|---|---|---|
| 5,509,053 | A | | 4/1996 | Gowda et al. | |
| 5,586,936 | A | | 12/1996 | Bennett et al. | |
| 5,618,232 | A | * | 4/1997 | Martin | 463/25 |
| 5,667,440 | A | | 9/1997 | Sasaki et al. | |
| 5,736,727 | A | | 4/1998 | Nakata et al. | |
| 5,742,905 | A | | 4/1998 | Pepe et al. | |
| 5,755,621 | A | | 5/1998 | Marks et al. | |
| 5,761,647 | A | | 6/1998 | Boushy | |
| 5,762,552 | A | * | 6/1998 | Vuong et al. | 463/25 |
| 5,764,789 | A | | 6/1998 | Pare, Jr. et al. | 382/115 |
| 5,766,076 | A | | 6/1998 | Pease et al. | 463/27 |
| 5,768,382 | A | | 6/1998 | Schneier et al. | 380/23 |
| 5,770,533 | A | | 6/1998 | Franchi | |
| 5,795,228 | A | | 8/1998 | Trumbull et al. | |
| 5,800,268 | A | | 9/1998 | Molnick | |
| 5,828,843 | A | | 10/1998 | Grimm et al. | |
| 5,833,536 | A | | 11/1998 | Davids et al. | 463/11 |
| 5,851,148 | A | | 12/1998 | Brune et al. | 463/25 |
| 5,851,149 | A | | 12/1998 | Xidos et al. | |
| 5,865,470 | A | | 2/1999 | Thompson | |
| 5,869,822 | A | | 2/1999 | Meadows, II et al. | |
| 5,871,398 | A | | 2/1999 | Schneier et al. | 463/16 |
| 5,878,211 | A | | 3/1999 | Delagrange | 713/200 |
| 5,879,453 | A | | 3/1999 | Streeter et al. | |
| 5,889,474 | A | * | 3/1999 | LaDue | 340/825.49 |
| 5,902,983 | A | | 5/1999 | Crevelt et al. | 235/380 |
| 5,903,881 | A | | 5/1999 | Schrader et al. | |
| 5,920,640 | A | * | 7/1999 | Salatino et al. | 382/124 |
| 5,951,397 | A | | 9/1999 | Dickinson | 463/36 |
| 5,954,583 | A | | 9/1999 | Green | 463/29 |
| 5,970,143 | A | | 10/1999 | Schneier et al. | 380/23 |
| 5,987,376 | A | | 11/1999 | Olson et al. | |
| 5,987,611 | A | | 11/1999 | Freund | |
| 5,991,431 | A | * | 11/1999 | Borza et al. | 382/127 |
| 5,995,630 | A | | 11/1999 | Borza | 380/54 |
| 5,999,808 | A | | 12/1999 | LaDue | |
| 6,001,016 | A | * | 12/1999 | Walker et al. | 463/42 |
| 6,003,013 | A | | 12/1999 | Boushy et al. | |
| 6,003,014 | A | | 12/1999 | Lee et al. | |
| 6,010,404 | A | | 1/2000 | Walker et al. | |
| 6,012,636 | A | * | 1/2000 | Smith | 235/380 |
| 6,023,688 | A | | 2/2000 | Ramachandran et al. | |
| 6,027,115 | A | | 2/2000 | Griswold et al. | 273/143 R |
| 6,039,648 | A | | 3/2000 | Guinn et al. | |
| 6,048,269 | A | | 4/2000 | Burns et al. | 463/25 |
| 6,098,985 | A | * | 8/2000 | Moody | 273/292 |
| 6,099,408 | A | | 8/2000 | Schneier et al. | 463/29 |
| 6,104,815 | A | * | 8/2000 | Alcorn et al. | 380/251 |
| 6,117,011 | A | | 9/2000 | Lvov | |
| 6,128,660 | A | | 10/2000 | Grimm et al. | |
| 6,135,884 | A | | 10/2000 | Hedrick et al. | 463/20 |
| 6,142,876 | A | | 11/2000 | Cumbers | |
| 6,148,094 | A | | 11/2000 | Kinsella | 382/124 |
| 6,149,062 | A | | 11/2000 | Danielson et al. | |
| 6,152,824 | A | | 11/2000 | Rothschild et al. | |
| 6,157,966 | A | | 12/2000 | Montgomery et al. | |
| 6,178,255 | B1 | | 1/2001 | Scott et al. | 382/124 |
| 6,178,510 | B1 | * | 1/2001 | O'Connor et al. | 726/5 |
| 6,183,366 | B1 | | 2/2001 | Goldberg et al. | |
| 6,190,257 | B1 | | 2/2001 | Takeda et al. | |
| 6,193,153 | B1 | * | 2/2001 | Lambert | 235/380 |
| 6,196,920 | B1 | * | 3/2001 | Spaur et al. | 463/42 |
| 6,213,403 | B1 | | 4/2001 | Bates | |
| 6,219,439 | B1 | * | 4/2001 | Burger | 382/115 |
| 6,234,900 | B1 | | 5/2001 | Cumbers | |
| 6,244,957 | B1 | | 6/2001 | Walker et al. | |
| 6,264,557 | B1 | | 7/2001 | Schneier et al. | |
| 6,264,560 | B1 | | 7/2001 | Goldberg et al. | |
| 6,280,325 | B1 | | 8/2001 | Fisk | |
| 6,307,956 | B1 | | 10/2001 | Black | |
| 6,325,285 | B1 | * | 12/2001 | Baratelli | 235/380 |
| 6,325,292 | B1 | | 12/2001 | Sehr | 235/492 |
| 6,327,376 | B1 | | 12/2001 | Harkin | |
| 6,332,193 | B1 | | 12/2001 | Glass et al. | |
| 6,363,485 | B1 | | 3/2002 | Adams et al. | |
| 6,409,602 | B1 | | 6/2002 | Wiltshire et al. | |
| 6,425,828 | B2 | | 7/2002 | Walker et al. | |
| 6,508,709 | B1 | | 1/2003 | Karmarkar | 463/42 |
| 6,508,710 | B1 | * | 1/2003 | Paravia et al. | 463/42 |
| 6,527,638 | B1 | | 3/2003 | Walker et al. | |
| 6,554,705 | B1 | | 4/2003 | Cumbers | |
| 6,604,085 | B1 | | 8/2003 | Kolls | |
| 6,612,928 | B1 | | 9/2003 | Bradford et al. | |
| 6,636,620 | B1 | | 10/2003 | Hoshino | |
| 6,676,522 | B2 | | 1/2004 | Rowe et al. | |
| 6,709,333 | B1 | | 3/2004 | Bradford et al. | |
| 6,766,946 | B2 | | 7/2004 | Iida et al. | |
| 6,846,238 | B2 | | 1/2005 | Wells | |
| 6,950,940 | B2 | | 9/2005 | Wheeler et al. | |
| 6,979,264 | B2 | | 12/2005 | Chatigny et al. | |
| 6,980,670 | B1 | | 12/2005 | Hoffman et al. | |
| 6,984,175 | B2 | | 1/2006 | Nguyen et al. | |
| 7,107,245 | B1 | | 9/2006 | Kowalick | |
| 7,125,335 | B2 | | 10/2006 | Rowe | |
| 7,169,050 | B1 | | 1/2007 | Tyler | |
| 7,260,834 | B1 | | 8/2007 | Carlson | |
| 7,285,048 | B2 | | 10/2007 | Karmarkar | |
| 7,303,473 | B2 | | 12/2007 | Rowe | |
| 7,506,172 | B2 | | 3/2009 | Bhakta | |
| 7,606,560 | B2 | | 10/2009 | Labrou et al. | |
| 7,637,810 | B2 | | 12/2009 | Amaitis et al. | |
| 7,644,861 | B2 | | 1/2010 | Alderucci et al. | |
| 7,690,043 | B2 | | 3/2010 | Saunders | |
| 7,702,807 | B2 | | 4/2010 | Morita | |
| 7,828,652 | B2 | | 11/2010 | Nguyen et al. | |
| 7,867,083 | B2 | | 1/2011 | Wells et al. | |
| 2001/0011680 | A1 | | 8/2001 | Soltesz et al. | |
| 2001/0018660 | A1 | | 8/2001 | Sehr | |
| 2001/0026632 | A1 | * | 10/2001 | Tamai | 382/116 |
| 2002/0034975 | A1 | | 3/2002 | Walker et al. | |
| 2002/0047905 | A1 | | 4/2002 | Kinjo | |
| 2002/0082084 | A1 | | 6/2002 | Snow et al. | |
| 2002/0111213 | A1 | | 8/2002 | McEntee et al. | |
| 2002/0132663 | A1 | | 9/2002 | Cumbers | |
| 2002/0142844 | A1 | | 10/2002 | Kerr | |
| 2002/0143991 | A1 | | 10/2002 | Chow et al. | |
| 2002/0147047 | A1 | | 10/2002 | Letovsky et al. | |
| 2002/0151363 | A1 | | 10/2002 | Letovsky et al. | |
| 2002/0155887 | A1 | | 10/2002 | Criss-Puszkiewicz et al. | |
| 2002/0160834 | A1 | | 10/2002 | Urie et al. | |
| 2002/0169021 | A1 | | 11/2002 | Urie et al. | |
| 2002/0184500 | A1 | | 12/2002 | Maritzen et al. | |
| 2003/0006931 | A1 | | 1/2003 | Mages | |
| 2003/0017871 | A1 | | 1/2003 | Urie et al. | 463/29 |
| 2003/0031321 | A1 | * | 2/2003 | Mages | 380/270 |
| 2003/0032486 | A1 | | 2/2003 | Elliott | |
| 2003/0045353 | A1 | | 3/2003 | Paulsen et al. | |
| 2003/0054878 | A1 | | 3/2003 | Benoy et al. | |
| 2003/0070100 | A1 | | 4/2003 | Winkler | |
| 2003/0092489 | A1 | | 5/2003 | Veradej | |
| 2003/0100372 | A1 | | 5/2003 | Gatto et al. | |
| 2003/0108227 | A1 | | 6/2003 | Philomin et al. | |
| 2003/0131265 | A1 | | 7/2003 | Bhakta | |
| 2003/0139190 | A1 | | 7/2003 | Steelberg et al. | |
| 2003/0162594 | A1 | | 8/2003 | Rowe | |
| 2003/0228898 | A1 | | 12/2003 | Rowe | |
| 2004/0035926 | A1 | | 2/2004 | Orus et al. | |
| 2004/0053692 | A1 | | 3/2004 | Chatigny | |
| 2004/0063498 | A1 | | 4/2004 | Oakes et al. | |
| 2004/0192438 | A1 | | 9/2004 | Wells et al. | |
| 2004/0192442 | A1 | | 9/2004 | Wells et al. | |
| 2005/0005127 | A1 | | 1/2005 | Rowe et al. | |
| 2005/0043096 | A1 | | 2/2005 | Kerr | |
| 2005/0130728 | A1 | | 6/2005 | Nguyen et al. | |
| 2005/0181870 | A1 | | 8/2005 | Nguyen et al. | |
| 2005/0197190 | A1 | | 9/2005 | Amaitis et al. | |
| 2005/0233811 | A1 | | 10/2005 | Gatto et al. | |
| 2006/0095790 | A1 | | 5/2006 | Nguyen et al. | |
| 2006/0100012 | A1 | | 5/2006 | Chatigny | |
| 2006/0205497 | A1 | | 9/2006 | Wells | |
| 2006/0224890 | A1 | | 10/2006 | Zhou et al. | |
| 2007/0050213 | A1 | | 3/2007 | Matsushima et al. | |
| 2008/0214261 | A1 | | 9/2008 | Alderucci | |

FOREIGN PATENT DOCUMENTS

| | | | |
|---|---|---|---|
| DE | 199 44 140 | A1 | 3/2001 |
| DE | 199 52 691 | A1 | 5/2001 |

| | | | | |
|---|---|---|---|---|
| DE | 199 52 692 | A1 | | 5/2001 |
| DE | 100 60 079 | A1 | | 6/2002 |
| EP | 1045346 | | * | 10/2000 |
| EP | 1 063 622 | A2 | | 12/2000 |
| EP | 1120757 | | | 1/2001 |
| EP | 1 231 577 | A2 | | 8/2002 |
| EP | 1 606 777 | | | 12/2005 |
| JP | 2001/212363 | | | 8/2001 |
| RU | 2102790 | | | 1/1998 |
| RU | 2124753 | | | 1/1999 |
| RU | 2147847 | | | 4/2000 |
| RU | 2186584 | | | 8/2002 |
| RU | 2190477 | | | 10/2002 |
| RU | 2195699 (C2) | | | 12/2002 |
| WO | WO93/10508 | | * | 5/1993 |
| WO | WO-94/10658 | | | 5/1994 |
| WO | WO-94/16416 | | | 7/1994 |
| WO | WO 99/19027 | | | 4/1999 |
| WO | WO 99/52077 | | | 10/1999 |
| WO | WO-01/54091 | A2 | | 7/2001 |
| WO | WO-01/82176 | A1 | | 11/2001 |
| WO | WO-02/37246 | A2 | | 5/2002 |
| WO | WO-02/47042 | A1 | | 6/2002 |
| WO | WO 2003/005743 | | | 1/2003 |
| WO | WO 03/015299 | | | 2/2003 |
| WO | WO-03/021543 | A2 | | 3/2003 |
| WO | WO 03/032551 | | | 4/2003 |
| WO | WO 03/042830 | | | 5/2003 |
| WO | WO 03/045518 | | | 6/2003 |
| WO | WO 2004/025397 | | | 3/2004 |
| WO | WO 2004/056432 | | | 7/2004 |
| WO | WO 2004/095383 | | | 11/2004 |
| WO | WO 2004/095384 | | | 11/2004 |
| WO | WO 2005/083646 | | | 9/2005 |

OTHER PUBLICATIONS

Golden Palace Online Casino at goldenpalace.com, 15 pages, downloaded Dec. 2, 1999.*

The Online Gambling Guide to Gaming Sites by Gamingsites.com with links to StarLuck Casino, PlanetLuck Casino, 21 Casino, BoDog Sportsbook and Lasseters Casino, 7 pages, dated 2001 (states Guide is 2001 directory).*

StarLuck Casino as accessed from Online Gambling Guide link, found at StarLuckCasino.com, 8 pages, downloaded Mar. 10, 2007, but listed as link on/within online Gambling Guide directory of 2001.*

PlanetLuck Casino as accessed from Online Gambling Guide link, found at planetluck.com, 6 pages, downloaded Mar. 10, 2007, but listed as link on/within Online Gambling Guide directory of 2001.*

21 Casino as accessed from Online Gambling Guide link, found at 21casino.com, 6 pages, downloaded Mar. 10, 2007, but listed as link on/within Online Gambling Guide directory of 2001.*

BoDog Sportsbook as accessed from Online Gambling Guide link, found at bodog.com, 1 page, downloaded Mar. 10, 2007, but listed as link on/within Online Gambling Guide directory of 2001.*

Lasseters Online Casino as accessed from Online Gambling Guide link, found at lasseters.com, 26 pages, downloaded Mar. 12, 2007, bit listed as link on/within Online Gambling Guide directory of 2001.*

International Search Report for PCT/US2004/007423.

Written Opinion of the International Searching Authority (PCT Rule 43 bis.1) for PCT/US2004/007423.

International Search Report for PCT/US2004/007844.

Written Opinion of the International Searching Authority (PCT Rule 43 bis.1) for PCT/US2004/007844.

European Patent Office official office action dated Nov. 9, 2006 in European Patent Application No. 04 719 756.1.

U.S. Appl. No. 09/491,899, filed Jan. 27, 2000, Wells et al.

European Patent Office examination report dated Jul. 12, 2006 in application No. EPO 04 720 816.0.

English Translation of portions of DE 199 44 140.

European Patent Office examination report dated Apr. 10, 2006 in application No. EPO 04 719 756.1.

US Office Action dated Jan. 9, 2007 issued in U.S. Appl. No. 10/395,988.

US Office Action dated Aug. 15, 2007 issued in U.S. Appl. No. 10/395,988.

US Office Action dated Mar. 26, 2008 issued in U.S. Appl. No. 10/395,988.

Australian Office Action dated May 4, 2007 issued in 2004232143.

Australian Office Action dated Oct 16, 2007 issued in 2004232143.

Australian Office Action dated May. 7, 2007 issued in 20044232158.

Australian Office Action dated Aug. 20, 2007 issued in 2004232158.

European Office Action dated Nov. 9, 2006 issued in EP 04 719 756.1.

European Office Action dated Jul. 9, 2007 issued in EP 04 719 756.1.

Russian Office Action dated Oct. 18, 2007 issued in RU 2005132832.

Russian Office Action dated Mar. 12, 2008 issued in RU 2005132833.

Australian Office Action dated May 12, 2008 issued in 2004232143.

US Office Action dated Aug. 3, 2007 issued in U.S. Appl. No. 10/708,168.

US Office Action (Examiner Interview Summary) dated Sep. 24, 2007 issued in U.S. Appl. No. 10/708,168.

US Final Office Action dated Jan. 16, 2008 issued in U.S. Appl. No. 10/708,168.

US Office Action dated Jul. 9, 2008 issued in U.S. Appl. No. 10/708,168.

US Final Office Action dated Jan. 30, 2009 issued in U.S. Appl. No. 10/708,168.

US Final Office Action dated Oct. 27, 2009 issued in U.S. Appl. No. 10/708,168.

US Office Action (Examiner Interview Summary) dated Mar. 30, 2010 issued in U.S. Appl. No. 10/708,168.

US Office Action (Examiner Interview Summary) dated Apr. 12, 2010 issued in U.S. Appl. No. 10/708,168.

US Notice of Allowance and (Examiner-Initiated Interview Summary) dated Apr. 16, 2010 issued in U.S. Appl. No. 10/708,168.

US Notice of Allowance dated Aug. 4, 2010 issued in U.S. Appl. No. 10/708,168.

US Advisory Action dated Jul. 2, 2009 issued in U.S. Appl. No. 10/395,988.

US Office Action dated Aug. 13, 2009 issued in U.S. Appl. No. 10/395,988.

US Notice of Allowance dated Jan. 29, 2010 issued in U.S. Appl. No. 10/395,988.

US Office Action (Miscellaneous Communication) dated Mar. 29, 2010 issued in U.S. Appl. No. 10/395,988.

US Office Action dated Apr. 28, 2010 issued in U.S. Appl. No. 10/395,988.

US Notice of Allowance dated Sep. 20, 2010 issued in U.S. Appl. No. 10/395,988.

PCT International Preliminary Report on Patentability and Written Opinion dated Aug. 14, 2006 issued in PCT/US2005/002621 (WO 2005/083646).

PCT International Search Report dated Jun. 6, 2005 issued in PCT/US2005/002621 (WO 2005/083646).

Chinese Office Action dated Jun. 27, 2008 issued in CN 200580004417.4.

Chinese Office Action (Notification of the Office Rejection) dated Oct. 16, 2009 issued in CN200580004417.4.

Chinese Second Office Action dated Jun. 24, 2011 issued in CN200580004417.4.

European Examination Report dated Feb. 1, 2007 issued in EP 05 712 173.3.

European Examination Report dated May 29, 2008 issued in EP 05 712 173.3.

Mexican Office Action (description) dated May 8, 2009 issued in MX 06/09088.

Russian Office Action dated Feb. 14, 2007 issued in 2006133042.

PCT International Preliminary Report on Patentability and Written Opinion dated Oct. 1, 2005 issued in PCT/US2004/007423 (WO 2004/095383).

AU Notice of Opposition dated Oct. 31, 2008 issued in 2004232143.

AU Opposition Statement of Grounds and Particulars in Support of Notice of Opposition (Aristocrat Technologies Australia Pty Limited) dated Jan. 23, 2009 issued in AU2004232143.

AU Acknowledgement re Notice of Opposition Withdrawn dated Aug. 18, 2009 issued in AU2004232143.

CA Office Action dated Mar. 8, 2011 issued in CA 2,518,083.
European Result of Consultation dated May 16, 2008 issued in EP 04 719 756.1.
Russian Decision to Grant a Patent for Invention dated Jul. 28, 2008 issued in RU 2005132833.
PCT International Preliminary Report on Patentability and Written Opinion dated Oct. 1, 2005 issued in PCT/US2004/007844 (WO 2004/095384).
CA Office Action dated Mar. 8, 2011 issued in CA 2,518,770.
Russian Decision to Grant a Patent dated Apr. 22, 2008 issued in RU 2005132832.
US Office Action dated Mar. 9, 2009 for U.S. Appl. No. 10/395,988.
US Office Action dated Oct. 15, 2008 for U.S. Appl. No. 10/395,988.

* cited by examiner

FIG. 21
900
WELCOME TO GAMING CENTRAL
PLEASE LOGON
902
FIRST NAME
916
SUBMIT

METHODS AND APPARATUS FOR LIMITING ACCESS TO GAMES USING BIOMETRIC DATA

CROSS REFERENCES TO RELATED APPLICATIONS

This application is related to commonly owned U.S. patent application Ser. No. 10/395,988, filed Mar. 25, 2003, entitled "Methods and Apparatus for Limiting Access to Games Using Biometric Data," which is hereby incorporated by reference herein in its entirety for all purposes.

BACKGROUND

This disclosure is generally related to gaming systems, and more particularly to gaming systems that employ biometric data to limit access to games.

U.S. Pat. No. 5,265,864 to Dickinson et al. describes a cashless gaming system suitable for casinos. A player hands over money and an ID card to a clerk at a validation terminal. The clerk stores the ID number and the amount of money in the memory of the validation terminal. Then the clerk returns the ID card to the player for operating any one of a number of game terminals. The player then selects a game terminal which reads the player's ID card, whereupon the cash amount from the validation terminal is downloaded to the selected game terminal and the game terminal can then be played. When the player wishes to stop play of the game terminal completely, the player actuates a cashout switch of the game terminal. Then, the player presents the ID card to the clerk at the validation terminal and the validation terminal reads the ID card. A ticket showing the card number and the cash amount is printed and the player is paid the cash amount on the spot. The printed ticket may be used for reconciliation.

Various network gaming systems have been previously described. For example, U.S. Pat. No. 6,280,325 to Fisk discloses a computer network which manages multiple simultaneous bingo games having a potentially large number of bingo cards. The computers simultaneously and in parallel compare called bingo numbers to bingo cards stored in each respective computer and also double-verify winning cards. Called numbers may be applicable to one, many, or all of the simultaneous bingo games, and the games may have different times or different rules. Bingo cards are distributed in the network in accordance with number of hits needed by the cards: "one-away" computers handle bingo cards needing one more hit; "two-away" computers handle cards needing two hits. The computers in the network also generate statistics on the progress of bingo cards toward winning patterns. The winning pattern for any game can be changed in real-time, as desired to continue interest in the game.

U.S. Pat. No. 6,264,560 to Goldberg, et al. discloses a game playing method and apparatus for automating games such as blackjack, poker, craps, roulette, baccarat and pai gow, wherein players may play continuously and asynchronously, and information related to advertised items can be exchanged between players and advertisers. In one embodiment, each instance of a game is likely unique from all other current game instances. The games do not require a manual dealer and in one embodiment, played in a gaming establishment using low cost gaming stations. The system may also be used to play such games on the Internet or an interactive cable television network wherein a game controller communicates with players at network nodes in their homes and at their leisure.

U.S. Pat. No. 6,183,366 to Goldberg, et al. discloses an information service and advertising providing system for presenting interactive information services together with interactive advertising on a communications network such as the Internet and LANs. The information service may be a game played interactively on the network while advertising is communicated between users and an advertising network node. Users may also be provided with various games and/or game tournaments via interactive network communications. Users may respond to advertising while being entertained (e.g., via games), or while interacting with another network service.

SUMMARY OF THE DISCLOSURE

In one embodiment, a gaming apparatus is provided. The gaming apparatus may comprise a display unit, and an input device to allow a player to make an input selection. The gaming apparatus may also comprise a controller operatively coupled to the display unit, the input device, and a biometric device, the controller comprising a processor and a memory operatively coupled to the processor. The controller may be programmed to allow the player to play a game, and to permit the player to make a wager. The controller also may be programmed to receive biometric data associated with a game play selection of the player, and to determine whether to permit the game play selection based on the received biometric data. The controller additionally be programmed to cause a video image relating to the game to be generated on the display unit, and to determine a value payout associated with an outcome of the game.

In another embodiment, a method of facilitating the playing of a game via a gaming apparatus is provided. The method may include receiving a wager via a value input device. The method also may include receiving biometric data associated with a game play selection of a game, and determining whether to permit the game play selection based on the received biometric data. The method additionally may include displaying a video image relating to the game on a display unit, and determining a value payout associated with an outcome of the game.

In yet another embodiment, a tangible medium storing machine readable instructions is provided. The tangible medium may comprise first code for receiving a wager via a value input device. The tangible medium additionally may comprise second code for receiving biometric data associated with a game play selection of a game, and third code for determining whether to permit the game play selection based on the received biometric data. The tangible medium also may comprise fourth code four displaying a video image relating to the game on a display unit, and fifth code for determining a value payout associated with an outcome of the game.

Additional aspects of the invention are defined by the claims at the end of this patent.

BRIEF DESCRIPTION OF THE DRAWINGS

Various embodiments of the invention are described in connection with the drawings, a brief description of which is provided below.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Gaming System

Figure 1:
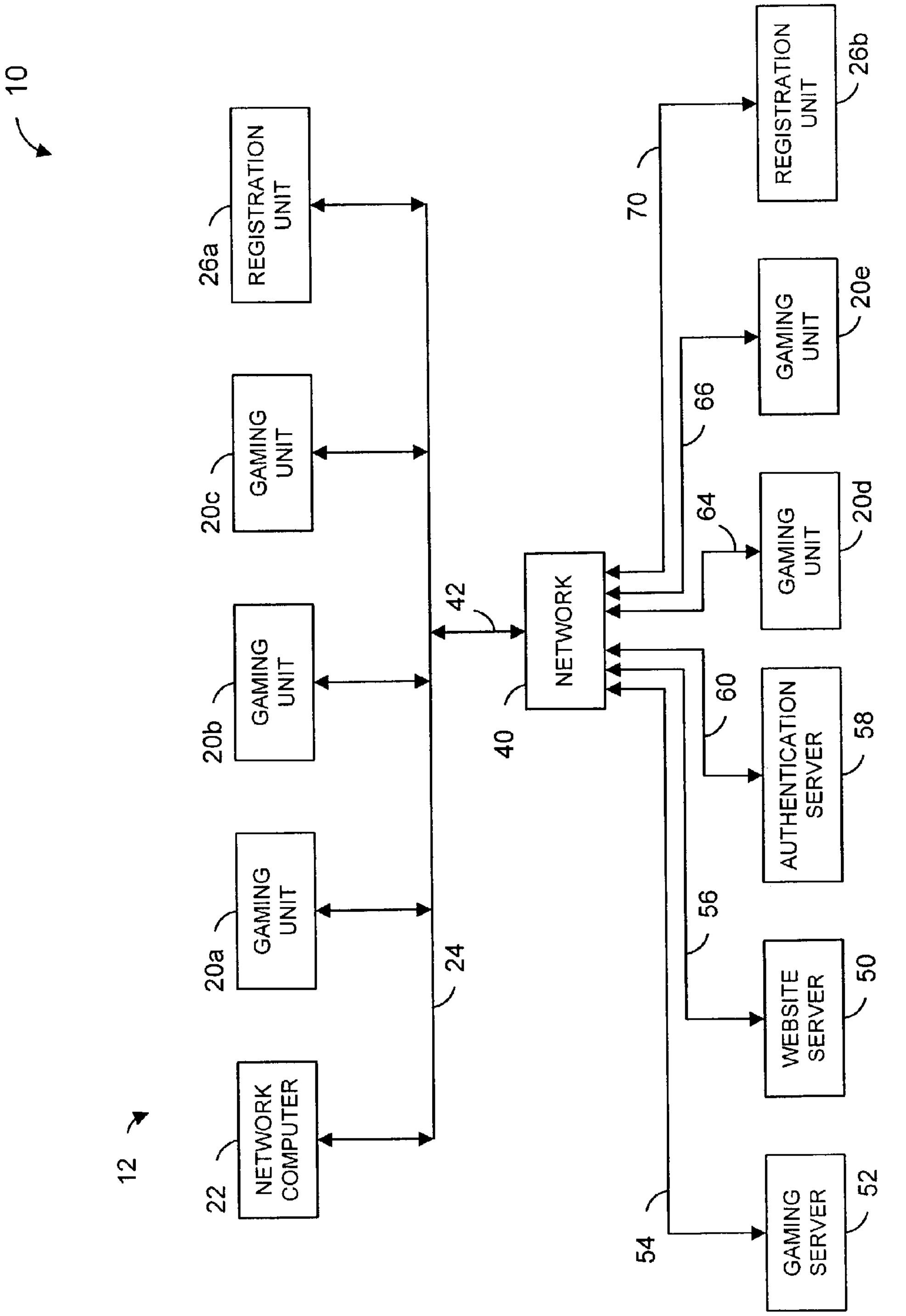
FIG. 1 is a block diagram of an example gaming system.

FIG. 1 illustrates one possible embodiment of a gaming system 10 in accordance with the invention. Referring to FIG. 1, the gaming system 10 may include a group or network 12 of gaming units 20*a*, 20*b*, 20*c* operatively coupled to a network computer 22 via a network data link or bus 24. Network 12 may also include a registration unit 26*a* operatively coupled to the network computer 22 and to the gaming units 20*a*, 20*b*, 20*c* via network the data link 24. Network 12 may be operatively coupled to a network 40 via a network link 42. The network 12 may comprise, for example, a area network (WAN), a local area network (LAN), a wireless LAN (e.g., the IEEE 802.11x standards), links according to the BLUETOOTH™ standard, cellular links, two-way paging links, etc. The network 40 may comprise, for example, the Internet, a WAN, an intranet, an extranet, a LAN, a wireless LAN (e.g., the IEEE 802.11x standards), links according to the BLUETOOTH™ standard, cellular links, two-way paging links, etc.

The gaming system 10 may also include a website server 50 and one or more gaming servers 52 operatively coupled to the network 40 via the data links 54 and 56, respectively. The gaming system 10 additionally includes an authentication server 58 operatively coupled to the network 40 via the data link 60. The gaming system 10 may further include gaming units 20*d* and 20*e* operatively coupled to the network 40 via the data links 64 and 66, and to a registration unit 26*b* via the data link 70. The network 40 may include a plurality of network computers or server computers (not shown), each of which may be operatively interconnected. Where the network 40 comprises the Internet, data communication may take place over any of the data links 42, 54, 56, 60, 64, 66, and 70 via an Internet communication protocol.

The network computer 22, the gaming units 20, the registration units 26, the gaming server 52, the website server 50, and the authentication server 58 may be located in a same physical location, or in different, remote locations, such as different buildings, cities, or states. For example, network 12 may be located in a casino or hotel, and the website server may be located at a web hosting company. Continuing with this example, the gaming server 52 and the authentication server 58 may be located at a gaming company, and the gaming units 20*d* and 20*e* may be located in different households. Further, the registration unit 26*b* may be located at a notary public's office.

Although FIG. 1 illustrates that the gaming system 10 comprises particular numbers of gaming units 20, registration units 26, gaming servers 52, etc., for sake of simplicity, it should be understood that different numbers of these components could be used. For instance, although FIG. 1 illustrates five gaming units 20, the gaming system 10 may include many more gaming units 20, such as hundreds or thousands. As another example, although FIG. 1 illustrates one gaming server 52, the gaming system 10 may include a plurality of gaming servers.

Each of the registration units 26 may include, or be operatively coupled with, a device for obtaining biometric data from a person, where the biometric data may be used to uniquely identify that person. For instance, the registration units 26 may include a finger print scanning device, an eye scanning device, a facial recognition system, a voice analyzer, etc. In some embodiments, the registration units 26 are located in controlled environments such that it can be assured (with some level of certainty) that the persons from whom biometric data are obtained are actually the persons they claim to be. For example, a registration unit 26 or 28 could be located in a casino and be operable only by an employee of the casino.

Each of the gaming units 20 may also include, or be operatively coupled with, a device for obtaining biometric data from a person. This device should correspond to the biometric devices used by the registration units 26. For example, if the registration units 26 include, or are operatively coupled with, finger print scanning devices, at least some of the gaming units 20 should include, or be operatively coupled with, finger print scanning devices.

Further, each of the gaming units 20 may also include, or be operatively coupled with, a position sensor for obtaining a geographic position of the gaming unit. For example, the gaming units 20 may include a wide area location system such as a global positioning system (GPS) device, a Loran-C device, etc. The gaming units 20 also may include a local area positioning system such as an in-building location system.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc.

Although network 12 is shown to include one network computer 22 and four gaming units 20, it should be understood that different numbers of computers and gaming units may be utilized. For example, the network 12 may include a plurality of network computers 22 and tens or hundreds of gaming units 20, all of which may be interconnected via the data link 24.

Each of the data links 24, 42, 54, 56, 60, 64, 66, and 70 may comprise a dedicated hardwired link, a wireless link, intermediate computers (e.g., servers, gateways, network bridges, wireless access points, cellular/pager base stations, etc.), etc.

It is to be understood that the gaming system 10 need not include all the components illustrated in FIG. 1. Examples of gaming systems 10 that include subsets of the components illustrated in FIG. 1 are described below.

In-Room Gaming

In one scenario, the gaming system 10 may include the network 12 (e.g., the network computer 22, the gaming units 20*a*, 20*b*, and 20*c*, and the registration unit 26*a*, coupled with the network data link 24). As an example, the gaming units 20*a*, 20*b*, and 20*c* may be located in different hotel rooms of a casino, the registration unit 26*a* located at the hotel's reception, and the network computer 22 located in a secure location of the hotel. In another scenario, the gaming system 10 may also include the authentication server 58 coupled to the network 12 via the network 40 and the data link 42. These particular gaming systems can be used for "in-room gaming" in which a user can play wagering games via a gaming unit in the privacy of his or her own hotel room.

Internet Gaming In yet another scenario, the gaming system 10 may include the website server 50, the gaming server 52, the gaming units 20*d* and 20*e*, and the registration unit 26*b*, coupled together via the network 40. As an example, the gaming units 20*d* and 20*e* could be personal computers located in different residences, and the registration unit 26*b* may be located in a casino. Additionally, the website server 50 may be located at a company that operates a website, and the gaming server 52 may be located at a casino. These components may be operatively coupled together via the network 40, which includes the Internet. In another example, the gaming system may additionally include the authentication server 58 operatively coupled to the network 40. These particular gaming system can be used for "internet gaming" in which a user can play wagering games via a personal computer in the privacy of his or her own residence.

Overall Operation

Figure 2:
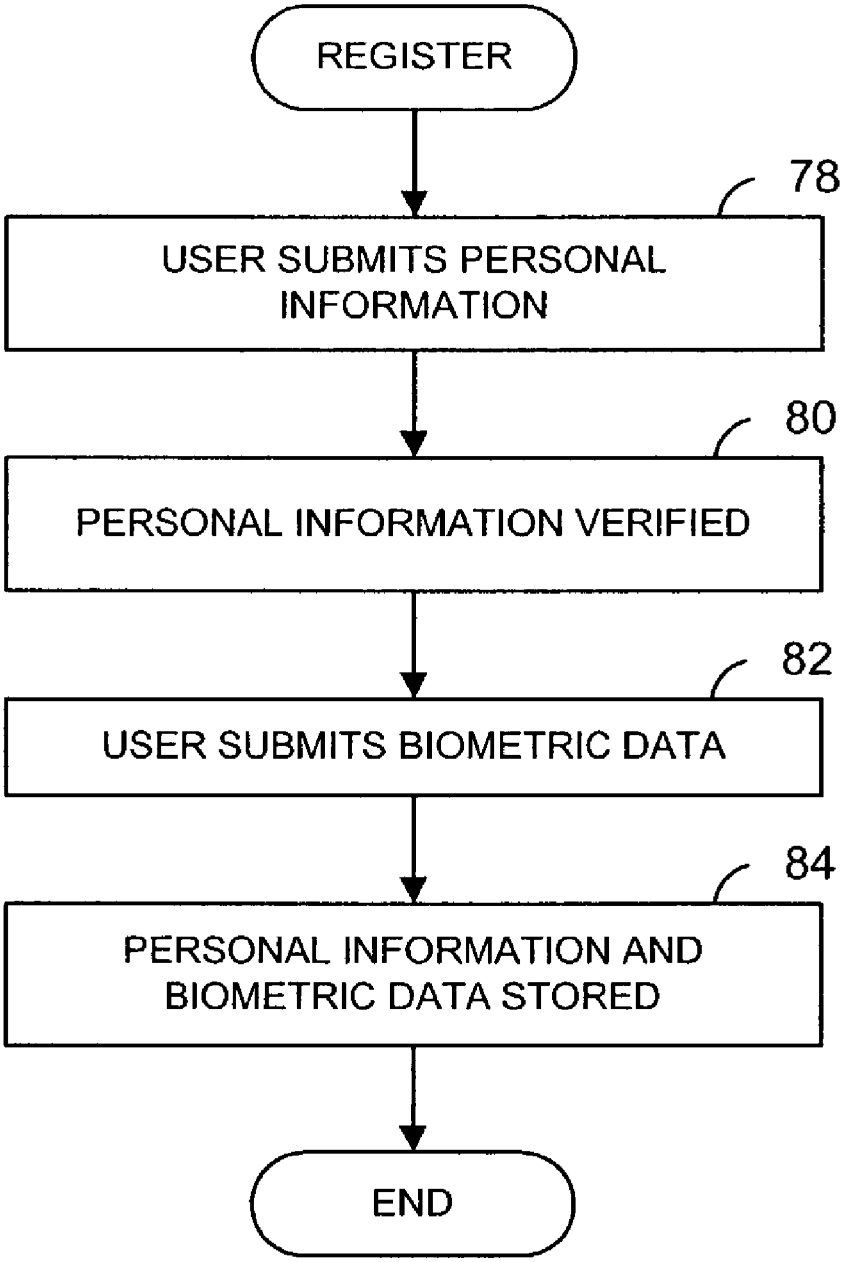
FIG. 2 is a flowchart of an example routine for registering a person to play games via the gaming system.

During operation, a user could utilize one of the registration units 26 to register with a gaming service. The gaming service could facilitate playing various wagering games such as poker, blackjack, slots, bingo, keno, etc., via the gaming units 20. FIG. 2 is a simplified flow diagram of one possible embodiment of a method of registering with a gaming service. At block 78, a user may submit personal information such as name, date of birth, etc. At block 80, at least some of the personal information may be verified. For example, if the registration unit 26 is located in a casino, an employee of the casino could verify the personal information by examining a driver's license, identity card, passport, etc. of the user.

At block 82, the user may submit biometric data via the registration unit 26. For example, if the registration unit 26 is coupled with a finger print scanning device, the finger print scanning device may scan the user's fingerprint and generate digital data representing the fingerprint. At block 84, the personal information submitted at block 78 and the biometric data submitted at block 82 are stored. This information may be stored, for example, in a smart card, a memory, a database, etc. In gaming systems that include an authentication server 58, the authentication server 58 may be configured to receive and store personal information and biometric data received from the registration units 26.

Figure 3:
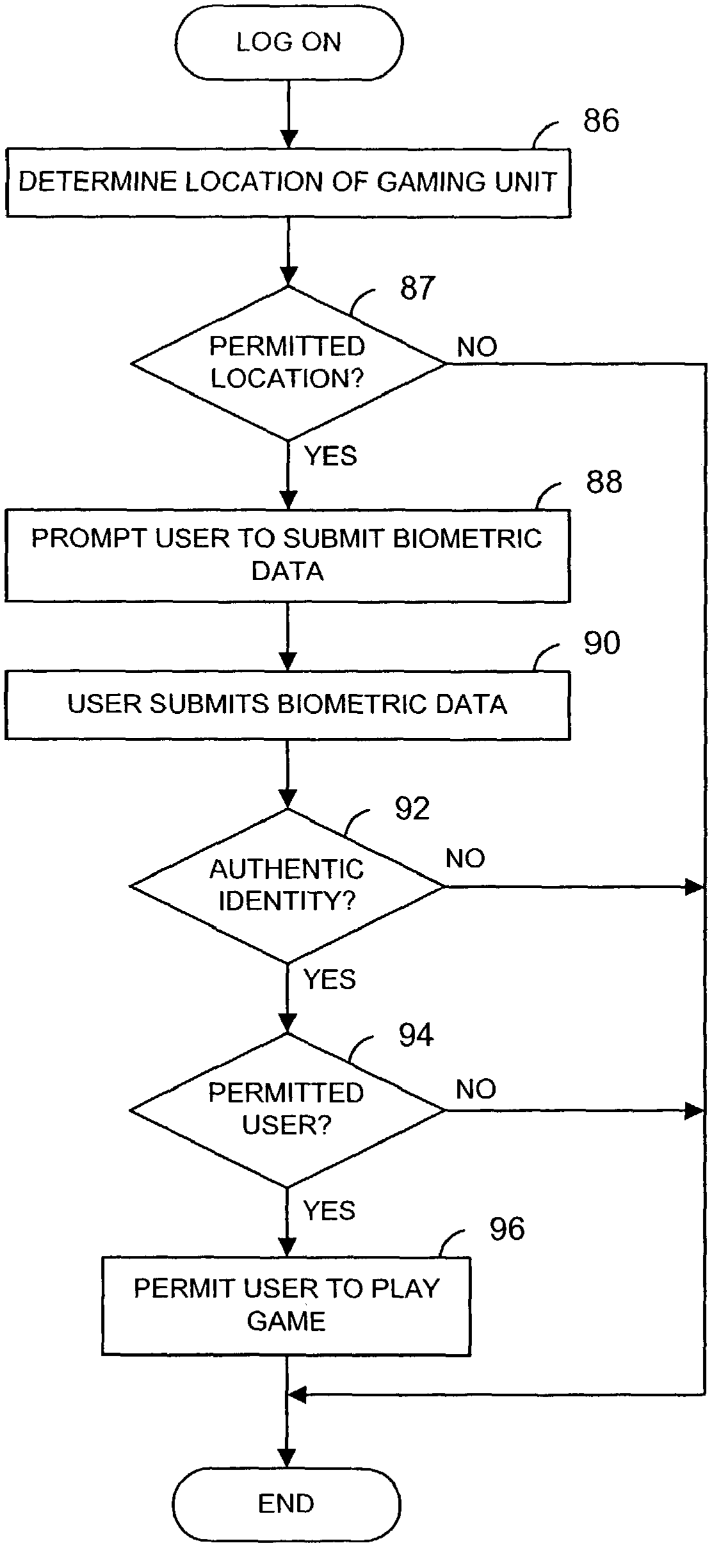
FIG. 3 is a flowchart of an example routine for logging on to the gaming system.

Once registered with the gaming service, a user could "log on" via the gaming unit 20 and play a wagering game. FIG. 3 is a simplified flow diagram of one possible embodiment of a method of logging on to a gaming service operated on the gaming system 10. At block 86, the location of the gaming unit 20 to which a user is attempting to "log on" may be determined. For instance, if the gaming unit 20 includes a position sensing device, the location of the gaming unit 20 can be determined by examining position data generated by the position sensing device. At block 87, it may be determined whether the location of the gaming unit 20 is in a location in which games to be played are permitted. For instance, wagering games are legal in only certain jurisdictions. Thus, if the gaming unit (for example, a lap top computer) is located in a jurisdiction in which wagering games are not legal, the user may not be permitted access to the games. As another example, it may be desired to permit a user to gamble with a mobile gaming unit 20 (e.g., a personal digital assistant with wireless connectivity) only within a building or set of buildings (e.g., a casino and hotel). Thus, if the gaming unit is brought outside the building (e.g., the parking lot), the user may not be permitted access to the games. Blocks 86 and 87 may be omitted if limiting access base on location is not desired.

At block 88, a user may be prompted, by a gaming unit 20, to submit biometric data. For example, in embodiments in which the gaming unit 20 is coupled with a finger print scanning device, the gaming unit 20 could display a screen or window that prompts the user to have their finger print scanned. At block 90, the user may submit biometric data using the gaming unit 20. In embodiments in which the gaming unit 20 is coupled with a finger print scanning device, the user's finger print may be scanned.

Then, at block 92, the biometric data obtained at block 90 may be compared with biometric data, obtained previously (e.g., via a registration unit 26), of registered users of the gaming service. In embodiments in which the gaming unit 20 is coupled with a finger print scanning device, the finger print data obtained at block 90 may be compared with finger print data of registered users. If the biometric data does not match, the user may not be permitted to play a game. If the biometric data does match a registered user, it may be determined, at block 94, whether the user is permitted to play a game. For example, if the personal data, obtained previously (e.g., via a registration unit 26), indicates that the user is too young to play a wagering game, the user may not be permitted to play. Similarly, if the user is on a "black list" of persons not permitted to play games of the gaming service, the user may not be permitted to play. At block 96, the user may be permitted to play a game via the gaming unit 20. Block 94 may be omitted if it is not desired to limit access in this way. For example, underage persons could be prevented from registering in the first place.

Registration Units

Each registration unit 26 may be disposed in a different location, such as a casino, a hotel, a notary public's office, etc. Typically, the registration units 26 are located in a controlled environment, such that there may be some level of assurance that data obtained via the registration unit 26 is accurate. As one example, a registration unit 26 may be located in a casino, and not operable by the general public. Rather, a casino employee can operate the registration unit 26. If a person wishes to register with the gaming service, the casino employee can input personal information of the person using the registration unit 26 after verifying the information by, for example, examining a driver's license, identification card, passport, etc. Further, the casino employee can operate the registration unit 26 to obtain biometric data from the person. For example, if the registration unit includes a finger print scanning device, the casino employee can operate the registration unit 26 and instruct the person so as to obtain data representing the person's fingerprint.

In other embodiments, a user may submit personal information without supervision. The information may be verified by, for example, requesting the user mail a copy of a driver's license, passport, etc. In some embodiments, the personal information need not be verified.

Figure 4A:
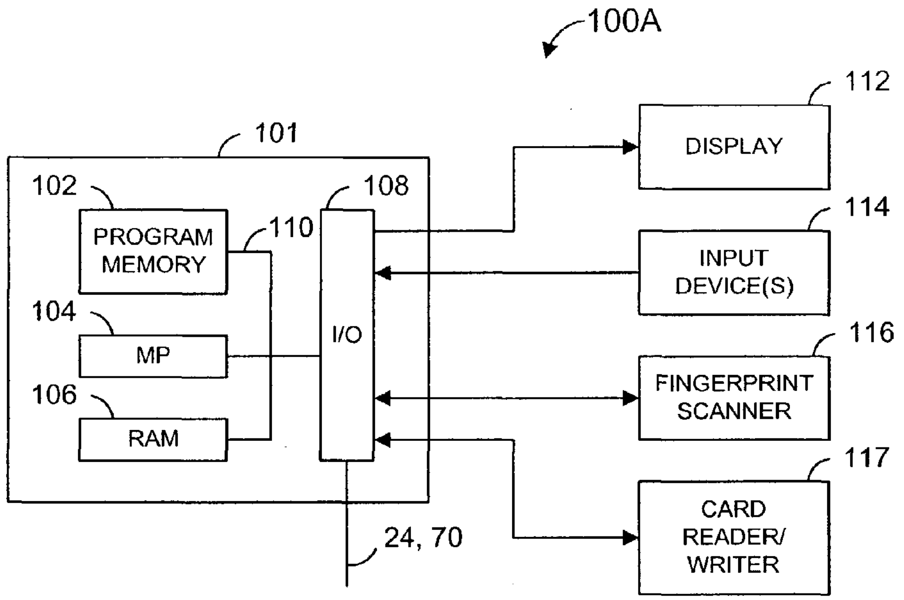
FIGS. 4A-4D are block diagrams of example registration units.

Each registration unit may be either a smart terminal, such as a personal computer, a laptop computer, a personal digital assistant (PDA), etc., or a dumb terminal that does not include a controller. FIG. 4A is a block diagram of one possible embodiment of one of the registration units 26. Although one of the registration units 26 is described below in connection with FIG. 4A, it should be understood that the structure of the registration units 26 may be different, and each of the registration units 26 may have a different design or structure than other registration units 26.

FIG. 4A is a simplified block diagram illustrating a number of components that may be incorporated in one embodiment of a registration unit. The registration unit 100A may include a controller 101 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 101 may include multiple microprocessors 104. Similarly, the memory of the controller 101 may include multiple RAMs 106 and multiple program memories 102. Although the I/O circuit 108 is shown as a single block, it should be appreciated that the I/O circuit 108 may include a number of different types of I/O circuits. RAM(s) 104 and program memories 102 may be implemented as semiconductor memories, magnetically readable memories, and/or optically readable memories, for example.

Program memory 102 may be a read-only memory (ROM), or a read/write or alterable memory, such as a hard disk. In the event a hard disk is used as a program memory, the address/data bus 110 shown schematically in FIG. 4A may comprise multiple address/data buses, which may be of different types, and there may be an I/O circuit disposed between the address/data buses. The network data link 24, 70 may be operatively coupled to the I/O circuit 108.

The registration unit 100A may include a display unit 112, which may be any type of display unit such as a cathode-ray tube (CRT), a flat panel display, etc. Additionally, the registration unit 100A may include one or more input devices 114 such as a keyboard, mouse, bar code scanner, smart card reader, a touch sensitive device associated with the display unit 112, etc. Further, the registration unit 100A may include a fingerprint scanning device 116 which may be any device capable of detecting the fingerprint of a person and generating digital data representing the fingerprint. The registration unit 100A and the fingerprint scanning device 116 may be configured so that the fingerprint scanning device 116 may removable couple with the registration unit. Additionally, the fingerprint scanning device 116 may be integrated with the registration unit 100A. In one specific embodiment, the fingerprint scanning device 116 may be integrated with a touch screen of the registration unit 100A. Additionally, the registration unit 100A may include a smart card reader/writer 117.

Components 112, 114, 116, and 117 may be operatively coupled to the I/O circuit 108, and can be so coupled by either a unidirectional or bidirectional, single-line or multiple-line data link, which may depend on the design of the component that is used. Additionally, components 112, 114, 116, and 117 may be connected to the I/O circuit 108 via a respective direct line or conductor, or different connection schemes could be used. For example, one or more of the components shown in FIG. 4A may be connected to the I/O circuit 108 via a common bus or other data link that is shared by a number of components. Furthermore, some of the components may be directly connected to the microprocessor 104 without passing through the I/O circuit 108.

Figure 4B:
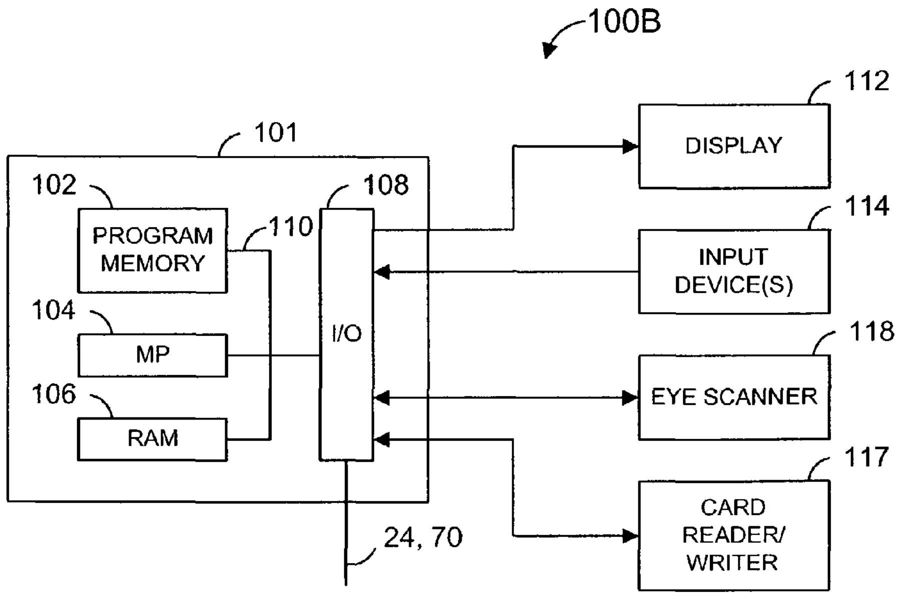

FIG. 4B is a block diagram of a second possible embodiment 100B of a registration unit 26 (FIG. 1). Referring to FIG. 4B, the registration unit 100B may be identical to the registration unit 100A described above in connection with FIG. 4A, except that an eye scanning device 118 may be utilized instead of the fingerprint scanning device 116. The eye scanner 118 may be any type of device that is capable of detecting a portion of the eye of a person, such as the iris or retina of a person's eye, and generating digital data representing an image of the eye or digital data representing physical characteristics of the eye.

Figure 4C:
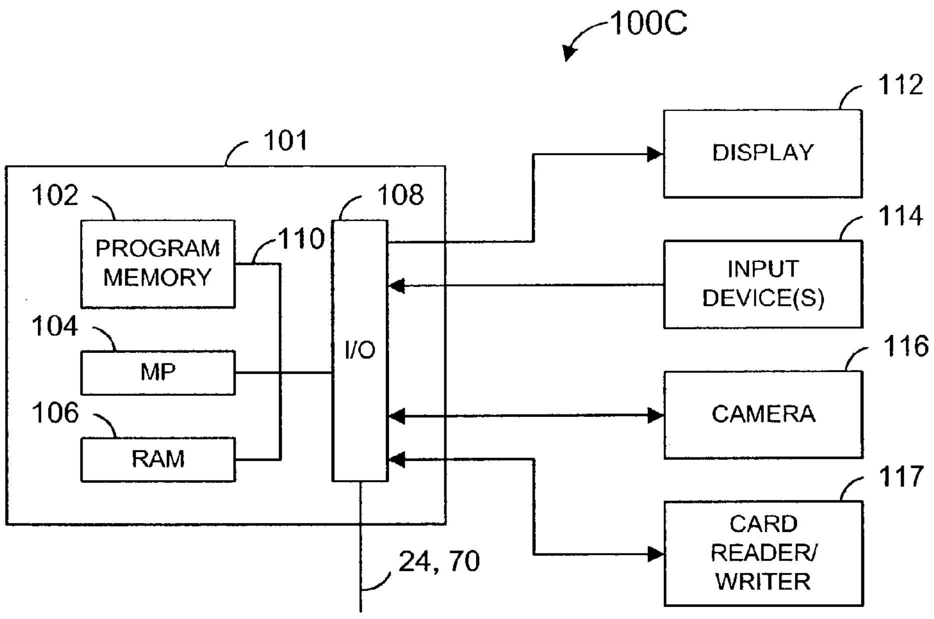

FIG. 4C is a block diagram of a third possible embodiment 100C of one of the registration unit 26 (FIG. 1). Referring to FIG. 4C, the registration unit 100C may be identical to the registration unit 100A described above in connection with FIG. 4A, except that a camera 120 may be utilized instead of the fingerprint scanner 116. The camera 120, which may be any type of camera or a combination of a camera and data-processing circuitry, may be used to generate a digital image of a portion of a person, such as a person's face.

Figure 4D:
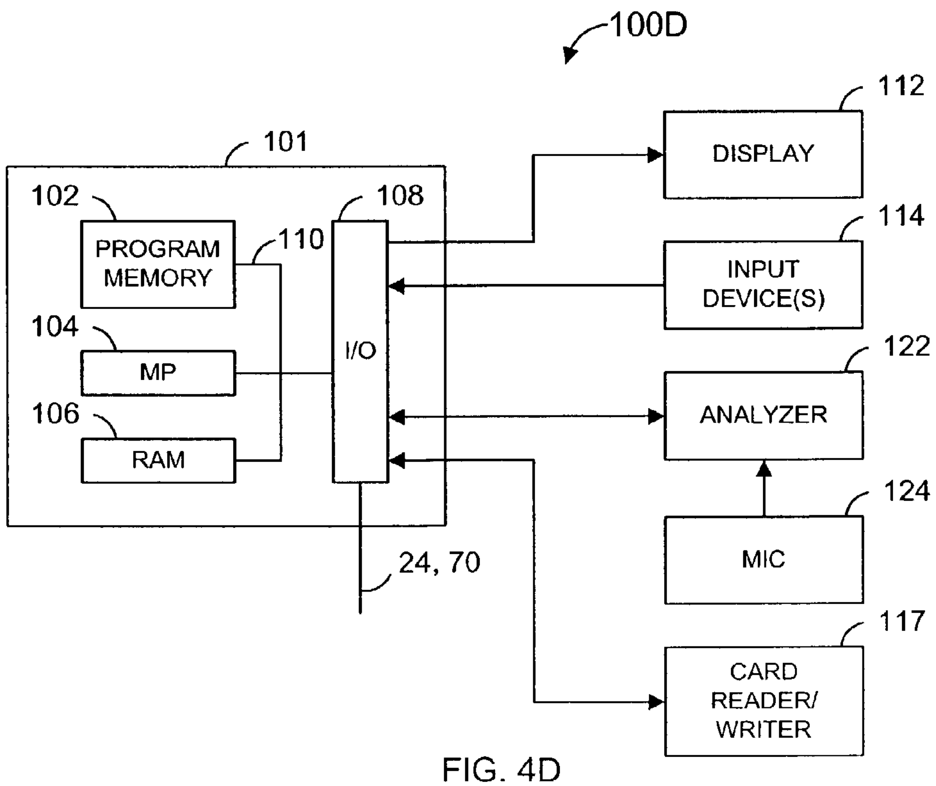

FIG. 4D is a block diagram of a fourth possible embodiment 100D of one of the registration unit 26 (FIG. 1). Referring to FIG. 4D, the registration unit 100D may be identical to the registration unit 100A described above in connection with FIG. 4A, except that a voice analyzer 122 and a microphone 124 may be utilized instead of the fingerprint scanner 116. The microphone 124 may be used to generate a voice signal in response to detecting sound corresponding to one or more words spoken by a person. The voice signal could be provided to the voice analyzer 122, which could be any type of device or circuit, such as the combination of a sampling and analog-to-digital converter circuit or a portion of a voice-recognition circuit, which may generate a digital voice signature or digital data representing the unique frequency characteristics of a person's voice. In some embodiments, the voice signal may be provided to an analog-to-digital converter, and the controller 101 may generate the digital voice signature or digital data representing the unique frequency characteristics of the person's voice.

Referring again to FIG. 1, it is to be understood that if the gaming system 10 includes a plurality of the registration units 26, the registration units 26 may all be of the same type, or each registration unit 26 may be of a different type. For example, some registration units 26 may be of a type similar to those described with reference to FIGS. 4A-4D, while others may be of a different type.

Gaming Units

Each gaming unit 20 may be disposed in a different location, such as a hotel room, a restaurant, an airport, a person's home, etc. Each gaming unit 20 may be either a smart terminal, such as casino gaming unit, a video gambling machine, a computer-based kiosk, a personal computer, a laptop computer, a PDA, etc., or a dumb terminal that does not include a controller.

Figure 5:
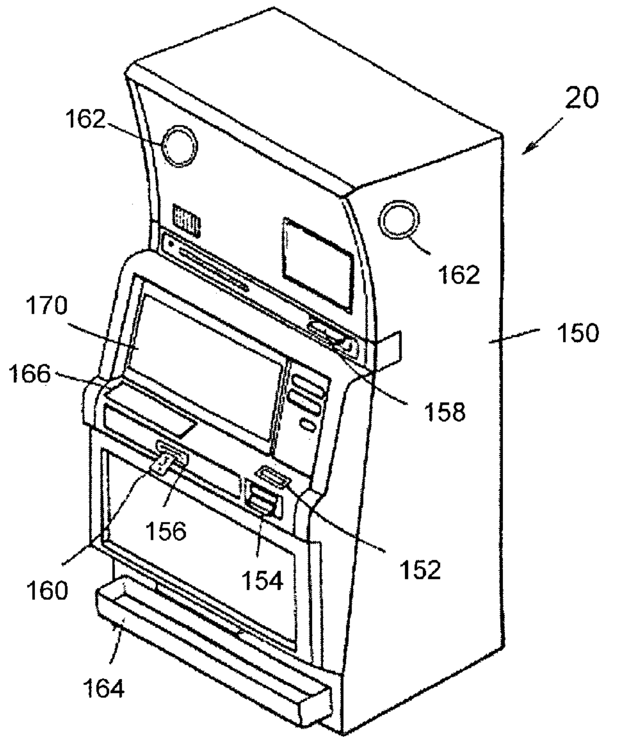
FIG. 5 is a perspective view of one example of a gaming unit.

FIG. 5 is a perspective view of one possible embodiment of one or more of the gaming units 20. It should be understood that the design of one or more of the gaming units 20 may be different than the design of other gaming units 20. Some of the gaming units 20 may be any type of casino gaming unit and may have various different structures and methods of operation. For purposes of setting forth examples, various designs of the gaming units 20 are described below, but it should be understood that numerous other designs may be utilized.

Referring to FIG. 5, the casino gaming unit 20 may include a housing or cabinet 150 and one or more input devices, which may include a coin slot or acceptor 152, a paper currency acceptor 154, a ticket reader/printer 156 and a card reader and/or writer (hereinafter "card reader/writer") 158, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 156 may be used to read and/or print or otherwise encode ticket vouchers 160. The ticket vouchers 160 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 160 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 160 could be printed with an optically readable material such as ink, or data on the ticket vouchers 160 could be magnetically encoded. The ticket reader/printer 156 may be provided with the ability to both read and print ticket vouchers 160, or it may be provided with the ability to only read or only print or encode ticket vouchers 610. In the latter case, for example, some of the gaming units 20 may have ticket printers 156 that may be used to print ticket vouchers 160, which could then be used by a player in other gaming units 20 that have ticket readers 156.

If provided, the card reader/writer 158 may include any type of card reading/writing device, such as a magnetic card reader/writer or an optical card reader/writer, and may be used to read data from and/or write data to a card offered by a player, such as a credit card, a smart card, a player tracking card, etc. If provided for player tracking purposes, the card reader/writer 158 may be used to read data from, and/or write data to, player tracking cards that are capable of storing data representing the identity of a player, the identity of a casino, the player's gaming habits, etc.

The gaming unit 20 may include one or more audio speakers 162, a coin payout tray 164, an input control panel 166, and a color video display unit 170 for displaying images relating to the game or games provided by the gaming unit 20. The audio speakers 162 may generate audio representing sounds such as the noise of spinning slot machine reels, a dealer's voice, music, announcements or any other audio related to a casino game. The input control panel 166 may be provided with a plurality of pushbuttons or touch-sensitive areas that may be pressed by a player to select games, make wagers, make gaming decisions, etc.

Figure 5A:
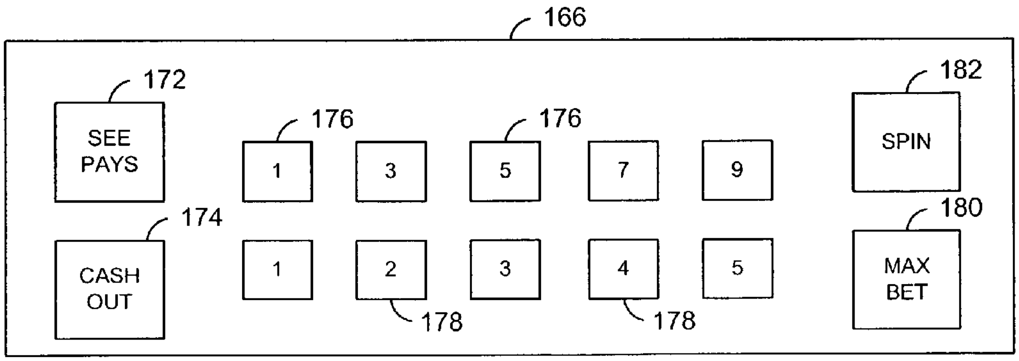
FIG. 5A is an illustration of one example of a control panel for the example gaming unit illustrated in FIG. 5.

FIG. 5A illustrates one possible embodiment of the control panel 166, which may be used where the gaming unit 20 may be a slot machine having a plurality of mechanical or "virtual" reels. Referring to FIG. 5A, the control panel 166 may include a "See Pays" button 172 that, when activated, causes the display unit 170 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 166 may include a "Cash Out" button 174 that may be activated when a player decides to terminate play on the gaming unit 20, in which case the gaming unit 20 may return value to the player, such as by returning a number of coins to the player via the payout tray 164.

If the gaming unit 20 provides a slots game having a plurality of reels and a plurality of paylines which define winning combinations of reel symbols, the control panel 166 may be provided with a plurality of selection buttons 176, each of which allows the player to select a different number of paylines prior to spinning the reels. For example, five buttons 176 may be provided, each of which may allow a player to select one, three, five, seven or nine paylines.

If the gaming unit 20 provides a slots game having a plurality of reels, the control panel 166 may be provided with a plurality of selection buttons 178 each of which allows a player to specify a wager amount for each payline selected. For example, if the smallest wager accepted by the gaming unit 20 is a quarter ($0.25), the gaming unit 20 may be provided with five selection buttons 178, each of which may allow a player to select one, two, three, four or five quarters to wager for each payline selected. In that case, if a player were to activate the "5" button 176 (meaning that five paylines were to be played on the next spin of the reels) and then activate the "3" button 178 (meaning that three coins per payline were to be wagered), the total wager would be $3.75 (assuming the minimum bet was $0.25).

The control panel 166 may include a "Max Bet" button 180 to allow a player to make the maximum wager allowable for a game. In the above example, where up to nine paylines were provided and up to five quarters could be wagered for each payline selected, the maximum wager would be 45 quarters, or $11.25. The control panel 166 may include a spin button 182 to allow the player to initiate spinning of the reels of a slots game after a wager has been made.

In FIG. 5A, a rectangle is shown around the buttons 172, 174, 176, 178, 180, 182. It should be understood that that rectangle simply designates, for ease of reference, an area in which the buttons 172, 174, 176, 178, 180, 182 may be located. Consequently, the term "control panel" should not be construed to imply that a panel or plate separate from the housing 150 of the gaming unit 20 is required, and the term "control panel" may encompass a plurality or grouping of player activatable buttons.

Although one possible control panel 166 is described above, it should be understood that different buttons could be utilized in the control panel 166, and that the particular buttons used may depend on the game or games that could be played on the gaming unit 20. Although the control panel 166 is shown to be separate from the display unit 170, it should be understood that the control panel 166 could be generated by the display unit 170. In that case, each of the buttons of the control panel 166 could be a colored area generated by the display unit 170, and some type of mechanism may be associated with the display unit 170 to detect when each of the buttons was touched, such as a touch-sensitive screen.

The gaming unit 20 may also include, or be operatively coupled with, a biometric device (not shown in FIG. 5) for submitting biometric data. The biometric device may be, for example, a fingerprint scanning device, an eye scanning device, a facial recognition device, a voice recognition device, etc. The biometric device may include a mechanism for providing feedback to a user. For example, a fingerprint scanning device may include a light that goes on while a scan is taking place. As another example, a fingerprint scanning device may include a speaker that generates a "beep" when a scan is completed. In other embodiments, display unit 170 and/or audio speakers 162 may be used to provide feedback to a user regarding the biometric device. For example, when a fingerprint scan is completed, a message may be displayed on display 170, or a sound generated by audio speakers 162, indicating to the user that the scan has been completed.

In some embodiments, the gaming unit 20 may include a slot, port, connector, etc., (not shown in FIG. 5) configured to accept a biometric device. In these embodiments, a biometric device can be removably coupled to the gaming unit 20 via the slot, port, connector, etc. For instance, a biometric device configured to removably couple with a gaming unit 20 can be given to, registered to, sold to, rented to, etc., a user. Then, when a user desires to play a game on a gaming unit 20, the user could "plug in" the biometric device to the gaming unit 20 and submit biometric data to gain access to games.

In one embodiment, a smart card may include a biometric device (e.g., a fingerprint scanner) for obtaining biometric data from a person, and the card reader/writer 158 could be configured to accept the smart card with the biometric device.

In other embodiments, the biometric device 116 may be integrated with the gaming unit 20. For example, a fingerprint scanning device may be integrated with a touch screen, a keyboard, a button, a handle, etc., of the gaming unit 20. In one embodiment, a fingerprint scanning device may be integrated with a button, area of a touch screen, area of a control panel, handle, etc., corresponding to a "spin," "deal," "hit," "play," etc., selection on the gaming unit 20.

In some embodiments, submission of biometric data may correspond to a player's choice to play a game. For example, if a fingerprint scanner is integrated with a button, area of a touch screen, area of a control panel, a handle, etc. corresponding to a spin selection for a reel-type game, submission to a fingerprint scan may indicate the user's choice to spin.

Further, the gaming unit 20 may include, or be operatively coupled with, a location device (not shown in FIG. 5) that generates data indicating its location. The location device could be, for example, a GPS device, a Loran-C device, etc. In some embodiments, the gaming unit 20 may include a slot, port, connector, etc., (not shown in FIG. 5) configured to accept a location device. In these embodiments, a location device can be removably coupled to the gaming unit 20 via the slot, port, connector, etc. For instance, a location device configured to removably couple with a gaming unit 20 can be given to, registered to, sold to, rented to, etc., a user. Then, when a user desires to play a game on a gaming unit 20, the user could "plug in" the location device to the gaming unit 20 to gain access to games.

Gaming Unit Electronics

Figure 6:
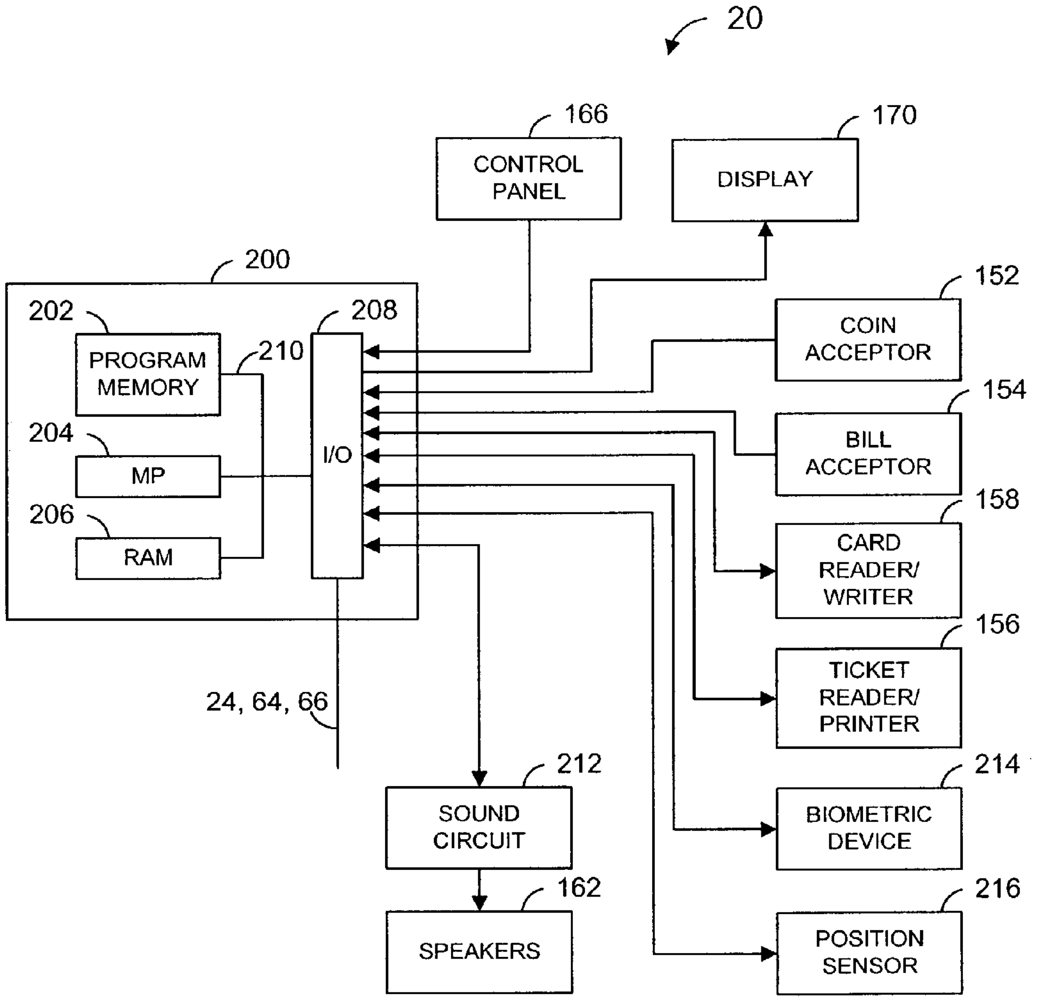
FIG. 6 is a block diagram of an example gaming unit.

FIG. 6 is a block diagram of a number of components that may be incorporated in the gaming unit 20. Referring to FIG. 6, the gaming unit 20 may include a controller 200 that may comprise a program memory 202, a microcontroller or microprocessor (MP) 204, a random-access memory (RAM) 206 and an input/output (I/O) circuit 208, all of which may be interconnected via an address/data bus 210. It should be appreciated that although only one microprocessor 204 is shown, the controller 200 may include multiple microprocessors 204. Similarly, the memory of the controller 200 may include multiple RAMs 206 and multiple program memories 202. Although the I/O circuit 208 is shown as a single block, it should be appreciated that the I/O circuit 208 may include a number of different types of I/O circuits. The RAM(s) 204 and program memories 202 may be implemented as semiconductor memories, magnetically readable memories, and/or optically readable memories, for example.

Program memory 202 may be a read-only memory (ROM), or a read/write or alterable memory, such as a hard disk. In the event a hard disk is used as a program memory, the address/data bus 210 shown schematically in FIG. 6 may comprise multiple address/data buses, which may be of different types, and there may be an I/O circuit disposed between the address/data buses. The network data link 24, 64, 66 may be operatively coupled to the I/O circuit 208.

FIG. 6 illustrates that the control panel 166, the coin acceptor 152, the bill acceptor 154, the card reader/writer 158 the ticket reader/printer 156, and the display device 170 may be operatively coupled to the I/O circuit 208, each of those components being so coupled by either a unidirectional or bidirectional, single-line or multiple-line data link, which may depend on the design of the component that is used. The speaker(s) 162 may be operatively coupled to a sound circuit 212, that may comprise a voice- and sound-synthesis circuit or that may comprise a driver circuit. The sound-generating circuit 212 may be coupled to the I/O circuit 208. Additionally, a biometric device 214 and a position sensing device 216 each may be operatively coupled to the I/O circuit 208, each of those components being so coupled by either a unidirectional or bidirectional, single-line or multiple-line data link, which may depend on the design of the component that is used.

As shown in FIG. 6, the components 152, 154, 156, 158, 166, 170, 212, 214, and 216 may be connected to the I/O circuit 208 via a respective direct line or conductor. Different connection schemes could be used. For example, one or more of the components shown in FIG. 6 may be connected to the I/O circuit 208 via a common bus or other data link that may be shared by a number of components. Furthermore, some of the components may be directly connected to the microprocessor 204 without passing through the I/O circuit 208.

Other Types of Gaming Units

It is to be understood that the gaming units 20 may be of the same type or each may be of different types. Generally, the location at which the gaming unit 20 may be used may be a factor in selecting the type of gaming unit. For example, a gaming unit 20 of a type similar to that described with reference to FIG. 5 may be desirable for some locations (e.g., a casino, an airport, an off-track betting facility, etc.) but may not be desirable for others (e.g., a private residence, a hotel room, a restaurant, etc.). Some types may include many components, such as components 152, 154, 156, 158, 162, 166, 170, 212, 214, and 216, while other types may include a lesser number of components. For instance, some gaming units 20 may be designed to be free-standing and include many components, while others may be designed for a desk top or counter top and include only a few components. In one specific example, a gaming unit 20 may be a personal computer.

Some gaming units 20 may be of a type similar to the registration units 26 described with reference to FIGS. 4A-4D. Further, some gaming units 20 may be identical, or substantially identical, to the registration units 26. Moreover, some gaming units 20 may also serve as registration units 26.

Authentication Server

Figure 7:
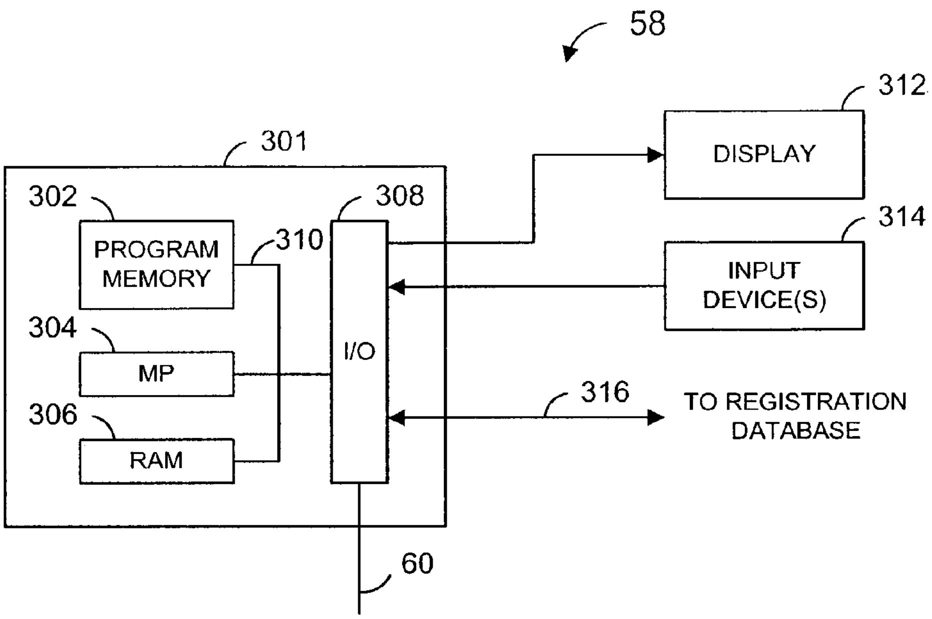
FIG. 7 is a block diagram of an example authentication server.

FIG. 7 is a simplified block diagram illustrating a number of components that may be incorporated in one embodiment of an authentication server. The authentication server 58 may include a controller 301 that may comprise a program memory 302, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 301 may include multiple microprocessors 304. Similarly, the memory of the controller 301 may include multiple RAMs 306 and multiple program memories 302. Although the I/O circuit 308 is shown as a single block, it should be appreciated that the I/O circuit 308 may include a number of different types of I/O circuits. RAM(s) 304 and program memories 302 may be implemented as semiconductor memories, magnetically readable memories, and/or optically readable memories, for example.

Program memory 302 may be a read-only memory (ROM), or a read/write or alterable memory, such as a hard disk. In the event a hard disk is used as a program memory, the address/data bus 310 shown schematically in FIG. 7 may comprise multiple address/data buses, which may be of different types, and there may be an I/O circuit disposed between the address/data buses. The network data link 60 may be operatively coupled to the I/O circuit 308. Although only one network data link 60 is shown, it is to be understood the authentication server 58 may be coupled to multiple network data links.

The authentication server 58 may include a display unit 312, which may be any type of display unit such as a cathode-ray tube (CRT), a flat panel display, etc. Additionally, the authentication server 58 may include one or more input devices 314 such as a keyboard, mouse, etc. Also, the authentication server 58 may include a server operating system.

Components 312, 314, may be operatively coupled to the I/O circuit 308, and can be so coupled by either a unidirectional or bidirectional, single-line or multiple-line data link, which may depend on the design of the component that is used. Additionally, components 312, 314, may be connected to the I/O circuit 308 via a respective direct line or conductor, or different connection schemes could be used. For example, one or more of the components shown in FIG. 7 may be connected to the I/O circuit 308 via a common bus or other data link that may be shared by a number of components. Furthermore, some of the components may be directly connected to the microprocessor 304 without passing through the I/O circuit 308.

Additionally, the authentication server 58 may be operatively coupled to a registration database (not shown) via a data link 316. Data link 316 may be operatively coupled with the I/O circuit 308 via a dedicated link 316, or different connection schemes could be used. For example, the data link 316 may be a common bus or other data link that shared by a number of components, and/or shared with data link 60. Furthermore, the data link 316 may be directly connected to the microprocessor 304 without passing through the I/O circuit 308.

Website Server

Figure 8:
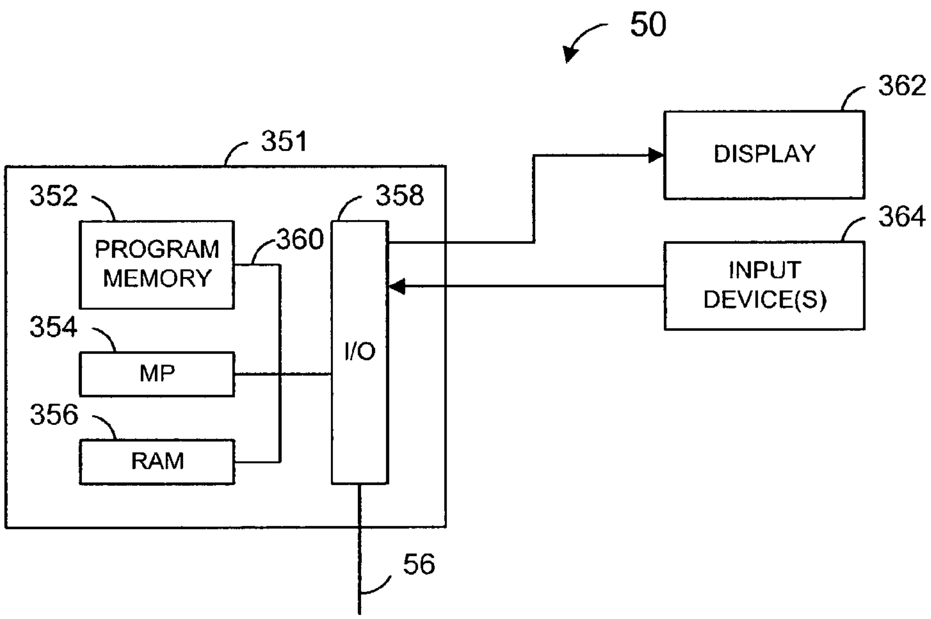
FIG. 8 is a block diagram of an example website server.

FIG. 8 is a simplified block diagram illustrating a number of components that may be incorporated in one embodiment of an authentication server. The website server 50 may include a controller 351 that may comprise a program memory 352, a microcontroller or microprocessor (MP) 354, a random-access memory (RAM) 356 and an input/output (I/O) circuit 358, all of which may be interconnected via an address/data bus 360. It should be appreciated that although only one microprocessor 354 is shown, the controller 351 may include multiple microprocessors 354. Similarly, the memory of the controller 351 may include multiple RAMs 356 and multiple program memories 352. Although the I/O circuit 358 is shown as a single block, it should be appreciated that the I/O circuit 358 may include a number of different types of I/O circuits. RAM(s) 354 and program memories 352 may be implemented as semiconductor memories, magnetically readable memories, and/or optically readable memories, for example.

Program memory 352 may be a ROM, or a read/write or alterable memory, such as a hard disk. In the event a hard disk is used as a program memory, the address/data bus 360 shown schematically in FIG. 8 may comprise multiple address/data buses, which may be of different types, and there may be an I/O circuit disposed between the address/data buses. The network data link 56 is operatively coupled to the I/O circuit 358. Although only one network data link 56 is shown, it is to be understood the website server 50 may be coupled to multiple network data links.

The website server 50 may include a display unit 362, which may be any type of display unit such as a CRT, a flat panel display, etc. Additionally, the website server 50 may include one or more input devices 364 such as a keyboard, mouse, etc. Also, the website server 50 may include a server operating system.

Components 362, 364, may be operatively coupled to the I/O circuit 358, and can be so coupled by either a unidirectional or bidirectional, single-line or multiple-line data link, which may depend on the design of the component that is used. Additionally, components 362, 364, may be connected to the I/O circuit 358 via a respective direct line or conductor, or different connection schemes could be used. For example, one or more of the components shown in FIG. 8 may be connected to the I/O circuit 358 via a common bus or other data link that may be shared by a number of components. Furthermore, some of the components may be directly connected to the microprocessor 354 without passing through the I/O circuit 358.

Gaming Servers

Although one possible embodiment of one of the gaming server 52 is described below in connection with FIG. 9, it should be understood that, if multiple gaming servers 52 are employed, the structure of the gaming servers 52 could be different than that described and that each gaming server 52 could have a different structure.

Figure 9:
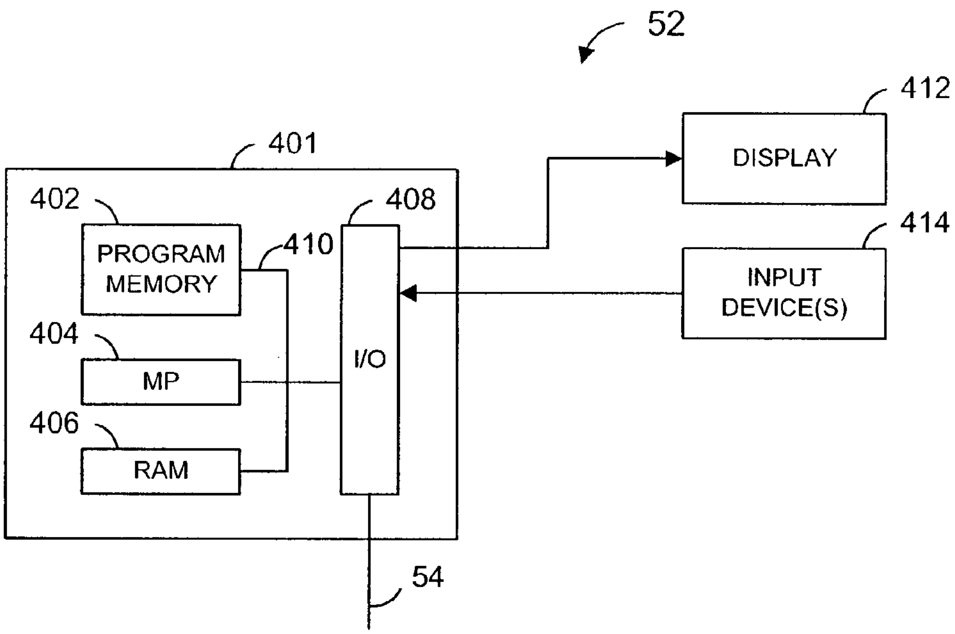
FIG. 9 is a block diagram of an example gaming server.

FIG. 9 is a simplified block diagram illustrating a number of components that may be incorporated in one embodiment of a gaming server. The gaming server 52 may include a controller 401 that may comprise a program memory 402, a microcontroller or microprocessor (MP) 404, a random-access memory (RAM) 406 and an input/output (I/O) circuit 408, all of which may be interconnected via an address/data bus 410. It should be appreciated that although only one microprocessor 404 is shown, the controller 401 may include multiple microprocessors 404. Similarly, the memory of the controller 401 may include multiple RAMs 406 and multiple program memories 402. Although the I/O circuit 408 is shown as a single block, it should be appreciated that the I/O circuit 408 may include a number of different types of I/O circuits. RAM(s) 404 and program memories 402 may be implemented as semiconductor memories, magnetically readable memories, and/or optically readable memories, for example.

Program memory 402 may be a read-only memory (ROM), or a read/write or alterable memory, such as a hard disk. In the event a hard disk is used as a program memory, the address/data bus 410 shown schematically in FIG. 9 may comprise multiple address/data buses, which may be of different types, and there may be an I/O circuit disposed between the address/data buses. The network data link 54 may be operatively coupled to the I/O circuit 408. Although only one network data link 54 is shown, it is to be understood that the gaming server 52 may be coupled to multiple network data links.

The gaming server 52 may include a display unit 412, which may be any type of display unit such as a CRT, a flat panel display, etc. Additionally, the gaming server 52 may include one or more input devices 414 such as a keyboard, mouse, etc. Also, the gaming server 52 may include a server operating system.

Components 412, 414, may be operatively coupled to the I/O circuit 408, and can be so coupled by either a unidirectional or bidirectional, single-line or multiple-line data link, which may depend on the design of the component that is used. Additionally, components 412, 414, may be connected to the I/O circuit 408 via a respective direct line or conductor, or different connection schemes could be used. For example, one or more of the components shown in FIG. 9 may be connected to the I/O circuit 408 via a common bus or other data link that is shared by a number of components. Furthermore, some of the components may be directly connected to the microprocessor 404 without passing through the I/O circuit 408.

Network Computer

Figure 10:
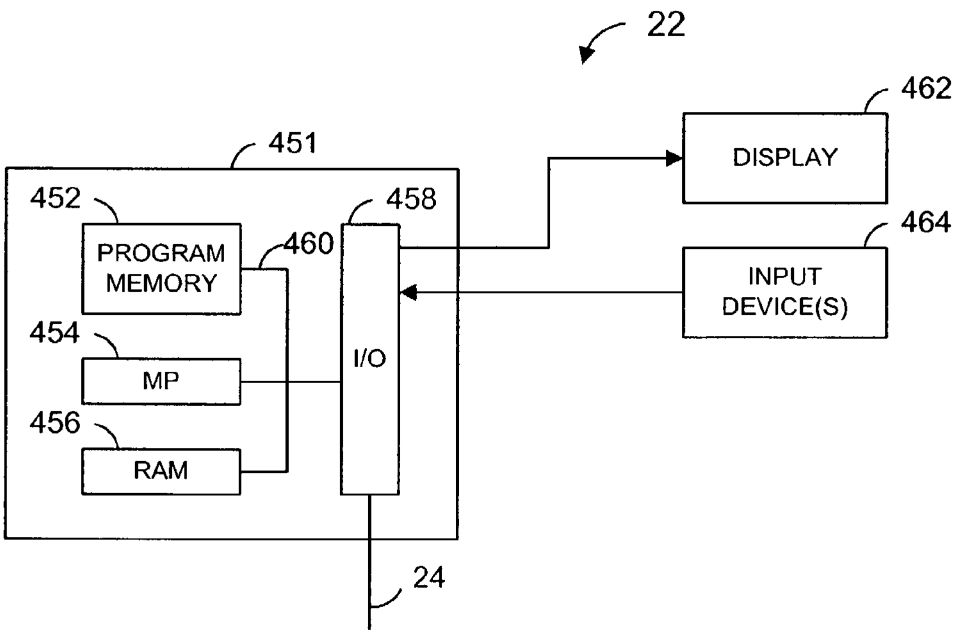
FIG. 10 is a block diagram of an example network controller.

FIG. 10 is a simplified block diagram illustrating a number of components that may be incorporated in one embodiment of a network computer. The network computer 22 may include a controller 451 that may comprise a program memory 452, a microcontroller or microprocessor (MP) 454, a random-access memory (RAM) 456 and an input/output (I/O) circuit 458, all of which may be interconnected via an address/data bus 460. It should be appreciated that although only one microprocessor 454 is shown, the controller 451 may include multiple microprocessors 454. Similarly, the memory of the controller 451 may include multiple RAMs 456 and multiple program memories 452. Although the I/O circuit 458 is shown as a single block, it should be appreciated that the I/O circuit 458 may include a number of different types of I/O circuits. RAM(s) 454 and program memories 452 may be implemented as semiconductor memories, magnetically readable memories, and/or optically readable memories, for example.

Program memory 452 may be a ROM, or a read/write or alterable memory, such as a hard disk. In the event a hard disk is used as a program memory, the address/data bus 460 shown schematically in FIG. 10 may comprise multiple address/data buses, which may be of different types, and there may be an I/O circuit disposed between the address/data buses. The network data link 24 may be operatively coupled to the I/O circuit 458. Although only one network data link 24 is shown, it is to be understood the network computer 22 may be coupled to multiple network data links.

The network computer 22 may include a display unit 462, which may be any type of display unit such as a CRT, a flat panel display, etc. Additionally, the network computer 22 may include one or more input devices 464 such as a keyboard, mouse, etc.

Components 462, 464, may be operatively coupled to the I/O circuit 458, and can be so coupled by either a unidirectional or bidirectional, single-line or multiple-line data link, which may depend on the design of the component that is used. Additionally, components 462, 464, may be connected to the I/O circuit 458 via a respective direct line or conductor, or different connection schemes could be used. For example, one or more of the components shown in FIG. 10 may be connected to the I/O circuit 458 via a common bus or other data link that may be shared by a number of components.

Furthermore, some of the components may be directly connected to the microprocessor 454 without passing through the I/O circuit 458.

Registration Unit Operation

One manner in which a registration unit 26 may operate is described below in connection with a number of flowcharts which represent a number of portions or routines of one or more computer programs, which may be stored in one or more of the memories 102, 106 of the registration unit 100A, 100B, 100C, or 100D (FIGS. 4A-4D). The computer program portions may be written in any high level language such as C, C+, C++ or the like or any low-level, assembly or machine language. By storing the computer program portions therein, various portions of the memories 102, 106 are physically and/or structurally configured in accordance with computer program instructions. Additionally, it is to be understood that the computer program portions or routines may be implemented via display data (e.g., web pages, etc.) supplied to a registration unit 26, for example, by the network computer 22, the website server 50, or the authentication server 58 (FIG. 1).

Figure 11:
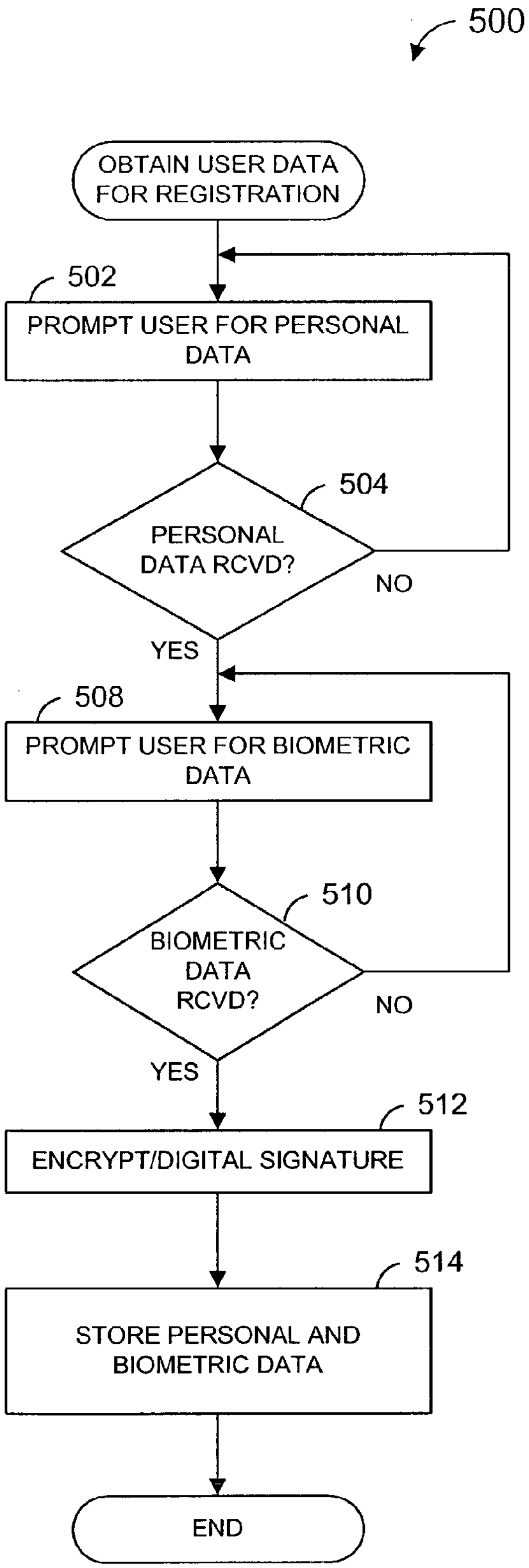
FIG. 11 is a flowchart of an example routine for obtaining user data for registering with a gaming system.
Figure 12:
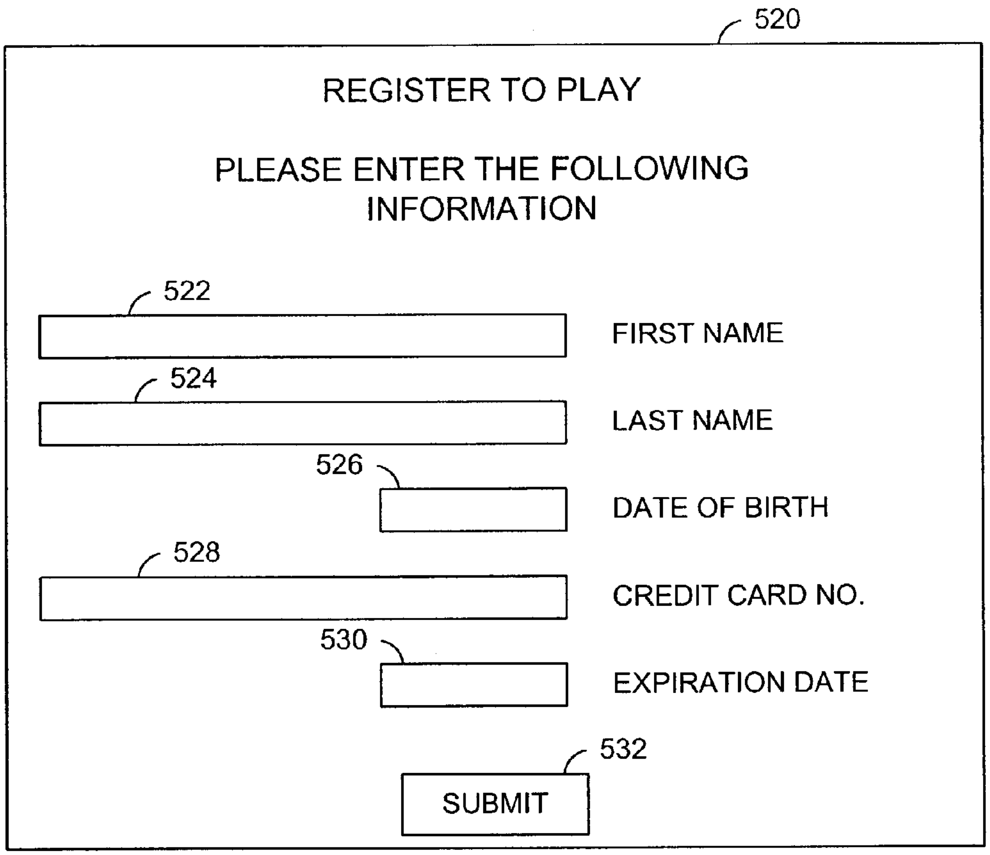
FIG. 12 is an illustration of an example registration display that may be displayed on one of the registration units.

FIG. 11 is a flowchart of one possible embodiment of an operation software routine 500 that may be performed by a registration unit 26. The flowchart will be described with reference to FIGS. 1, 4A, and 12. At block 502, a user may be prompted to enter personal data. As one example, a registration display could be displayed on display unit 112. One example of a registration display 520 that could be displayed on display unit 112 is shown in FIG. 12. Registration display 520 could include a data entry box 522 for entry of the first name of a person wishing to register, a data entry box 524 for entry of the last name of the person, a data entry box 526 for entry of the date of birth of the person, a data entry box 528 for entry of a credit card number of the person, and a data entry box 530 for entry of the credit card's expiration date. The registration display 520 could also include a submit button 532 which can be used by the user to submit the data. The registration display 520 could be generated by software running on the registration unit 100A. Also, the registration display 520 could be received as display data (e.g., as a web page) from, for example, the network computer 22, the website server 50, or the authentication server 58 (FIG. 1).

Other personal data that may be obtained via a registration display such as registration display 520 could include a desired login id, a password, a mailing address, an email address, a phone number, etc.

In other embodiments, some or all of the information asked for in the example registration display 520 could be read from a smart card of the person provided any of this information is stored on the smart card.

At block 504, it may be determined whether the personal data has been received. If no, the routine may branch back to block 502 to await, or prompt the user, for further personal data. At block 508, the user may be prompted to submit biometric data. For the registration units 26 that include a fingerprint scanner, such as registration unit 100A of FIG. 4A, a display could be displayed on display unit 112 that asks user to put a finger on the fingerprint scanner. Such a display could be generated by software running on the registration unit 100A. Also, the registration display 520 could be received as display data (e.g., as a web page) from, for example, the network computer 22 (FIG. 1), or the website server 50 (FIG. 1).

At block 510 it may be determined whether the biometric data has been received. For registration units 26 that include a fingerprint scanner, such as registration unit 100A of FIG. 4A, controller 101 could determine whether data representative of a fingerprint had been received from fingerprint scanner 116. If the biometric has not been received, the routine may branch back to wait for the data.

The personal data and/or biometric data can be encrypted, or a digital signature can be applied to the data, at block 512. This would help to ensure that the data came from a reliable source, and thus help to increase the security of the overall system. This block may be omitted if desired. The biometric data could be encrypted, or a digital signature could be applied to it, by the controller 101, the biometric device (e.g., fingerprint scanning device 116 (FIG. 4A), eye scanning device 118 (FIG. 4B), etc.), or some other device, and can be implemented via software, firmware, hardware, or some combination thereof.

At block 514, the biometric data and the personal data are stored. The data can be stored, for example, in memory (e.g., a hard disk) of the registration unit 26. In embodiments that include a smart card reader/writer 117, the data can be stored on a smart card. In embodiments that include a network computer 22, the data can be transmitted to the network computer 22 for storage. The data may be transmitted, for example, via the network data link 24. In embodiments that include an authentication server 58, the data can be transmitted to the authentication server 58 for storage. The data may be transmitted, for example, via the network data links 24 or 70, the network 40, and the network data link 60. It is to be understood that the data need not be stored in one location. For example, in embodiments that include a network computer 22, the data could be stored at the registration unit 26 and transmitted to the network 22 for storage. Also, the biometric data and some of the personal data could be stored at the registration unit 26, and some or all of the personal data could be transmitted to the network computer 22 for storage.

It is to be understood that the operations represented by the blocks of FIG. 11 need not be performed at one time, or by one registration unit 26. For example, a user could submit personal data (blocks 502 and 504) at a first time. Then, at a later time, the user could submit the biometric data (blocks 508 and 510). In this example, steps 512 and 514 could be performed twice: once for the personal data and once for the biometric data.

As another example, a user could submit personal data (blocks 502 and 504) from a personal computer (registration unit) at the user's residence, via a website served by the website server 50 or the authentication server 58 (FIG. 1). Then, the website could instruct the user to go to a specific location (e.g., a casino) to submit biometric data. At a later time, the user could visit the specified location to submit the biometric data. If at a casino, a casino employee could verify the identity of the person, verify the personal data previously submitted by the person, and then operate a registration unit 26 to obtain the person's biometric data (blocks 508 and 510) and transmit it to the authentication server 58 (block 514).

Figure 13:
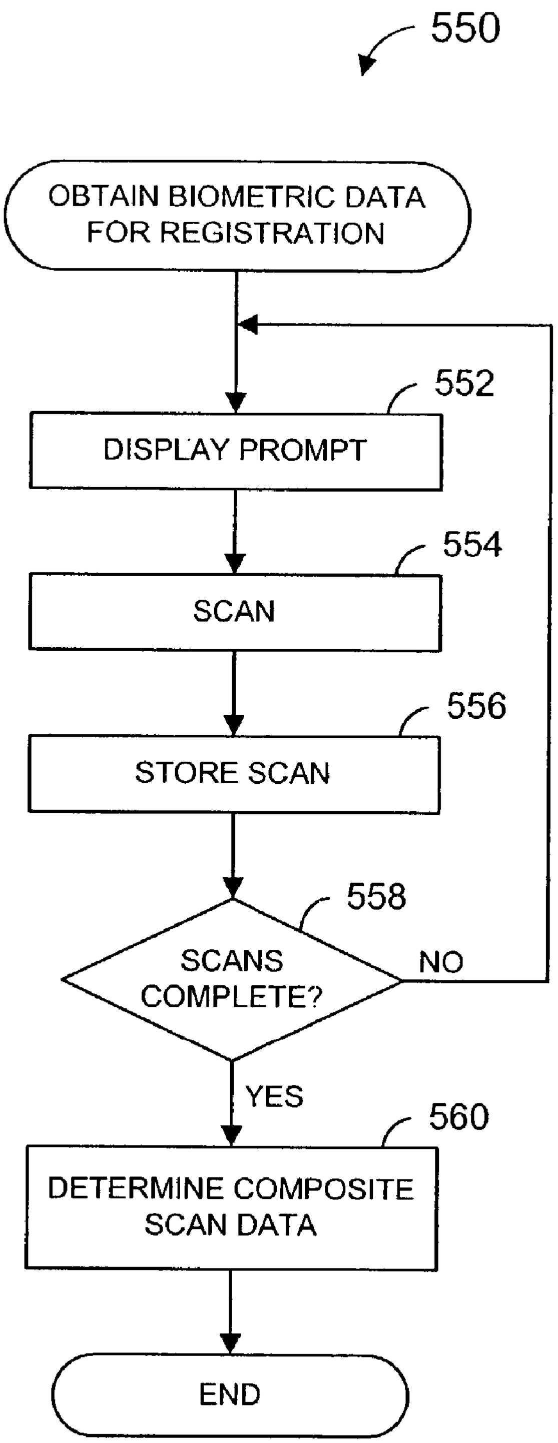
FIG. 13 is a flowchart of an example routine for obtaining biometric data for registration.

FIG. 13 is a flowchart of one possible embodiment of an operation software routine 550 that may be performed by a registration unit 100A (FIG. 4A) to obtain a fingerprint scan of a user. The routine 550 may be part of a computer program, which may be stored in the program memory 102 (FIG. 4A) of any of the registration units 26 (FIG. 1), that controls the operation of the registration units 26 to generate biometric data related to a person. The routine 550 may be used by the registration units 100A (FIG. 4A) having, or configured to operatively couple with, fingerprint scanning devices 116 described above in connection with FIG. 4A. Similar routines may be used with the registration units 100B-100D (FIGS. 4B-4D). The routine 550 may attempt to generate digital data that uniquely represents the physical characteristics of a person, such as a person's fingerprint, and thus uniquely identifies the person.

At block 552, the controller 101 of the registration unit 100A may cause the display unit 112 to display a visual message that prompts the user to place his or her finger on a scanner of fingerprint scanning device 116, for example. At block 554, the fingerprint scanning device 116 may scan the person's fingerprint and generate digital data representing the person's fingerprint, as described above. At block 556, the digital data representing the person's fingerprint may be stored, for example, in the memory 106 of the registration unit 100A.

Blocks 552-556 may be repeated a number of times, if desired, to generate digital data representing a composite fingerprint scan, which may be generated by averaging each set of digital fingerprint data, for example. Performing multiple scans may increase the reliability and/or accuracy of the scan data. If multiple scans are not used, the operation represented by blocks 558 and 560 may be omitted.

If multiple scans are used to generate data representing a composite scan, at block 558 the controller 101 may determine whether all of the scans have been made. That determination may be made, for example, simply by determining whether a predetermined number of scans has been made, such as five scans. If all of the scans have not been made, the program may branch back to block 552 so that another scan may be performed. If all the scans have been made, the controller 101 may determine a composite scan based on all the scans made, such as by averaging the digital data for each scan. Such an average could be made, for example, by averaging the pixel intensity of each set of scan data on a pixel-by-pixel basis.

Although the enrollment routine 550 has been described above in connection with the fingerprint scanning device 116 of FIG. 4A, it should be understood that the same or a similar routine could be used to "train" the system to recognize other unique physical characteristics of a person, such as a person's eye, face or voice as described above.

For example, if the routine 550 is used in connection with the registration unit 100A having the voice analyzer 122 and the microphone 124 (FIG. 4D), at block 554, instead of performing a scan of a person's fingerprint, the person may speak into the microphone 124, and the voice analyzer 122 may generate a set of digital data represented the spoken word or words. That digital voice data may be treated and processed by the routine 550 in the same (or a similar) manner as the digital fingerprint data as described above.

In other embodiments, a person may be prompted to scan multiple fingers, and/or to provide different types of biometric data. For example, a person may be prompted to submit one or more fingerprint scans and a retinal scan. One of ordinary skill in the art will recognize many possible variations.

Gaming Unit Operation

One manner in which a gaming unit 20 may operate is described below in connection with a number of flowcharts which represent a number of portions or routines of one or more computer programs, which may be stored in one or more of the memories 202, 206 of the gaming unit 20. The computer program portions may be written in any high level language such as C, C+, C++ or the like or any low-level, assembly or machine language. By storing the computer program portions therein, various portions of the memories 202, 206 are physically and/or structurally configured in accordance with computer program instructions. Additionally, it is to be understood that the computer program portions or routines may be implemented via web pages supplied to a gaming unit 20 by, for example, the network computer 22, the website server 50, the gaming server 52, or the authentication server 58 (FIG. 1).

Main Routine

Figure 14:
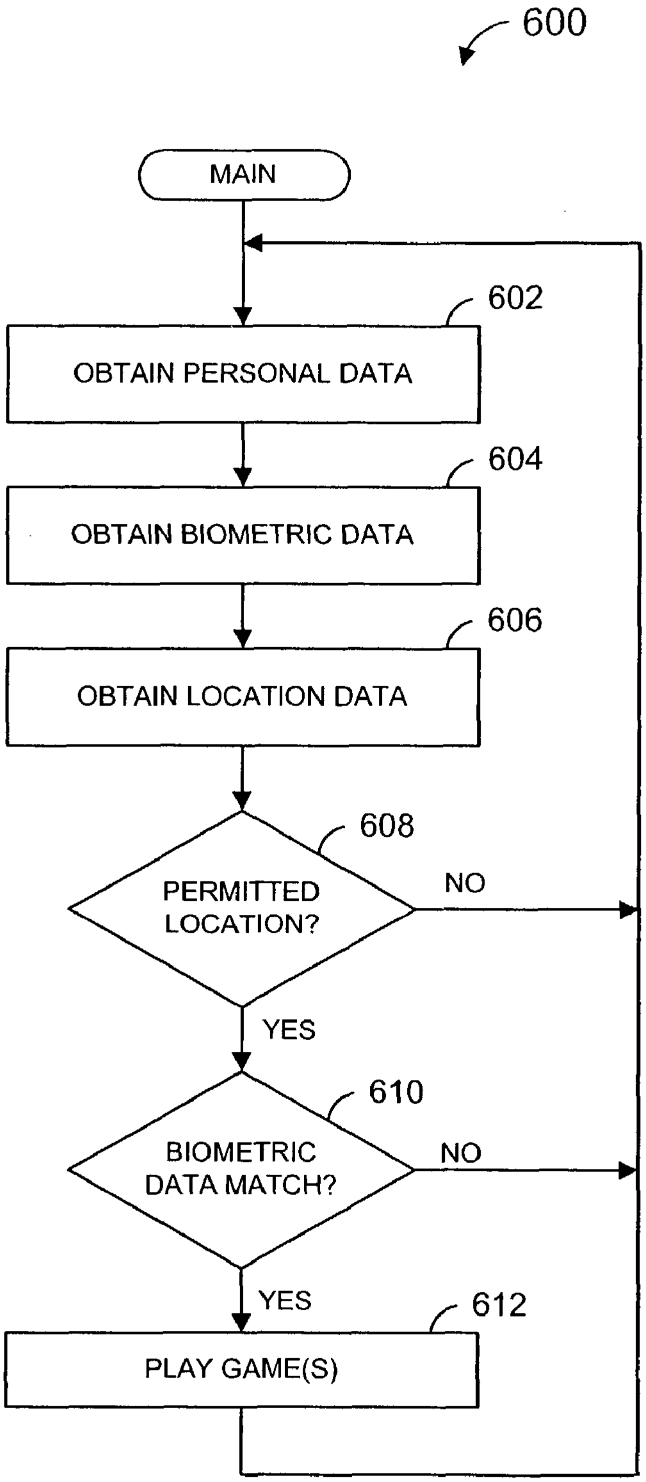
FIG. 14 is a flowchart of an example routine for operating a gaming unit.

FIG. 14 is a flowchart of one possible embodiment of an operation software routine 600 that may be performed by a gaming unit 20, and will be described with reference to FIG. 1. At block 602, data may be obtained including personal data of the user. This data may include, for example, a name, a login id, etc. The data may be obtained, for example, by prompting the user to submit the data via a keyboard or touch screen. In embodiments of gaming units 20 that include a smart card reader/writer, the data may be obtained from a smart card inserted by the user. The data obtained at block 602 may be used, for example, to locate, in a database, the biometric data that the user submitted while registering for the gaming service. Block 602 is optional and may be omitted if desired.

At block 604, data may be obtained from the user including biometric data. Examples of techniques for obtaining biometric data, personal data, and location data will be described below. At block 606, data related to the location of the gaming unit 20 may be obtained. Block 606 is optional and may be omitted if desired.

In embodiments that employ positioning data, at block 608, it may be determined whether the position data obtained at block 606 indicates that the gaming unit 20 is in a location in which playing games via the gaming system 10 is permitted. If no, the routine may branch back to block 602. If the location is permitted, the routine may proceed to block 610; In some embodiments, block 608 may be implemented at the gaming unit 20. In other embodiments, block 608 may be implemented in conjunction with the authentication server 58. For example, the gaming unit 20 may transmit the position data to the authentication server 58. Then, the authentication server 58 may determine whether the location of the gaming unit is a permitted location. Next, the authentication server 58 may transmit a message to the gaming unit 20 that indicates whether the position is permitted. Similarly, block 608 may be implemented in conjunction with the network computer 22, the gaming server 52, the website server 50, etc.

At block 610, the biometric data obtained at block 604 may be compared with biometric data previously obtained during registration to determine if it matches. In some embodiments, block 610 may be implemented at the gaming unit 20. For example, the gaming unit 20 could be operatively coupled with a smart card reader/writer. In this example, the user could insert into the smart card reader/writer a smart card that included a registered user's biometric data. Then, the gaming unit 20 could compare the biometric data obtained at block 604 with the biometric data of the registered user stored on the smart card.

Additionally, block 610 could be implemented in conjunction with the authentication server 58. For example, the gaming unit 20 may transmit the biometric data obtained at block 604 to the authentication server 58. Then, the authentication server 58 can determine whether the received biometric data matches biometric data of a registered user. Next, the authentication server 58 may transmit a message to the gaming unit 20 that indicates whether the user is permitted to play a game. Similarly, block 610 may be implemented in conjunction with the network computer 22, the gaming server 52, the website server 50, etc.

If at block 610 it may be determined that the biometric data obtained at block 604 matches that of a registered user, control may pass to block 612. Otherwise, control may pass to block 602. At block 612, the user may be provided access to play a game on the gaming system 10.

At block 606, the authentication server 58 may or may not grant the user access to the gaming service in response to the data transmitted at block 604. If the authentication server 58 does not grant access, the routine may return to block 602 to await new data.

Obtain Biometric Data

Figure 15:
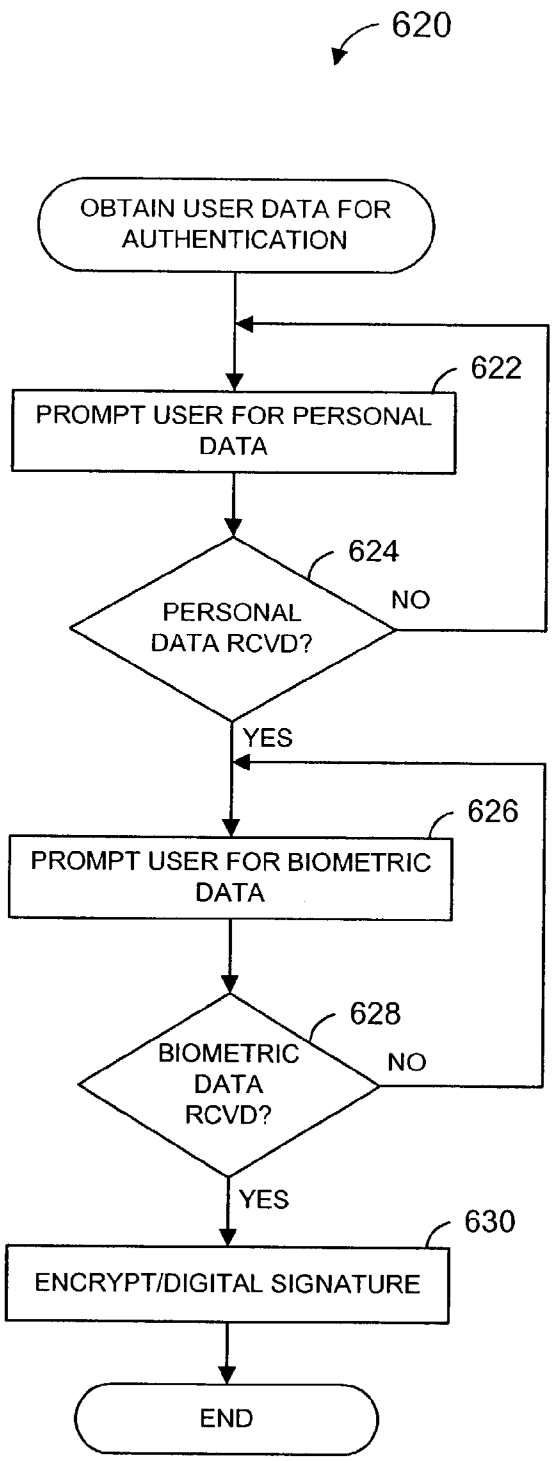
FIG. 15 is a flowchart of an example routine for obtaining user data for authenticating a user.

FIG. 15 is a flowchart of one possible embodiment of an operation software routine 620 that may be performed by a gaming unit 20. The routine 620 can be used to obtain data from a user in order to authenticate the user, and will be described with reference to FIGS. 1 and 6. At block 622, a user may be prompted to enter personal data. As one example, the user could be prompted, via display unit 170, to enter personal data (e.g., a logon id, a last name, etc.) that can be used to identify a record of a registered user. Such a display could be generated by software running on the gaming unit 20. Also, the registration display 520 could be received as display data (e.g., as a web page) from, for example, the network computer 22, the website server 50, the authentication server 58 (FIG. 1), etc.

At block 624, it may be determined whether the personal data has been received. If no, the routine may branch back to block 622 to await, or prompt the user, for further personal data. At block 626, the user may be prompted to submit biometric data. For gaming units that include a fingerprint scanner, such as the gaming unit 20 of FIG. 6, a display could be displayed on display unit 170 that asks user to put a finger on the fingerprint scanner. Such a display could be generated by software running on the gaming unit 20. Also, the display could be received as display data (e.g., as a web page) from, for example, the network computer 22, the website server 50, the authentication server 58 (FIG. 1), etc.

At block 628 it may be determined whether the biometric data has been received. For gaming units that include a fingerprint scanner, such as the gaming unit 20 of FIG. 6, controller 200 could determine whether data representative of a fingerprint had been received from the fingerprint scanner. If the biometric data has not been received, the routine may branch back to wait for the data.

The personal data and/or biometric data can be encrypted, or a digital signature can be applied to the data, at block 630. This would help to ensure that the data came from a reliable source, and thus help to increase the security of the overall system. This block may be omitted if desired. The biometric data could be encrypted, or a digital signature could be applied to it, by the controller 200, the biometric device 214, or some other device, and can be implemented via software, firmware, hardware, or some combination thereof.

It is to be understood that, in some embodiments, personal data obtained at block 622 may not be needed for authentication. For example, authentication can be accomplished using only biometric data. Thus, blocks 622 and 624 can be omitted, and at block 612, only biometric data may be transmitted to the authentication server 58. Also, as will be described below, a user may be required to authenticate him or herself several times while playing a game. In these examples, the personal data obtained at blocks 622 and 624 need only be obtained once. Thus, in operation, blocks 622 and 624 may be performed once during the playing of a game, and omitted in subsequent authentications during the game.

Obtain Location Data

Figure 16:
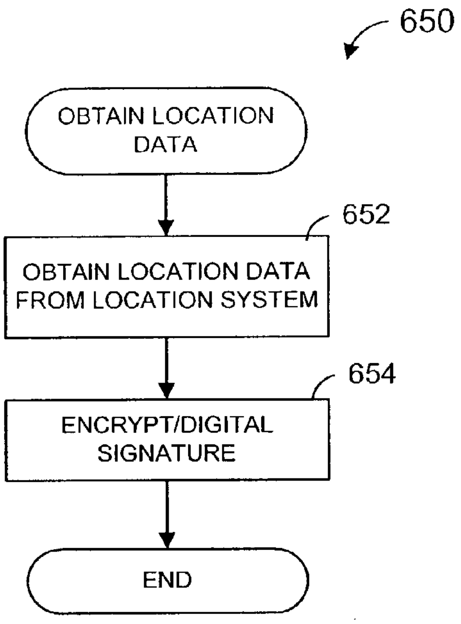
FIG. 16 is a flowchart of an example routine for obtaining location data.

FIG. 16 is a flowchart of one possible embodiment of an operation software routine 650 that may be performed by a gaming unit 20. The routine 650 can be used to obtain information regarding the location of the gaming unit 20, and will be described with reference to FIGS. 1 and 6. It is to be understood that, in some embodiments, the routine 650, or a similar routine, need not be implemented. For instance, in some embodiments, authentication of the location of the gaming unit 20 may not be needed. In other embodiments, location of the gaming unit 20 can be obtained by means that do not employ a location system operatively coupled with the gaming unit 20, an example of which will be described below.

At block 652, the gaming unit 20 obtains location data from the location sensing device 216. At block 654, the location data may be encrypted, or a digital signature may be applied to it. This would help to ensure that the location data came from a reliable source, and thus help to increase the security of the overall system. This block may be omitted if desired. Block 654 can be implemented, for example, by the controller 200, the location sensing device 216, or some other device, and can be implemented via software, firmware, hardware, or some combination thereof.

Authentication Server Operation

One manner in which the authentication server 58 may operate is describe below in connection with flowcharts that represent a number of portions or routines of one or more computer programs, which may be stored in one or more of the memories 302, 306 of the authentication server controller 301. The computer program portions may be written in any high level language such as C, C+, C++ or the like or any low-level, assembly or machine language. By storing the computer program portions therein, various portions of the memories 302, 306 are physically and/or structurally configured in accordance with computer program instructions.

Register User

Figure 17:
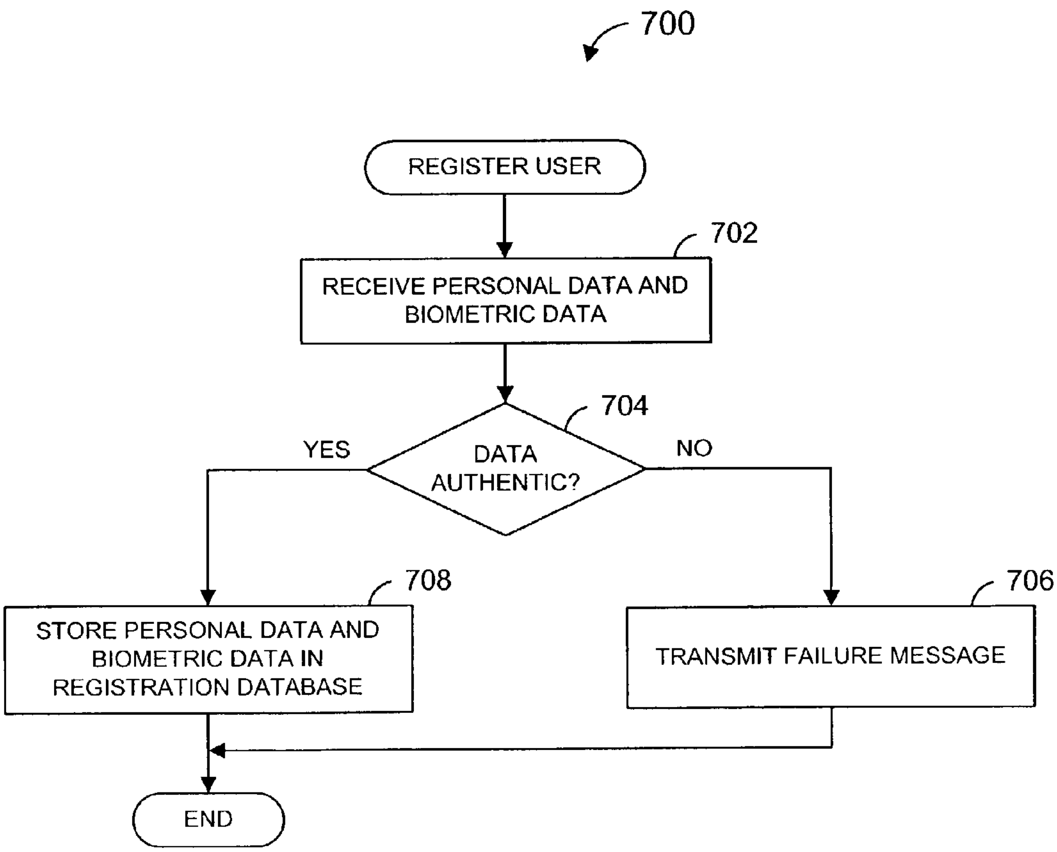
FIG. 17 is a flowchart of an example routine for registering a user with a gaming system.

The manner of operation described below will be described with reference to FIGS. 1 and 7. FIG. 17 is a flowchart of one possible embodiment of an operation software routine 700 that may be performed by the authentication server 58. The routine 700 can be used to register a user who desires to play games via a gaming system.

At block 702, the authentication server 58 receives the personal data and biometric data transmitted by a registration unit 26. It is to be understood that the personal data and biometric data need not be received at the same time, or from only one registration unit 26. Rather, as described previously, the authentication server 58 can receive the data at multiple points in time, and can receive the data from multiple registration units 26.

In embodiments in which the personal data and/or biometric data has been encrypted, and/or a digital signature applied to it, the authentication server 58, at block 704, can decrypt the data and/or examine the digital signature to help determine if the data was received from a reliable source or sources. Block 704 can be implemented, for example, by the controller 301 or some other device, and can be implemented via software, firmware, hardware, or some combination thereof.

If at block 704, it may be determined that the received data is not authentic, the authentication server 58 may, at block 706, transmit a failure message to the registration unit or units 26 from which the data was received. The failure message may indicate that the authentication server 58 was unable to register the user, and may also indicate that it could not authenticate the data.

If, at block 704, it may be determined that the personal data and/or biometric data is authentic, then the flow may proceed to block 708. In other embodiments, blocks 704 and 706 can be omitted. For example, blocks 704 and 706 can be omitted if the personal data and biometric data are not encrypted, or a digital signature is not applied to the data, prior to its receipt by the authentication server 58.

At block 708, the received personal data and biometric data are stored in the registration database. The registration database can be any type of suitable database such as a commercially available database from Oracle, Sybase, Microsoft, IBM, etc. It is to be understood that the personal data and biometric data need not be received and stored at the same time. For example, the personal data may be received at one time and the biometric data may be received at a later time. In this example, the personal data can be stored first, and the biometric data can be stored later, after it is received.

Check Location

Figure 18:
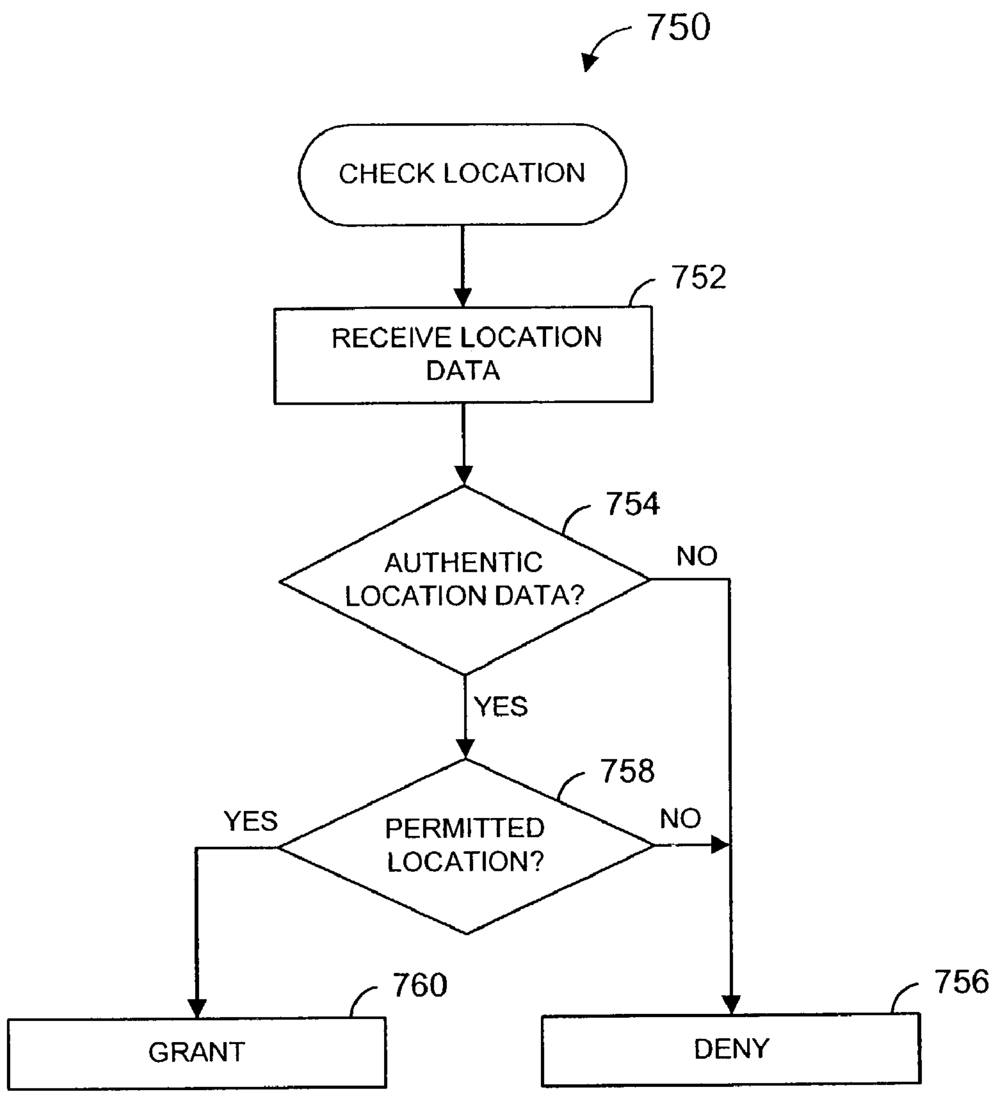
FIG. 18 is a flowchart of an example routine for checking the location of a gaming unit.

The manner of operation described below will be described with reference to FIGS. 1 and 7. FIG. 18 is a flowchart of one possible embodiment of an operation software routine 750 that may be performed by the authentication server 58. The routine 750 can be used to determine whether the location of the gaming unit is a location at which playing games via the gaming system is permitted.

At block 752, the authentication server 58 receives data indicative of the location of a gaming unit. The location data can be, for example, an internet protocol (IP) address, location data from a positioning device coupled with the gaming unit, etc.

In embodiments in which location data has been encrypted, and/or a digital signature applied to it, the authentication server 58, at block 754, can decrypt the data and/or examine the digital signature to help determine if the data was received from a reliable source or sources. Block 754 can be implemented, for example, by the controller 301 or some other device, and can be implemented via software, firmware, hardware, or some combination thereof.

If at block 754, it may be determined that the received data is not authentic, the authentication server 58 may, at block 756, transmit a denial message to the gaming unit. The denial message may indicate, for example, that the authentication server 58 determined that the location data was not authentic.

If, at block 754, it may be determined that the location data is authentic, then control may pass to block 758. In other embodiments, block 754 can be omitted, if, for example, the location data are not encrypted, or a digital signature is not applied to the data, prior to its receipt by the authentication server 58.

At block 758, it may be determined whether the location data indicates the gaming unit is at a permitted location. In embodiments in which the location data includes an IP address of the gaming unit, the gaming unit IP address, for example, can be compared to a list of permitted IP addresses. Also, the IP address, for example, can be mapped to a geographic area, and the geographic area compared with permitted geographic areas.

In embodiments in which the location data includes geographic position information, the geographic position information, for example, can be compared with permitted geographic areas. In embodiments in which the location data includes in-building position information, the in-building position information can be compared with permitted in-building areas. For instance, the in-building position information may indicate that the gaming unit is outside the building, whereas playing games may only be permitted within the building.

If it is determined that the location data indicates the gaming unit is not in a permitted location, control may pass to block 756. At block 756, the authentication server 58 denies the user access to the gaming system. In some embodiments, the authentication server 58 may transmit a denial message to the gaming unit. The denial message may indicate that the authentication server 58 determined that the location data indicated the location of the gaming unit was not permitted.

If at block 758 it is determined that the gaming unit is in a permitted location, control may pass to block 760. At block 760, the authentication server 58 grants the user further access to the gaming system 10. For example, in some embodiments, the authentication server 58 may transmit a message to the gaming unit indicating that the gaming unit is at a permitted location. In other embodiments, the authentication server 58 may pass control to the website server 50 or the gaming server 52, indicating that the gaming unit is at a permitted location.

Check Biometric Data

Figure 19:
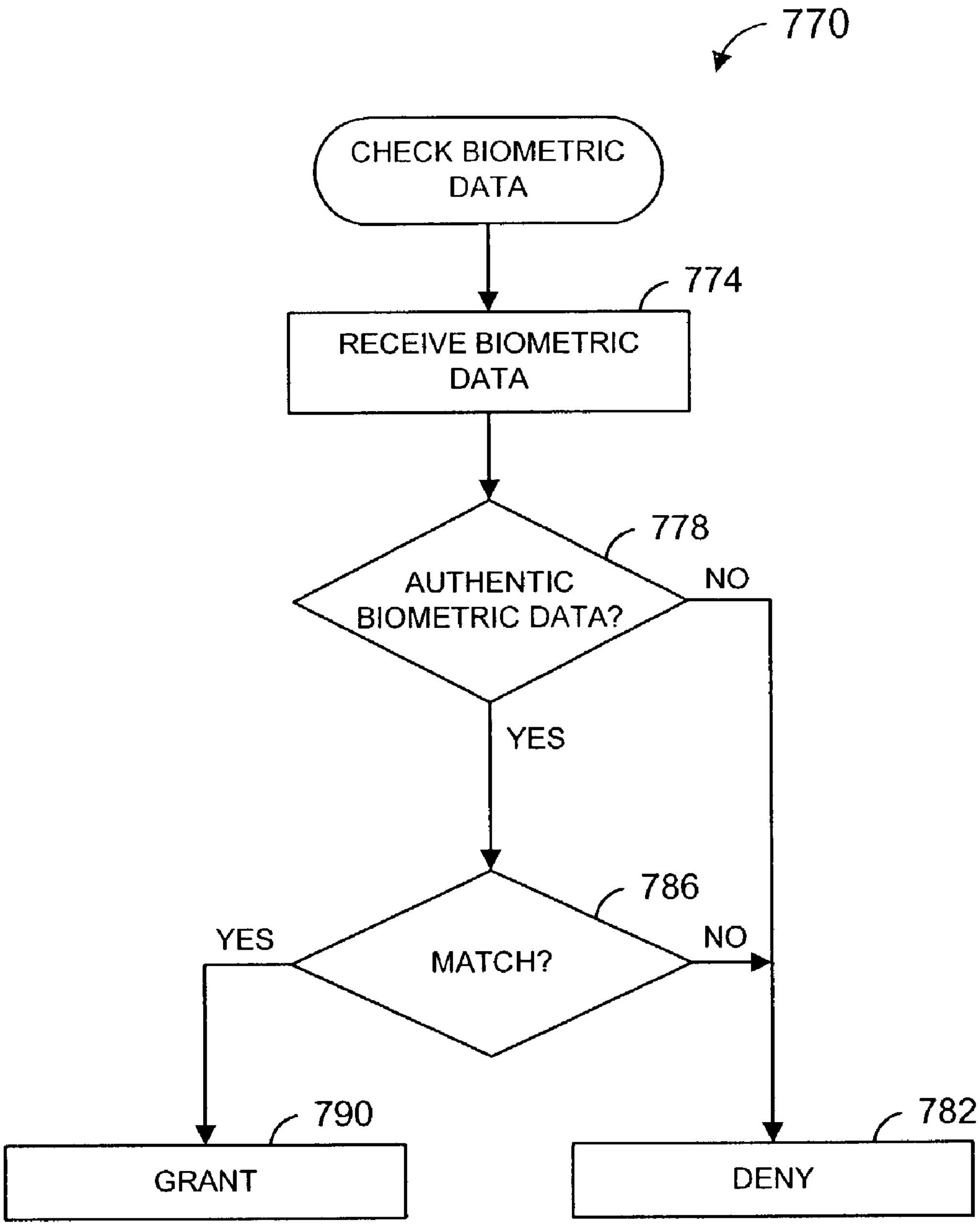
FIG. 19 is an illustration of an example routine for checking biometric data of a user.

The manner of operation described below will be described with reference to FIGS. 1 and 7. FIG. 19 is a flowchart of one possible embodiment of a software routine 770 that may be performed by the authentication server 58. The routine 770 can be used to determine whether the biometric data submitted by the user matches biometric data submitted during registration.

At block 774, the authentication server 58 receives biometric data. In embodiments in which biometric data has been encrypted, and/or a digital signature applied to it, the authentication server 58, at block 778, can decrypt the data and/or examine the digital signature to help determine if the data was received from a reliable source or sources. Block 778 can be implemented, for example, by the controller 301 or some other device, and can be implemented via software, firmware, hardware, or some combination thereof.

If at block 778, it may be determined that the received biometric data is not authentic, the authentication server 58 may, at block 782, transmit a denial message to the gaming unit 20. The denial message may indicate that the authentication server 58 determined that the location data was not authentic and/or that the location data indicated the location of the gaming unit 20 was not permitted.

If, at block 778, it is determined that the biometric data is authentic, then control may pass to block 786. In other embodiments, block 778 can be omitted, if, for example, the biometric data are not encrypted, or a digital signature is not applied to the data, prior to its receipt by the authentication server 58.

At block 786, it may be determined whether the biometric data matches biometric data previously submitted during registration. For example, the received biometric data may be compared with biometric data stored, for example, in a memory, database, etc., to determine if it matches any of the stored data. Also, if personal data associated with the received biometric data is available, this personal data may be used to retrieve stored biometric data from the memory, database, etc., that corresponds to the personal data. Then, the biometric data received at block 774 can be compared with the biometric data retrieved from the memory, database, etc., that corresponds to the personal data. In another embodiment, the biometric data received at block 774 may be compared with biometric data stored on a smart card. This may include receiving the biometric data from the smart card via, for example, a gaming unit 20, and authenticating the smart card biometric data. If the smart card biometric data is authentic, the biometric data received at block 774 may be compared with the smart card biometric data.

If it is determined that the biometric data received at block 774 does not match biometric data previously obtained during registration, control may pass to block 782. At block 782, the authentication server 58 denies the user access to the gaming system. In some embodiments, the authentication server 58 may transmit a denial message to the gaming unit 20. The denial message may indicate, for example, that the authentication server 58 determined that the biometric data did not match biometric data of any registered users.

If at block 786 it is determined that the biometric data received at block 774 does match biometric data obtained during registration, control may pass to block 790. At block 790, the authentication server 58 grants the user access to the gaming system 10. In some embodiments, the authentication server 58 may transmit a message to the gaming unit 20 indicating, for example, that the user's biometric data matches that of a registered user. In other embodiments, the authentication server 58 may pass control to the website server 50 or the gaming server 52 indicating that, for example, that the user's biometric data matches that of a registered user.

Website Server Operation

Figure 20:
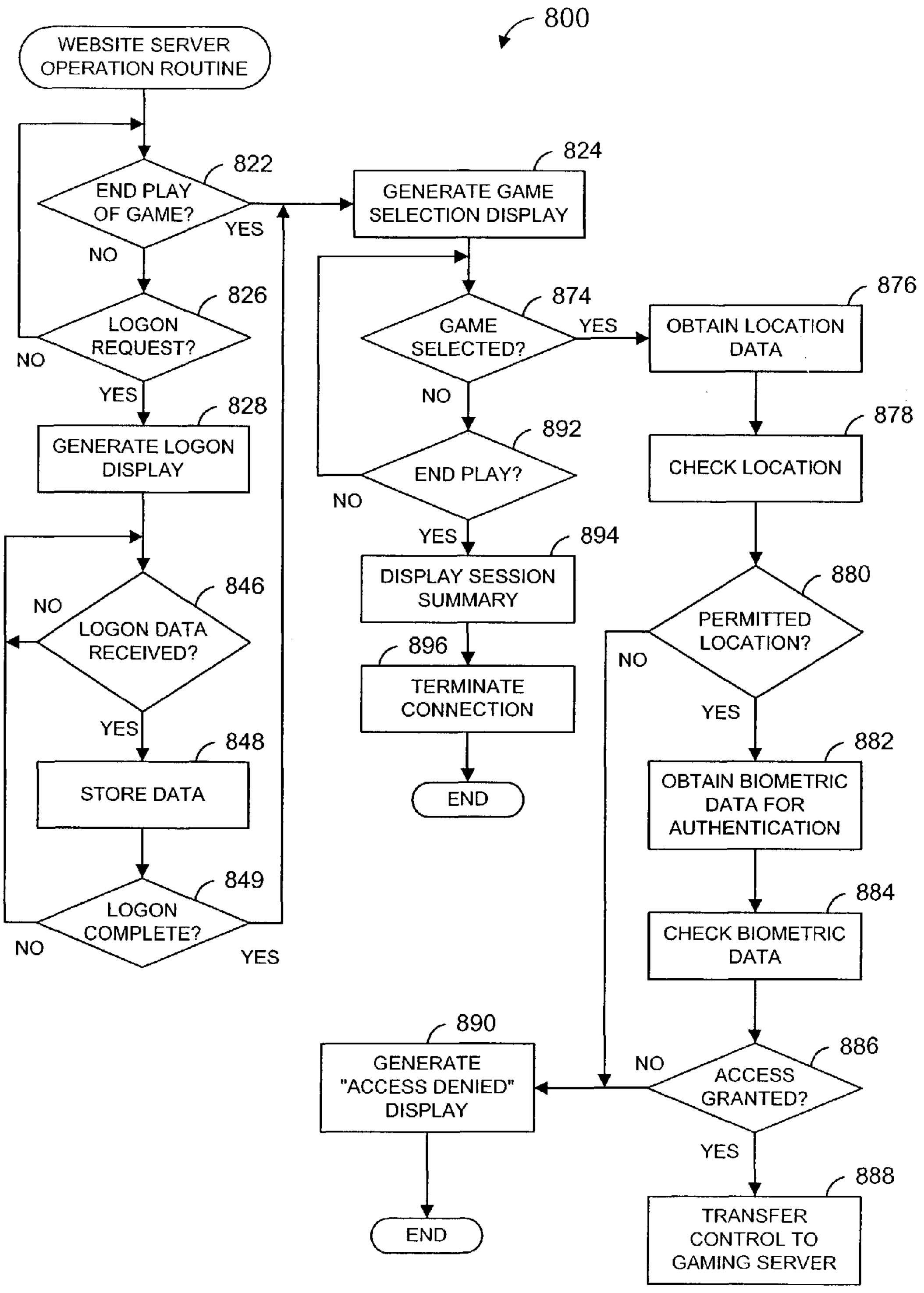
FIG. 20 is a flowchart of an example routine for operating a website server.

FIG. 20 is a flowchart of one possible embodiment of an operation software routine 800 that may be performed by the website server 50. Referring to FIG. 20, at block 822 the website server 50 may determine whether a player has indicated a desire to stop playing a particular game that the player has been playing via one of the gaming servers 52. During play of a particular game, the gaming server 52 which provides the gaming software for that game controls the operation of the game. When the player indicates a desire to stop playing that game, the gaming server 52 may transfer operational control back to the website server 50, in which case the routine may branch to block 824 at which a game selection display may be generated on the display unit 170 (FIG. 6) of the gaming unit 20 being used by the player.

At block 826, the routine may determine whether a logon request has been received from a player, via one of the gaming units 20, indicating a desire to initiate a gaming session. The logon request could be, for example, the entry by the player of the Internet address of the website associated with the website server 50. If a logon request is received, the routine may cause a logon display to be generated on the display unit 44 of the player who transmitted the logon request. To generate the logon display (block 828), the website server 50 may cause display data representing a logon display image to be transmitted to the gaming unit 20. Various image data, including logon image data, may be stored in one of the memories 352, 356 of the website server 50.

Figure 21:
FIG. 21 is an illustration of an example logon display that may be displayed on one of the gaming units.

One example of a logon display 130 that could be generated on the player's display unit 44 is shown in FIG. 21. Referring to FIG. 21, the logon display 900 may include a data entry box 902 for entry of the first name of the player. The logon display 900 may also include a button 916 that a user may select to submit the data entered in the data entry box 902 of logon display 900.

Other information could be additionally or alternatively obtained from the user such as a last name, a logon name, a password, a street address, a city, a state, a zip code, a credit card number, an expiration date of the credit card, etc.

In some embodiments, some or all of this information may be obtained from a smart card of the player. In these embodiments, a logon display may additionally or alternatively prompt the player to insert his or her smart card into a smart card reader.

Referring back to FIG. 20, if the website server 50 has received logon data from the player as determined at block 846, that data may be stored in one of the memories 352, 356 of the website server 50 at block 848. If the website server 50 has received all of the required logon data as determined at block 849, the routine may branch to block 824. If not, the routine may branch back to block 846 to await further logon data from the player.

At block 824, the routine may cause a game selection display to be generated on the display unit 170 of the gaming unit 20. To generate the game selection display, the website server 50 may cause display data representing a game selection display image to be transmitted to the gaming unit 20. The display data may be stored in one of memories 352, 356 of the website server 50. Block 824 may be performed in response to a player initially logging onto the website (i.e. after the completion of block 849) or in response to a player's desire to end a game that is being provided under the control of one of the gaming servers 52 as described above (i.e. after the completion of block 822).

Figure 22:
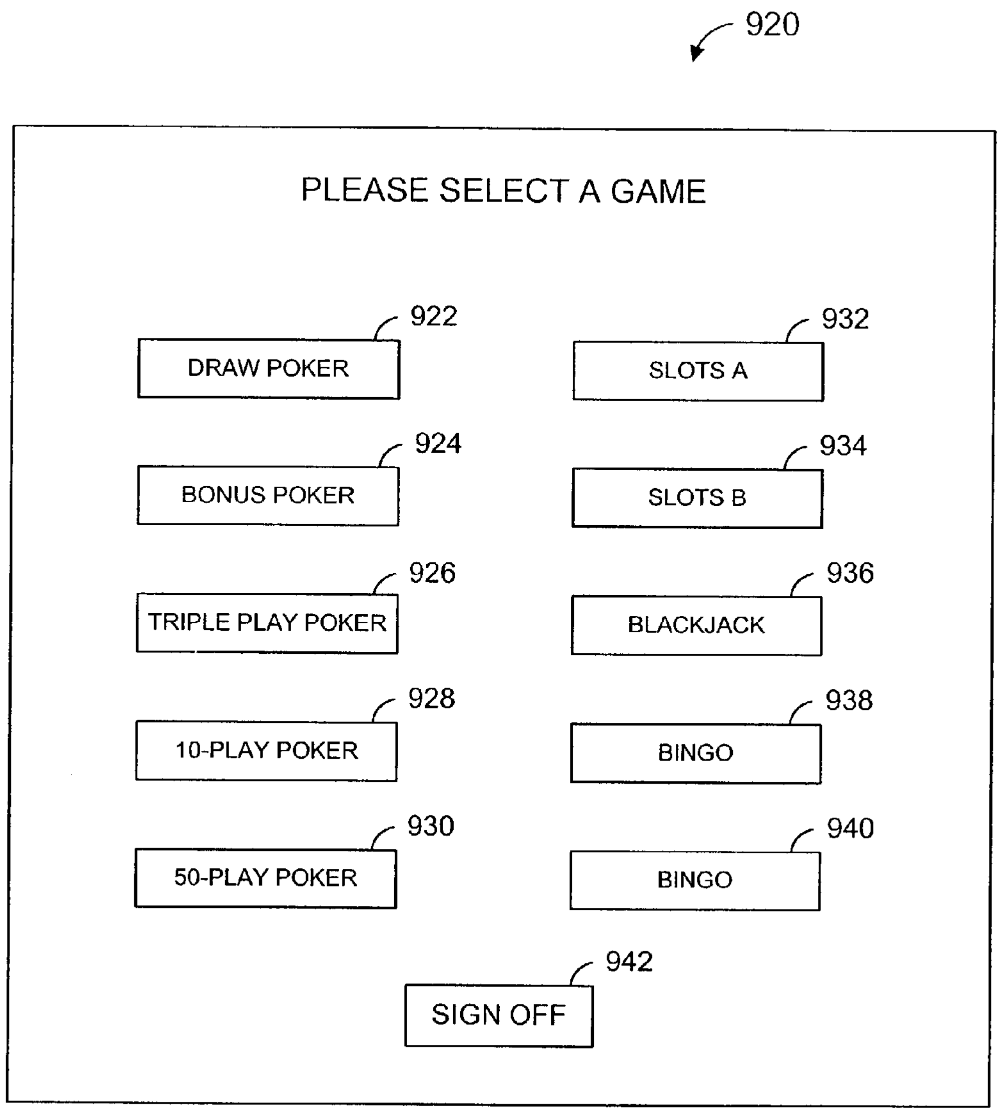
FIG. 22 is an illustration of an example game selection display that may be displayed on one of the gaming units.

One example of a game selection display 920 that could be generated on the player's display unit 170 is shown in FIG. 22. Referring to FIG. 22, the game selection display 920 may include a plurality of player-activatable icons, or game images, each of which represents a respective game that the player may play via the website associated with the website server 50. The icons may include, for example, an icon 922 associated with a draw poker game, an icon 924 associated with a bonus poker game, an icon 926 associated with a triple play poker game, an icon 928 associated with a 10-play poker game, an icon 930 associated with a 50-play poker game, an icon 932 associated with a first slots game, an icon 934 associated with a second slots game, an icon 936 associated with a blackjack game, an icon 938 associated with a bingo game, and an icon 940 associated with a keno game. Where the gaming unit 20 includes a mouse, the icons may be player-activatable via the mouse. Alternatively, each of the game icons may have a unique letter associated therewith and a game could be selected by inputting one of the unique letters via a keyboard.

The games that are available to play via the website serviced by the website server 50 may be provided by the gaming servers 52 in various ways. For example, if twenty games were available via the website and if the website server 50 were operatively coupled to four gaming servers 52, each of those four gaming servers 52 could be programmed to facilitate play of exactly five of the games.

As another example, if the ten games represented by the ten icons shown in FIG. 22 were available for play and if four gaming servers 52 were connected to the website server 50, a first of the gaming servers 52 could be programmed with gaming software that facilitates play of each of the poker games represented by the icons 922, 924, 926, 928, 930, a second of the gaming servers 52 could be programmed with gaming software that facilitates play of the two slots games represented by the icons 932, 934, a third gaming server 52 could be programmed with gaming software that facilitates play of the blackjack game represented by the icon 936, and the fourth gaming server 52 could be programmed with gaming software that facilitates play of the bingo and keno games represented by the icons 938, 940. Each game may be available for play via only one of the gaming servers 52. In other words, only one of the four gaming servers 52 could contain gaming software that facilitates play of the triple play poker game represented by the icon 926, in which case that particular gaming server 52 would have to be utilized if a player desired to play the triple play poker game.

Alternatively, each of the gaming servers 52 may provide a plurality of games that are available only from a respective gaming provider. In that case, each of the gaming servers 52 may be programmed with gaming software that facilitates one or more poker games (and/or other games), but each of the poker games may be different, such as by having different visual displays, different wagering options, different gaming options, etc.

Each of the games available for play via the website may have one gaming server 52 on which gaming software that facilitates play of that game is stored. One of the memories 352, 356 of the website server 50 could store data that identifies the particular gaming server 52 that provides gaming software that implements each of the games available via the website. One example of such data is set forth below.

| Game | Gaming Server |
|---|---|
| Draw Poker | #1 |
| Bonus Poker | #1 |
| Triple Play Poker | #2 |
| 10-Play Poker | #2 |
| 50-Play Poker | #2 |
| Slots A | #3 |
| Slots B | #3 |
| Blackjack | #4 |
| Bingo | #5 |
| Keno | #6 |

In some embodiments, one gaming server 52 may implement multiple types of games.

Referring to FIG. 20, at block 874 if a player selected one of the games available via the website as described above, the routine may branch to block 876. At block 876, the routine may obtain location data related to the gaming unit 20. For instance, the website server 50 may prompt the gaming unit 20 to obtain location data and transmit the location data to the website server 50. The gaming unit 20 may utilize a routine such as routine 650 (FIG. 16) to obtain location data. Also, the website server 50 may obtain location data as the IP address of the gaming unit 20.

At block 878, the routine may determine whether the location data obtained at block 876 indicates that the gaming unit 20 is at a permitted location. For instance, the website server 50 may transmit the location data obtained at block 876 to the authentication server 58, and request that the authentication server 58 determine whether the gaming unit 20 is at a permitted location. The authentication server 58 may utilize a routine such as routine 750 (FIG. 18) to determine whether the gaming unit 20 is at a permitted location. In embodiments that do not include an authentication server 58, the determination of whether the gaming unit 20 is at a permitted location may be carried with another computing system, such as the website server 50, the network computer 22, etc.

In another embodiment, at blocks 876 and 878, operational control may pass from the website server 50 to the authentication server 58, or to whatever computing system that implements blocks 876 and 878. Then, operational control may pass back to the website server 50 at block 880.

If it determined that the gaming unit 20 is at a permitted location, the routine may branch to block 882, at which the routine may obtain biometric data of the user to authenticate the user. For instance, the website server 50 may prompt the gaming unit 20 to obtain biometric data from the user and transmit the biometric data to the website server 50. The gaming unit 20 may utilize a routine such as routine 620 (FIG. 15) to obtain biometric data.

At block 884, the routine may determine whether the biometric data obtained at block 882 matches biometric data obtained previously For instance, the website server 50 may transmit the biometric data obtained at block 882 to the authentication server 58, and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the website server 50, the network computer 22, the gaming unit 20 etc. For instance, the gaming unit 20 may compare the biometric data obtained from the player and compare it to biometric data stored on a smart card.

In another embodiment, at blocks 882 and 884, operational control may pass from the website server 50 to the authentication server 58, or to whatever computing system that implements blocks 882 and 884. Then, operational control may pass back to the website server 50 at block 886 If the biometric data does match that of a registered user, and, optionally, the user identified by the biometric data is permitted to play, control may pass to block 888. At block 888, operational control may pass to the gaming server 52 that provides gaming software to play that game. For example, if the above table was used and if the player selected Triple Play Poker, the routine would transfer operational control to the gaming server #2.

If the biometric data does not match that of a registered user permitted to play, or, optionally, the user identified by the -biometric data is not permitted to play, control may pass to block 890. Similarly, if at block 870 it is determined that the gaming unit 20 is not at a permitted location, control may pass to block 890. At block 890, a display may be generated which indicates to the user that he or she has been refused access to play the game. The display may optionally indicate why access was denied.

If the player elected to end play at the website, such as by activating the "Sign Off" icon 942 shown in FIG. 22, the routine may branch to block 894 at which point a gaming session summary may be displayed on the display unit 170 of the gaming unit 20. The gaming session summary may provide. the player with summary data, such as how much money was won and what games were played. The player could then print out the summary display shown on the display unit 170 to save a physical record of the gaming session. At block 896, the routine may terminate the Internet link between the website and the gaming unit 20.

In some embodiments, blocks 876, 878, 880 and/or blocks 882, 884, 886, and block 890 may be omitted if desired. For example, location data and/or biometric data could be checked during game play.

Gaming Server Operation

As described above, each game available via the website may be played via one of the gaming servers 52 operatively coupled to the website server 50. Examples of the draw poker, slots A, blackjack, bingo and keno games represented by the game icons 152, 162, 166, 168, 170, respectively, shown in FIG. 22 are described below. In view of the above description, it should be understood that each of the following game routines may be performed by a different one of the gaming servers 52, or that one of the gaming servers 52 may perform more than one of the game routines.

One of the game routines described below may begin execution upon the transfer of operational control from the website server 50 to one of the gaming servers 52 as described above in connection with block 888 of FIG. 20. Upon the completion of one of the game routines (i.e. when a player desired to stop playing a particular game), the website server 50 would make that determination at block 822 of FIG. 20 as described above and would begin operation at block 824 as described above.

Draw Poker

Figure 23:
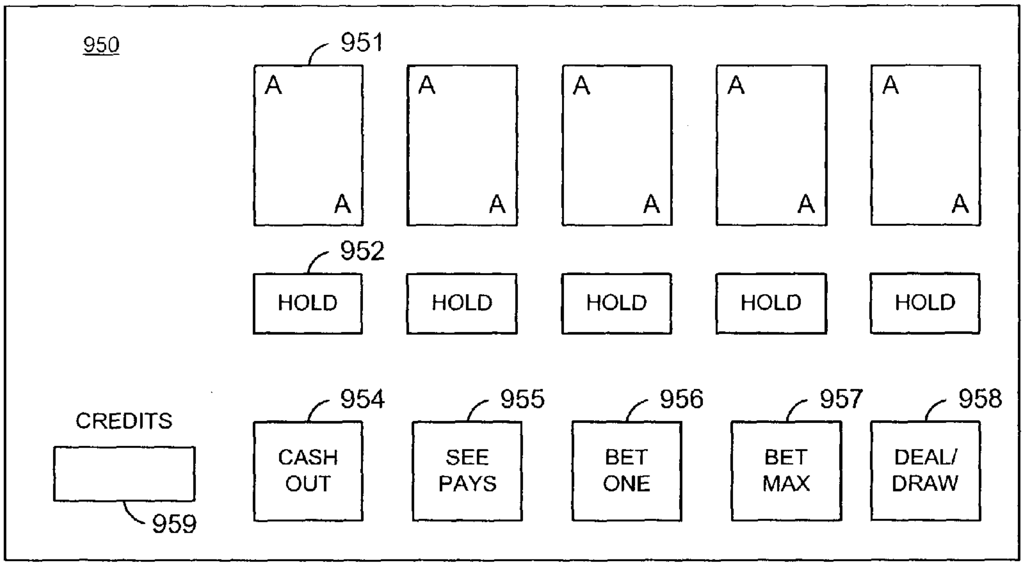
FIG. 23 is an illustration of an example of a visual display that may be displayed during performance of a poker routine.

FIG. 23 is an exemplary display 950 that may be caused to be displayed on the display unit 170 of one of the gaming units 20 (by a gaming server 52 sending display data to the gaming unit 20) during performance of a draw poker routine that may be performed by one of the gaming servers 52.

Referring to FIG. 23, the display 950 may include video images 951 of a plurality of playing cards representing the player's hand, such as five cards. To allow the player to control the play of the poker game, a plurality of player-selectable buttons may be displayed. The buttons may include a "Hold" button 952 disposed directly below each of the playing card images 951, a "Cash Out" button 954, a "See Pays" button 955, a "Bet One Credit" button 956, a "Bet Max Credits" button 957, and a "Deal/Draw" button 958. The display 950 may also include an area 959 in which the number of remaining credits or value may be displayed. The buttons may be activated with the use of a mouse as described above.

Upon activation of each of the buttons, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains data corresponding to the button, such as wager data, game instruction data (e.g. whether to "deal," "hold," etc.), etc.

In some embodiments one or more of the buttons 952, 954, 955, 956, 957, and 958 may be integrated with a biometric device. For example, the "Deal/Draw" button may be integrated with a fingerprint scanner. In this example, the "Deal/Draw" button may be activated by providing placing a finger on the fingerprint scanner and submitting one or more fingerprint scans. The fingerprint scanner may be integrated, for example, with a touch screen, keyboard, control panel, lever, etc., such that the area on which a finger should be placed for scanning corresponds to a "Deal/Draw" selection.

In other embodiments, the player may be prompted to submit biometric data if he or she desires to make a particular selection, such as "Deal/Draw" selection. In still other embodiments, when, for example, the "Deal/Draw" button is integrated with the biometric device, the gaming unit 20 may determine that the player has made a "Deal/Draw" selection (e.g., by detecting a button press, touch screen press, etc.) and may also retrieve biometric data via the biometric device such that the two appear to occur simultaneously, or nearly simultaneously, to the player.

Thus, submitting biometric data may be a mechanism for providing a game play selection (e.g., a "Deal/Draw" selection). Or, biometric data may be submitted in conjunction with making the game play selection. When such a selection is made, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains biometric data, etc. The message may also include data corresponding to the selection to which the biometric data submission corresponds (e.g. whether to "deal," etc.) If the corresponding selection can be determined by the context of the game, this data need not be provided (but may be provided).

In other embodiments, location information may be determined in conjunction with the game play selection. In these embodiments, the data message transmitted from the gaming unit 20 to the gaming server 52 may include location information.

Figure 24:
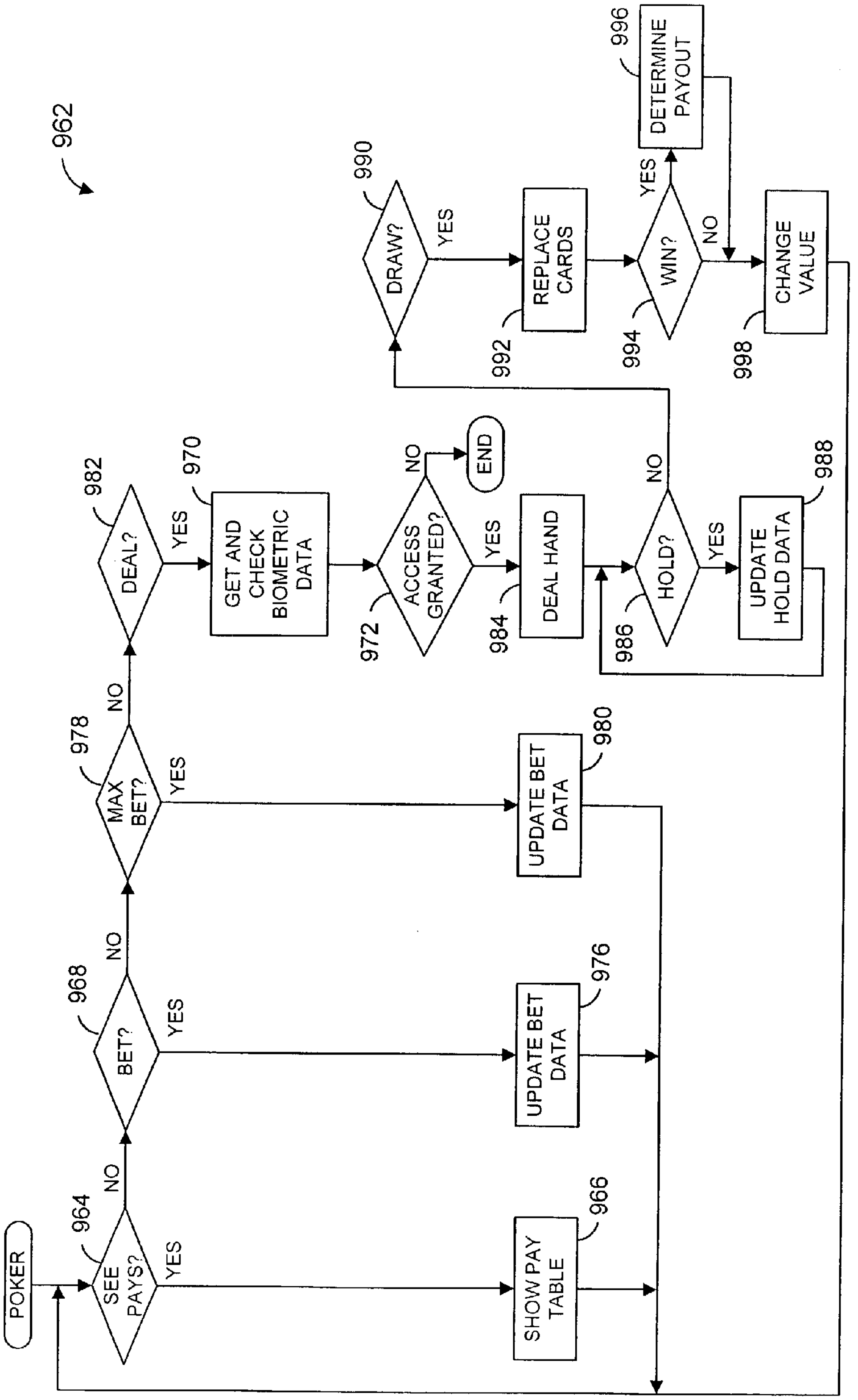
FIG. 24 is a flowchart of an example poker routine.

FIG. 24 is a flowchart of a poker routine 962. Referring to FIG. 24, at block 964, if the player has requested payout information, such as by activating the "See Pays" button 955, at block 966 the routine may cause one or more pay tables to be displayed on the display unit 170 of the gaming unit 20 (by transmitting to the gaming unit 20 display data representing the pay tables).

At block 968, the player may make a bet by, for example, selecting the "Bet One Credit" button 956 (FIG. 23). This may be detected by the gaming server 52, for example, by receiving a "Bet One Credit" message from the gaming unit 20. If a "Bet One Credit" message is received, control may pass to block 976. At block 976, bet data corresponding to the bet made by the player may be stored in a memory (for example, the memory of the gaming server controller 401).

At block 978, the routine may determine whether the player has activated the "Bet Max Credits" button 957. For example, the gaming server 52 may receive a "Bet Max Credits" data message from the gaming unit 20. If yes, then control may pass to block. At block 980, bet data corresponding to the bet made by the player may be stored in a memory (for example, the memory of the gaming server controller 401).

At block 982, the routine may determine if the player desires a new hand to be dealt, (for example, by receiving a "Deal/Draw" data message from the gaming unit 20 after a wager was made). If yes, then control may pass to block 970. At block 970, biometric data may be obtained from the player and checked to see whether it matches that of a registered user. For instance, the gaming server 52 may prompt the gaming unit 20 to obtain biometric data from the user and transmit the biometric data to the gaming server 52. The gaming unit 20 may utilize a routine such as routine 620 (FIG. 15) to obtain biometric data. Additionally, the gaming server 52 may transmit the obtained biometric data to the authentication server 58, and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the gaming server 52, the network computer 22, the gaming unit 20, etc. For instance, the gaming unit may compare the biometric data obtained from the player and compare it to 20 biometric data stored on a smart card.

In another embodiment, at block 970, operational control may pass from the gaming server 52 to the authentication server 58, or to whatever computing system that implements block 970*a*. Then, operational control may pass back to the gaming server 52 at block 972 or block 984 (if access is granted).

If at block 972 it is determined that access has not been granted, then the routine may end. If at block 972 it is determined that access has been granted, control may pass to block 984.

As discussed previously, submission of biometric data may be integrated with the determination of whether the player desires a new hand to be dealt. For example, the player may submit biometric data in order to request, or when requesting, a new hand to be dealt. Thus, blocks 982, 970, and 972 may be integrated, their order rearranged, etc.

At block 984, a video poker hand may be "dealt" by causing the display unit 170 to generate the playing card images 951 (by transmitting one or more messages to the gaming unit 20 with suitable display data). After the hand is dealt, at block 986 the routine may determine if the player selected a "Hold" button 952. For example, the gaming server 52 may determine whether a "Hold" data message was received from the gaming unit 20. If yes, data regarding which of the playing card images 951 are to be "held" may be stored in a memory (for example, the memory of the gaming server controller 401) at block 388.

If the user selects the "Deal/Draw" button 958 (for example, if the gaming server 52 receives a "Deal/Draw" data message from the gaming unit 20) as determined at block 990, each of the playing card images 951 that was not "held" may be caused to disappear from the video display 950 and to be replaced by a new, randomly selected, playing card image 951 at block 992.

In some embodiments, the user may be required to submit biometric data in conjunction with block 990 in a manner similar that described above with respect to blocks 982, 970, and 972. For example, if a fingerprint scanner is integrated with the "Deal/Draw" selection "button," submission of biometric data may be interpreted as a "Draw" request.

At block 994, the routine may determine whether the poker hand represented by the playing card images 951 currently displayed is a winner. That determination may be made by comparing data representing the currently displayed poker hand with data representing all possible winning hands, which may be stored in a memory (for example, the memory of the gaming server controller 401). If there is a winning hand, a payout value corresponding to the winning hand may be determined at block 996. At block 998, the player's cumulative value or number of credits may be updated by subtracting the bet made by the player and adding, if the hand was a winner, the payout value determined at block 996. The cumulative value or number of credits may also be displayed in the display area 959 (FIG. 23).

If desired, one or more similar pairs of blocks 970 and 972 may be added in other portions of the routine as well. For example, after blocks 968 and/or 978, or integrated therewith, biometric data could be accessed and authenticated before passing control to block 976 or block 980, respectively.

Blackjack

Figure 25:
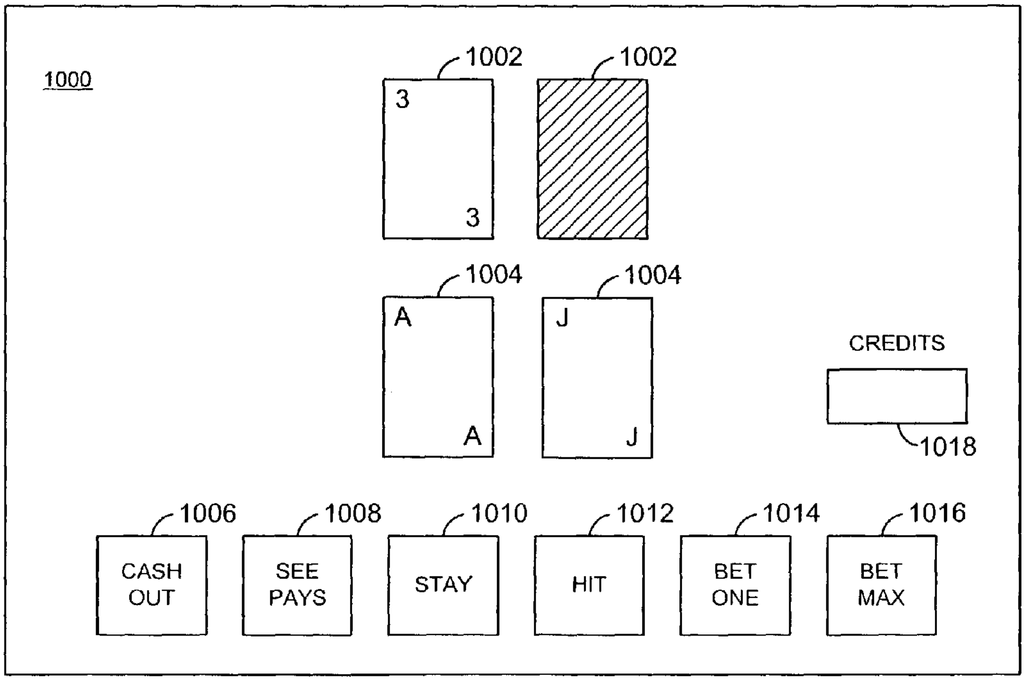
FIG. 25 is an illustration of an example of a visual display that may be displayed during performance of a blackjack routine.

FIG. 25 is an exemplary display 1000 that may be caused to be displayed on the display unit 170 of one of the gaming units 20 (by a gaming server 52 sending display data to the gaming unit 20) during performance of a blackjack routine. Referring to FIG. 25, the display 1000 may include video images 1002 of a pair of playing cards representing a dealer's hand, with one of the cards shown face up and the other card being shown face down, and video images 1004 of a pair of playing cards representing a player's hand, with both the cards shown face up. The "dealer" may be the gaming server 52.

To allow the player to control the play of the blackjack game, a plurality of player-selectable buttons may be displayed. The buttons may include a "Cash Out" button 1006, a "See Pays" button 1008, a "Stay" button 1010, a "Hit" button 1012, a "Bet One Credit" button 1014, and a "Bet Max Credits" button 1016. The display 1000 may also include an area 1018 in which the number of remaining credits or value is displayed. The buttons may be activated with the use of a mouse as described above.

Upon activation of each of the buttons, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains data corresponding to the button, such as wager data, game instruction data (e.g. whether to "hit" or "stay"), etc.

Similar to the buttons described with reference to FIG. 23, in some embodiments one or more of the buttons 1006, 1008, 1010, 1012, 1014, and 1016 may be integrated with a biometric device. For example, the "Hit" button may be integrated with a biometric device. For instance, the "Hit" button may be integrated with a biometric device in a similar manner as described with respect to the "Deal/Draw" button of FIG. 23. Or, the player may make a "Hit" selection by submitting biometric data via a biometric device. Thus, as described above, submitting biometric data may be a mechanism for providing a game play selection (e.g., a "Hit" selection). Or, biometric data may be submitted in conjunction with making the game play selection.

Figure 26:
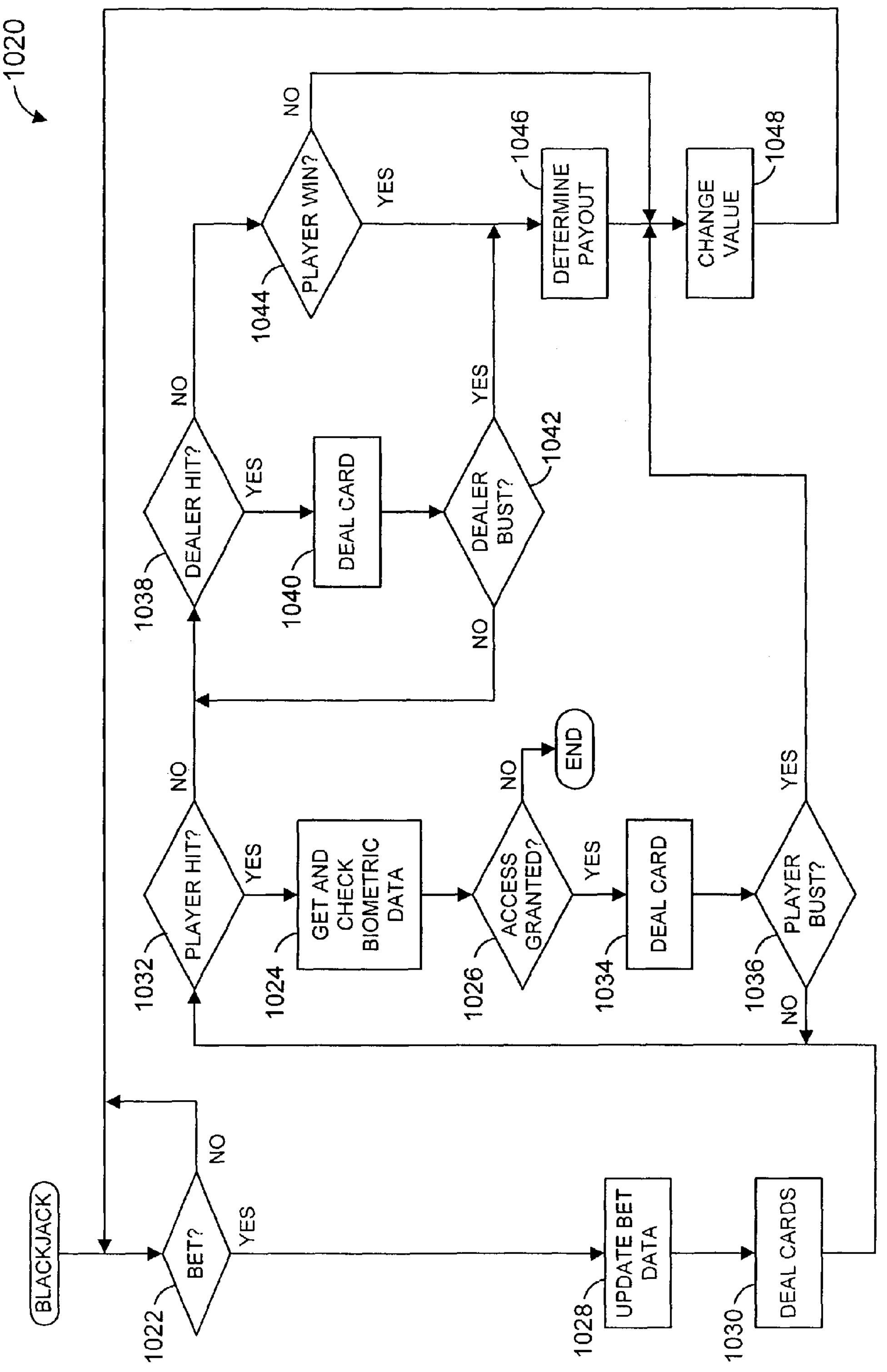
FIG. 26 is a flowchart of an example blackjack routine.

FIG. 26 is a flowchart of the blackjack routine 1020. Referring to FIG. 26, the blackjack routine 1020 may begin at block 1022 where it may determine whether a bet has been made by the player (e.g. by determining if a "Bet One Credit" data message or a "Bet Max Credits" data message has been received by the gaming server 52 from the gaming unit 20).

If a bet has been made, control may pass to block 1028. At block 1028, bet data corresponding to the bet made by the player may be stored in a memory (for example, the memory of the gaming server controller 401). At block 1030, a dealer's hand and a player's hand may be "dealt" by making the playing card images 1002, 1004 appear on the display unit 170 of the gaming unit 20.

At block 1032, the player may select to be "hit," in which case control may pass to block 1024. At block 1024*a*, biometric data may be obtained from the player and checked to see whether it matches that of a registered user. For instance, the gaming server 52 may prompt the gaming unit 20 to obtain biometric data from the user and transmit the biometric data to the gaming server 52. The gaming unit 20 may utilize a routine such as routine 620 (FIG. 15) to obtain biometric data.

Additionally, the gaming server 52 may transmit the obtained biometric data to the authentication server 58,. and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the gaming server 52, the network computer 22, the gaming unit 20 etc. For instance, the gaming unit 20 may compare the biometric data obtained from the player and compare it to biometric data stored on a smart card.

In another embodiment, at block 1024, operational control may pass from the gaming server 52 to the authentication server 58, or to whatever computing system that implements block 1024. Then, operational control may pass back to the gaming server 52 at block 1026 or at block 1034 (if access is granted).

If the biometric data does match that of a registered user, and, optionally, the user identified by the biometric data is permitted to play, control may pass to block 1034. At block

1034, another card will be dealt to the player's hand by making another playing card image 1004 appear in the display 1000. If the player is hit, block 1036 may determine if the player has "bust," or exceeded 21. If the player has not bust, control may pass to block 1032.

If at block 1026 it is determined that access has not been granted, the routine may end. Prior to ending, a display may be generated which indicates to the player that he or she has been refused access to play the game. The display may optionally indicate why access was denied. Additionally, instead of ending, the routine may branch back to block 1022.

As discussed previously, submission of biometric data may be integrated with the determination of whether the player desires a "Hit." For example, the player may submit biometric data in order to request, or when requesting, a "Hit." Thus, blocks 1032, 1024, and 1026 may be integrated, their order rearranged, etc.

If the player decides not to hit, at block 1038 the routine may determine is whether the dealer should be hit. Whether the dealer hits may be determined in accordance with predetermined rules, such as the dealer always hit if the dealer's hand totals 15 or less. If the dealer hits, at block 1040 the dealer's hand may be dealt another card by making another playing card image 1002 appear in the display 1000. At block 1042 the routine may determine whether the dealer has bust. If the dealer has not bust, blocks 1038 and 1040 may be performed again to allow the dealer to be hit again.

If the dealer does not hit, at block 1044 the outcome of the blackjack game and a corresponding payout may be determined based on, for example, whether the player or the dealer has the higher hand that does not exceed 21. If the player has a winning hand, a payout value corresponding to the winning hand may be determined at block 1046. At block 1048, the player's cumulative value or number of credits may be updated by subtracting the bet made by the player and adding, if the player won, the payout value determined at block 1046. The cumulative value or number of credits may also be displayed in the display area 1018 (FIG. 25).

If desired, one or more of the pair of blocks 1024 and 1026 may be added in other portions of the routine as well.

Slots A

Figure 27:
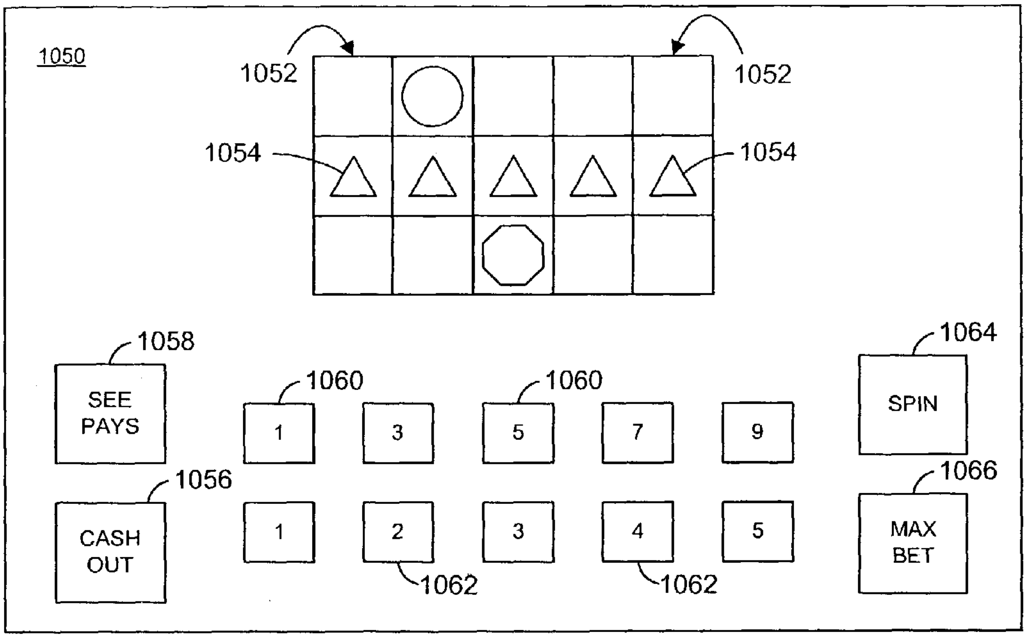
FIG. 27 is an illustration of an example of a visual display that may be displayed during performance of a slots routine.

FIG. 27 is an exemplary display 1050 that may be caused to be displayed on the display unit 170 of one of the gaming units 20 (by a gaming server 52 sending display data to the gaming unit 20) during performance of a slots routine. Referring to FIG. 27, the display 1050 may include video images 1052 of a plurality of slot machine reels, each of the reels having a plurality of reel symbols 1054 associated therewith. Although the display 1050 shows five reel images 1052, each of which may have three reel symbols 1054 that are visible at a time, other reel configurations could be utilized.

To allow the player to control the play of the slots game, a plurality of player-selectable buttons may be displayed. The buttons may include a "Cash Out" button 1056, a "See Pays" button 1058, a plurality of payline-selection buttons 1060 each of which allows the player to select a different number of paylines prior to "spinning" the reels, a plurality of bet-selection buttons 1062 each of which allows a player to specify a wager amount for each payline selected, a "Spin" button 1064, and a "Max Bet" button 1066 to allow a player to make the maximum wager allowable.

Upon activation of a button, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains data corresponding to the button, such as wager data, game instruction data (e.g. spin), etc.

Similar to the buttons described with reference to FIG. 23, in some embodiments one or more of the buttons 1056, 1058, 1060, 1062, 1064, and 1066 may be integrated with a biometric device. For example, the "Spin" button may be integrated with a biometric device. For instance, the "Spin" button may be integrated with a biometric device in a similar manner as described with respect to the "Deal/Draw" button of FIG. 23. Or, the player may make a "Spin" selection by submitting biometric data via a biometric device. Thus, as described above, submitting biometric data may be a mechanism for providing a game play selection (e.g., a "Spin" selection). Or, biometric data may be submitted in conjunction with making the game play selection.

Figure 28:
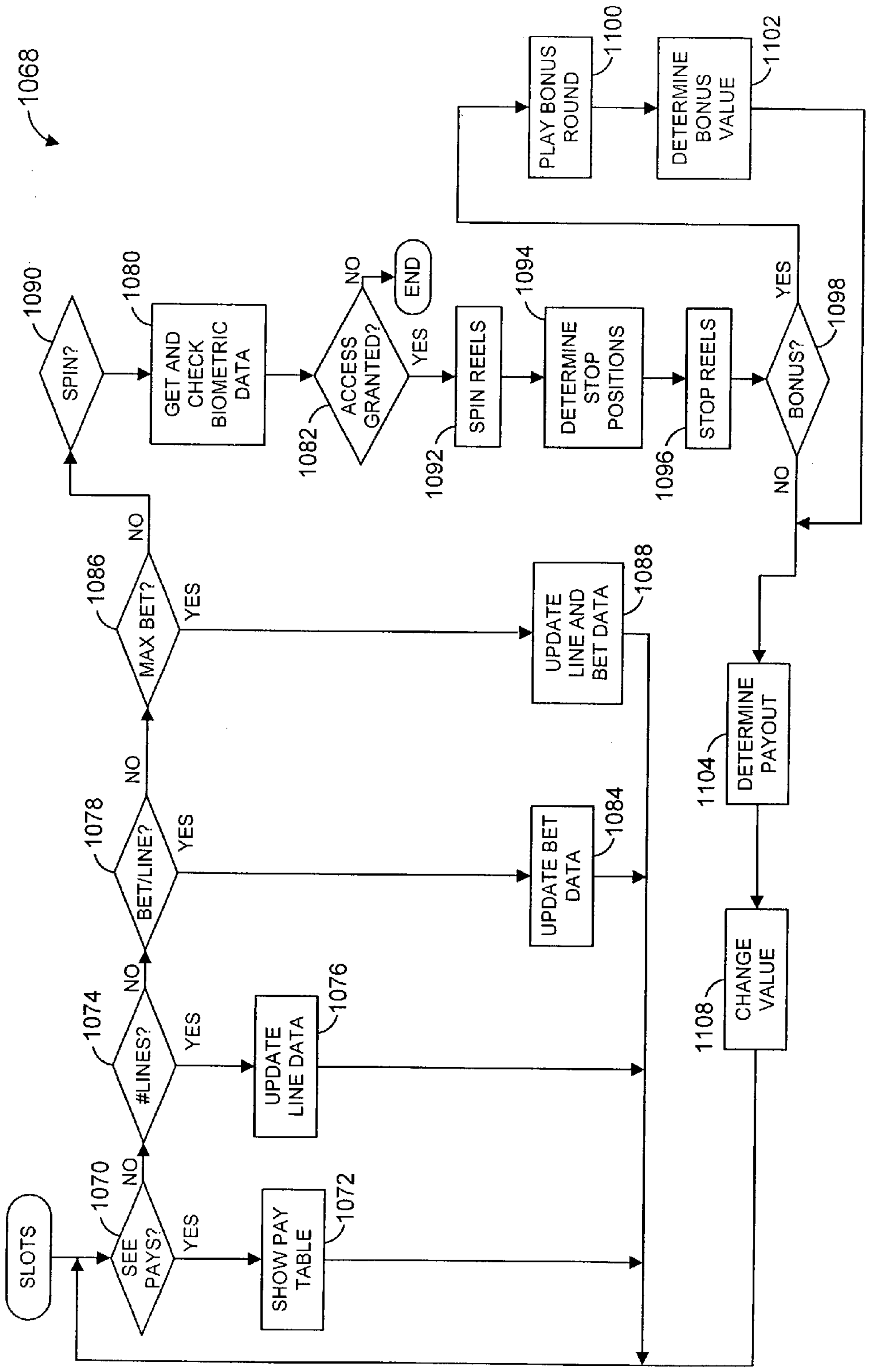
FIG. 28 is a flowchart of an example slots routine.

FIG. 28 is a flowchart of a slots routine 1068. Referring to FIG. 28, at block 1070, it may be determined whether the player has requested payout information (e.g., detecting receipt by the gaming server 52 of a "See Pays" data message). If yes, at block 1072 the routine may cause one or more pay tables to be displayed on the display unit 170. At block 1074, it may be determined whether the player selected a number of paylines (e.g., by selecting one of the payline buttons 1060). For example, the routine may determine if a data message is received by the gaming server 52 as a result of the player pressing one of the payline-selection buttons 460. If yes, at block 1076 data corresponding to the number of paylines selected by the player may be stored in a memory (e.g., the memory 406 of the gaming server controller 401). At block 1078, it may be determined if the player has selected one of the bet-selection buttons 1062.

If yes, control may pass to block 1084. At block 1084, data corresponding to the amount bet per payline may be stored in a memory (for example, the memory of the gaming server controller 401).

At block 1086, it may be determined whether the player selected the "Max Bet" button 1066. For example, the routine may determine if a "Max Bet" data message has been received by the gaming server 52. If yes, control may pass to block 1088. At block 1088, bet data (which may include both payline data and bet-per-payline data) corresponding to the maximum allowable bet may be stored in a memory (for example, the memory of the gaming server controller 401).

At block 1090, it is determined whether the user selected the "Spin" button 1064. For example, the routine may determine whether a "Spin" data message has been received from the gaming unit 20. If yes, control may pass to block 1080. At block 1080, biometric data may be obtained from the player and checked to see whether it matches that of a registered user. For instance, the gaming server 52 may prompt the gaming unit 20 to obtain biometric data from the user and transmit the biometric data to the gaming server 52. The gaming unit 20 may utilize a routine such as routine 620 (FIG. 15) to obtain biometric data. Additionally, the gaming server 52 may transmit the obtained biometric data to the authentication server 58, and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the gaming server 52, the network computer 22, the gaming unit 20 etc. For instance, the gaming unit 20 may compare the biometric data obtained from the player and compare it to biometric data stored on a smart card.

In another embodiment, at block 1080, operational control may pass from the gaming server 52 to the authentication server 58, or to whatever computing system that implements block 1080. Then, operational control may pass back to the gaming server 52 at block 1082 or at block 1092 (if access is granted).

If at block 1082 it is determined that access has not been granted, then the routine may end. If at block 1082 it is determined that access has been granted, control may pass to block 1092.

As discussed previously, submission of biometric data may be integrated with the determination of whether the player desires to "Spin." For example, the player may submit biometric data in order to request, or when requesting, to "Spin." Thus, blocks 1090, 1080, and 1082 may be integrated, their order rearranged, etc.

At block 1092, the routine may cause the slot machine reel images 1052 to begin "spinning" so as to simulate the appearance of a plurality of spinning mechanical slot machine reels. At block 1094, the routine may determine the positions at which the slot machine reel images will stop, or the particular symbol images 1054 that will be displayed when the reel images 1052 stop spinning. At block 1096, the routine may stop the reel images 1052 from spinning by displaying stationary reel images 1052 and images of three symbols 1054 for each stopped reel image 1052. The virtual reels may be stopped from left to right, from the perspective of the player, or in any other manner or sequence.

The routine may provide for the possibility of a bonus game or round if certain conditions are met, such as the display in the stopped reel images 1052 of a particular symbol 1054. If there is such a bonus condition as determined at block 1098, the routine may proceed to block 1100 where a bonus round may be played. The bonus round may be a different game than slots, and many other types of bonus games could be provided. If the player wins the bonus round, or receives additional credits or points in the bonus round, a bonus value may be determined at block 1102. A payout value corresponding to outcome of the slots game and/or the bonus round may be determined at block 1104. At block 1108, the player's cumulative value or number of credits may be updated by subtracting the bet made by the player and adding, if the slot game and/or bonus round was a winner, the payout value determined at block 1104.

If desired, one or more of the pair of blocks 1080 and 1082 may be added in other portions of the routine.

Keno

Figure 29:
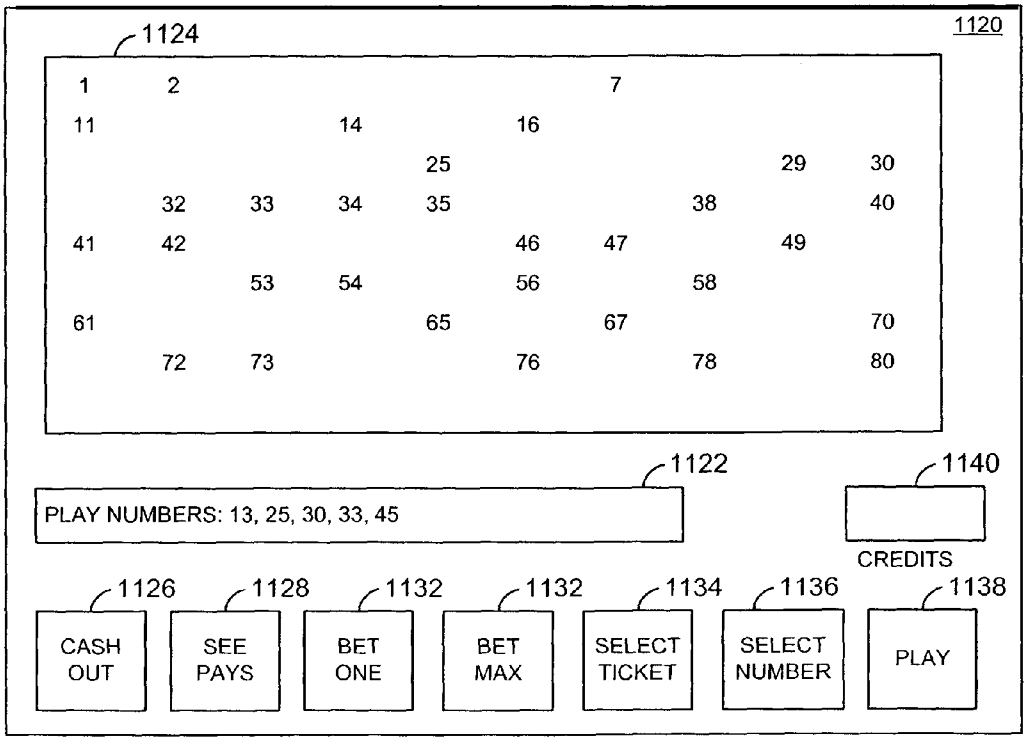
FIG. 29 is an illustration of an example of a visual display that may be displayed during performance of a keno routine.

FIG. 29 is an exemplary display 1120 that may be caused to be displayed on the display unit 170 of one of the gaming units 20 (by a gaming server 52 sending display data to the gaming unit 20) during performance of a keno routine. Referring to FIG. 29, the display 1120 may include a video image 1122 of a plurality of numbers that were selected by the player prior to the start of a keno game and a video image 1124 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 1126, a "See Pays" button 1128, a "Bet One Credit" button 1130, a "Bet Max Credits" button 1132, a "Select Ticket" button 1134, a "Select Number" button 1136, and a "Play" button 1138. The display 1120 may also include an area 1140 in which the number of remaining credits or value is displayed.

Upon activation a button, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains data corresponding to the button, such as wager data, game instruction data, etc.

Similar to the buttons described with reference to FIG. 23, in some embodiments one or more of the buttons 1126, 1128, 1132, 1134, 1136, and 1138 may be integrated with a biometric device. For example, the "Play" button may be integrated with a biometric device. For instance, the "Play" button may be integrated with a biometric device in a similar manner as described with respect to the "Deal/Draw" button of FIG. 23. Or, the player may make a "Play" selection by submitting biometric data via a biometric device. Thus, as described above, submitting biometric data may be a mechanism for providing a game play selection (e.g., a "Play" selection). Or, biometric data may be submitted in conjunction with making the game play selection.

Figure 30:
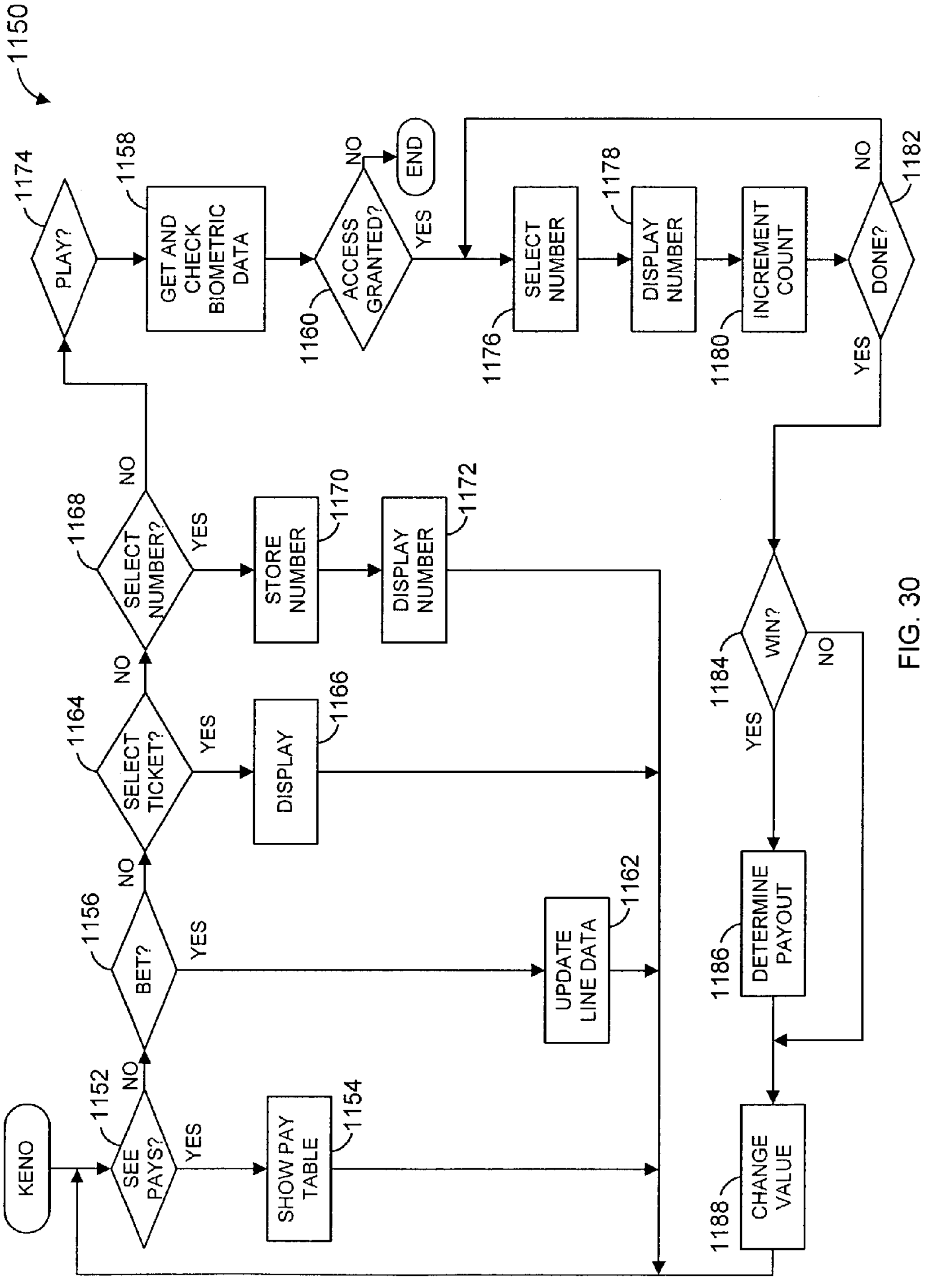
FIG. 30 is a flowchart of an example keno routine.

FIG. 30 is a flowchart of the keno routine 1150. The keno routine 1150 maybe utilized in connection with a single gaming unit 20 where a single player is playing a keno game, or the keno routine 1150 may be utilized in connection with multiple gaming units 20 where multiple players are playing a single keno game.

Referring to FIG. 30, at block 1152, the routine may determine whether the "See Pays" button 1128 was selected. For example, the routine may determine whether a "See Pays" data message has been received from the gaming unit 20. If yes, at block 154 the routine may cause one or more pay tables to be displayed on the display unit 170. At block 1156, it may be determined whether the player has chosen to bet. For example, the routine may determine whether bet data has been received from the gaming unit 20, such as by receiving a "Bet One Credit" data message or a "Bet Max Credits" data message. If yes, the routine may proceed to block 1162.

At block 1162, bet data corresponding to the bet made by the player may be stored in a memory (for example, the memory of the gaming server controller 401).

After the player has made a wager, at block 1164 the player may select a keno ticket, and at block 1166 the ticket may be displayed on the display 1120. At block 1168, the player may select one or more game numbers, which may be within a range set by the casino. After being selected, the player's game numbers may be stored in a memory (e.g., the memory of the gaming server controller 401) at block 1170 and may be included in the image 1122 on the display 1120 at block 1172. After a certain amount of time, the keno game may be closed to additional players (where a number of players are playing a single keno game using multiple gaming units 20).

At block 1174, it may be determined whether play of the keno game is to begin. If yes, control may pass to block 1158. At block 1158, biometric data may be obtained from the player and checked to see whether it matches that of a registered user. For instance, the gaming server 52 may prompt the gaming unit 20 to obtain biometric data from the user and transmit the biometric data to the gaming server 52. The gaming unit 20 may utilize a routine such as routine 620 (FIG. 15) to obtain biometric data. Additionally, the gaming server 52 may transmit the obtained biometric data to the authentication server 58, and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the gaming server 52, the network computer 22, the gaming unit 20 etc. For instance, the gaming unit 20 may compare the biometric data obtained from the player and compare it to biometric data stored on a smart card.

In another embodiment, at block 1158, operational control may pass from the gaming server 52 to the authentication server 58, or to whatever computing system that implements block 1158. Then, operational control may pass back to the gaming server 52 at block 1160*a*.

If the biometric data does match that of a registered user, and, optionally, the user identified by the biometric data is permitted to play, control may pass to block 1176. If the biometric data does not match that of a registered user permitted to play, then the routine may end. Prior to ending, a display may be generated which indicates to the player that he or she has been refused access to play the game. The display may optionally indicate why access was denied. Additionally, instead of ending, the routine may branch back to block 1152.

As discussed previously, submission of biometric data may be integrated with the determination of whether the player desires to "Play." For example, the player may submit biometric data in order to request, or when requesting, to "Play." Thus, blocks 1174, 1158, and 1160 may be integrated, their order rearranged, etc.

At block 1176 a game number within a range set by the casino may be randomly selected (for example, by the gaming server controller 401). At block 1178, the randomly selected game number may be displayed on the display unit 170 and the display units 170 of other gaming units 20 (if any) which are involved in the same keno game. At block 1180, a count which keeps track of how many game numbers have been selected may be incremented at block 1180. For example, the gaming server controller 401 may increment the count.

At block 1182, the routine may determine whether a maximum number of game numbers within the range have been randomly selected. If not, another game number may be randomly selected at block 1176. If the maximum number of game numbers has been selected, at block 1184 the routine may determine whether there are a sufficient number of matches between the game numbers selected by the player and the game numbers selected at block 1176 to cause the player to win. The number of matches may depend on how many numbers the player selected and the particular keno rules being used.

If there are a sufficient number of matches a payout may be determined at block 1186 to compensate the player for winning the game. The payout may depend on the number of matches between the game numbers selected by the player and the game numbers randomly selected at block 1176. At block 1188, the player's cumulative value or number of credits may be updated by subtracting the bet made by the player and adding, if the keno game was won, the payout value determined at block 1186. The cumulative value or number of credits may also be displayed in the display area 1140 (FIG. 29).

If desired, one or more of the pair of blocks 1158 and 1160 may be added in other portions of the routine as well. For example, a similar pair of blocks may be added between blocks 1156 and 1162.

Bingo

Figure 31:
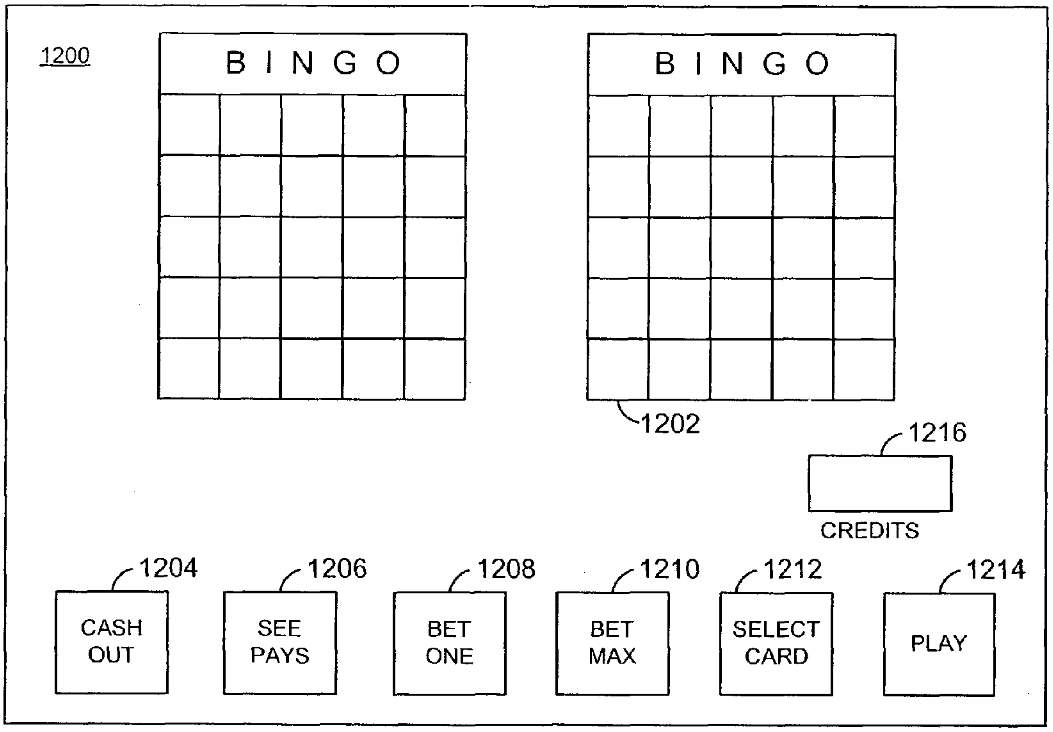
FIG. 31 is an illustration of an example of a visual display that may be displayed during performance of a bingo routine.

FIG. 31 is an exemplary display 1200 that may be caused to be displayed on the display unit 170 of one of the gaming units 20 (for example, by a gaming server 52 sending display data to the gaming unit 20) during performance of a bingo routine. Referring to FIG. 31, the display 1200 may include one or more video images 1202 of a bingo card and images of the bingo numbers selected during the game. The bingo card images 1202 may have a grid pattern.

To allow the player to control the play of the bingo game, a plurality of player-selectable buttons may be displayed. The buttons may include a "Cash Out" button 1204, a "See Pays" button 1206, a "Bet One Credit" button 1208, a "Bet Max Credits" button 1210, a "Select Card" button 1212, and a "Play" button 1214. The display 1200 may also include an area 1216 in which the number of remaining credits or value is displayed.

Upon activation a button, a corresponding data message may be transmitted from the gaming unit 20 to the gaming server 52. The data message may have a source address that identifies the gaming unit 20 sending the message, a destination address that identifies the gaming server 52 to which the message is to be sent, and a data field that contains data corresponding to the button, such as wager data, game instruction data, etc.

Similar to the buttons described with reference to FIG. 23, in some embodiments one or more of the buttons 1204, 1206, 1208, 1210, 1212, and 1214 may be integrated with a biometric device. For example, the "Play" button may be integrated with a biometric device. For instance, the "Play" button may be integrated with a biometric device in a similar manner as described with respect to the "Deal/Draw" button of FIG. 23. Or, the player may make a "Play" selection by submitting biometric data via a biometric device. Thus, as described above, submitting biometric data may be a mechanism for providing a game play selection (e.g., a "Play" selection). Or, biometric data may be submitted in conjunction with making the game play selection.

Figure 32:
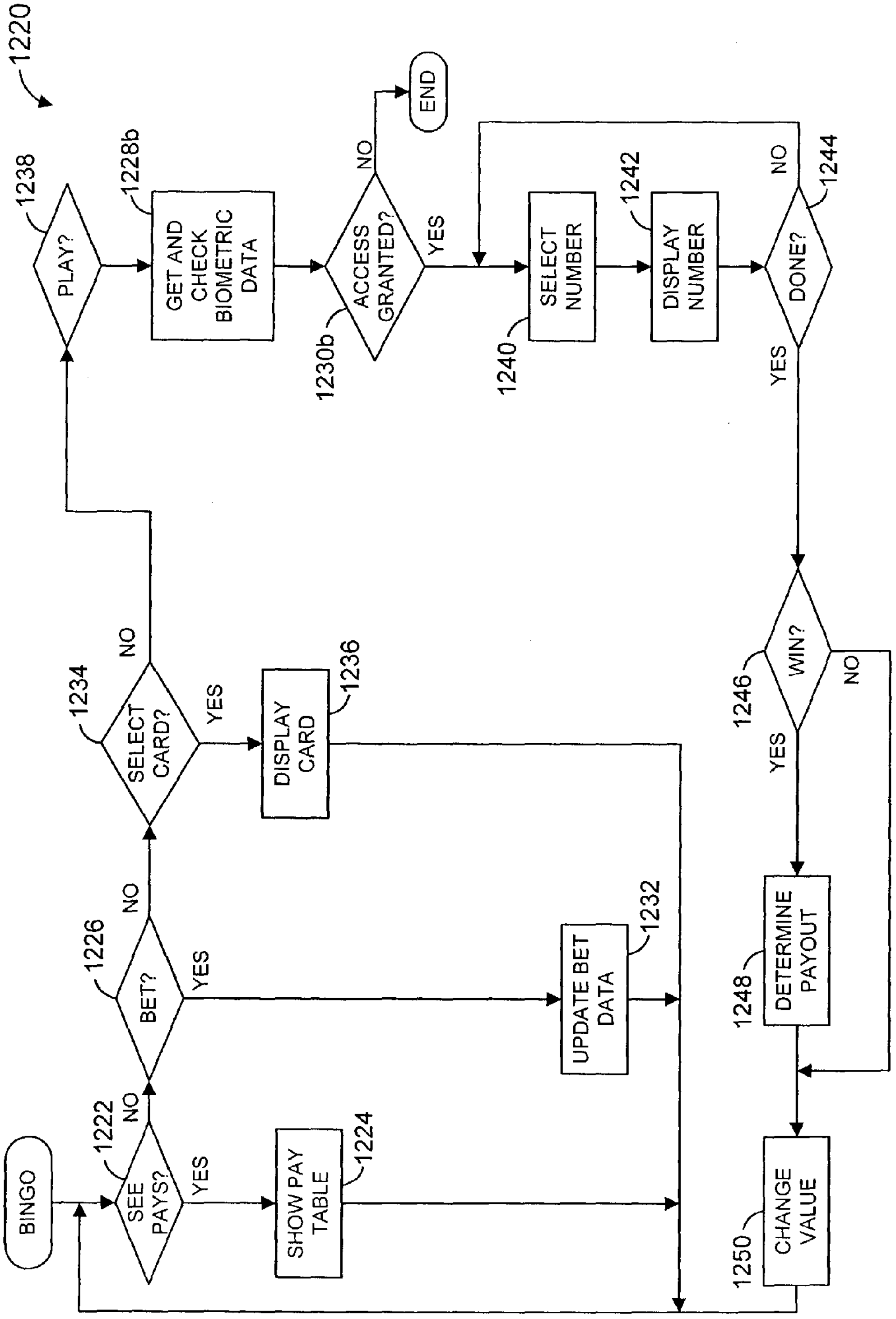
FIG. 32 is a flowchart of an example bingo routine.

FIG. 32 is a flowchart of a bingo routine 1220. The bingo routine 1220 may be utilized in connection with a single gaming unit 20 where a single player is playing a bingo game, or the bingo routine 1220 may be utilized in connection with multiple gaming units 20 where multiple players are playing a single bingo game Referring to FIG. 32, at block 1222, it may be determined whether a player has requested payout information. This may be determined, for example, by detecting receipt of a "See Pays" data message from the gaming unit 20. If yes, at block 1224 the routine may cause one or more pay tables to be displayed on the display unit 170 of the gaming unit 20. At block 1226, it may be determined whether a player has requested a bet. This may be determined, for example, by detecting receipt of a "Bet One Credit" data message or a "Bet Max Credits" data message. If yes, control may pass to block 1232.

At block 1232, bet data corresponding to the bet made by the player may be stored in a memory (for example, the memory of the gaming server controller 401).

After the player has made a wager, at block 1234 the player may select a bingo card, which may be generated randomly. The player may select more than one bingo card, and there may be a maximum number of bingo cards that a player may select. At block 1236, the selected card or cards is caused to be displayed on the display unit 170.

At block 1238, it may be determined whether play of the bingo game is to begin. If yes, control may pass to block 1228. At block 1228, biometric data may be obtained from the player and checked to see whether it matches that of a registered user. For instance, the gaming server 52 may prompt the gaming unit 20 to obtain biometric data from the user and transmit the biometric data to the gaming server 52. The gaming unit 20 may utilize a routine such as routine 620 (FIG. 15) to obtain biometric data. Additionally, the gaming server 52 may transmit the obtained biometric data to the authentication server 58, and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the gaming server 52, the network computer 22, the gaming unit 20 etc. For instance, the gaming unit 20 may compare the biometric data obtained from the player and compare it to biometric data stored on a smart card.

In another embodiment, at block 122*a*, operational control may pass from the gaming server 52 to the authentication server 58, or to whatever computing system that implements block 1228. Then, operational control may pass back to the gaming server 52 at block 1230.

If the biometric data does match that of a registered user, and, optionally, the user identified by the biometric data is permitted to play, control may pass to block 1240. If the biometric data does not match that of a registered user permitted to play, then the routine may end. Prior to ending, a display may be generated which indicates to the player that he or she has been refused access to play the game. The display may optionally indicate why access was denied. Additionally, instead of ending, the routine may branch back to block 1222.

As discussed previously, submission of biometric data may be integrated with the determination of whether the player desires to "Play." For example, the player may submit biometric data in order to request, or when requesting, to "Play." Thus, blocks 1238, 1228, and 1230 may be integrated, their order rearranged, etc.

At block 1240 a bingo number may be randomly generated by the routine. At block 1242, the bingo number may be displayed on the display unit 170 of the gaming unit 20 and the display units 170 of any other gaming units 20 involved in the bingo game.

At block 1244, the routine may determine whether any player has won the bingo game. If no player has won, another bingo number may be randomly selected at block 1240. If any player has bingo as determined at block 1244, the routine may determine at block 1246 whether the player playing that gaming unit 20 was the winner. If so, at block 1248 a payout for the player may be determined. The payout may depend on the number of random numbers that were drawn before there was a winner, the total number of winners (if there was more than one player), and the amount of money that was wagered on the game. At block 1250, the player's cumulative value or number of credits may be updated by subtracting the bet made by the player and adding, if the bingo game was won, the payout value determined at block 1248. The cumulative value or number of credits may also be displayed in the display area 1216 (FIG. 31).

If desired, one or more of the pair of blocks 1228 and 1230 may be added in other portions of the routine as well. For example, a similar pair of blocks may be added between blocks 1226 and 1232.

In the examples described with reference to FIGS. 23-32, the location of the gaming unit 20 may optionally be checked, for example using a routine such as routine 750 (FIG. 18), when the biometric data is checked.

Game Routines Implemented on Gaming Units

Although the routines described above with reference to FIGS. 23-32 were described in the context of being implemented via one or more gaming servers 52, each of these routines may also be implemented on a gaming unit 20 without a gaming server. As an illustration, the poker routine 962 of FIG. 24 will now be described in the context of being implemented on a gaming unit 20. One skilled in the art will recognize that other gaming routines may be similarly implemented on a gaming unit 20.

Referring now to FIGS. 23 the player selectable buttons 952, 954, 955, 956, 957, and 958 may be, for example, buttons, buttons displayed on the display unit 170, etc. Depending on the type of button used, the buttons may be selected by, for example, pressing the button, pressing an area of a touch screen display, selecting with a mouse, or joystick, etc. Additionally, as described above, submitting biometric data may be a mechanism for providing a game play selection (e.g., a "Play" selection). Or, biometric data (and optionally location data) may be submitted in conjunction with making the game play selection.

Referring to FIG. 24, at block 964, if the player has requested payout information, such as by activating the "See Pays" button 955, at block 966 the routine may cause one or more pay tables to be displayed on the display unit 170 of the gaming unit 20.

At block 968, the player may attempt to make a bet by, for example, selecting the "Bet One Credit" button 956. At block 976, bet data corresponding to the bet made by the player may be stored in a memory (for example, the memory of the gaming unit controller 200).

At block 978, the routine may determine whether the player has activated the "Bet Max Credits" button 957. If yes, control may pass to block 980. At block 980, bet data corresponding to the bet made by the player may be stored in a memory (for example, the memory of the gaming unit controller 200).

At block 982, the routine may determine if the player desires a new hand to be dealt, (for example, by detecting a selection of the "Deal/Draw" button 958). If yes, then control may pass to blocks 970. At block 970, biometric data may be obtained from the player and checked to see whether it matches that of a registered user. For instance, the gaming unit 20 may obtain biometric data from the user and transmit the biometric data to the authentication server 58 and request that the authentication server 58 determine whether that biometric data matches biometric data of a registered user. The authentication server 58 may utilize a routine such as routine 770 (FIG. 19). In embodiments that do not include an authentication server 58, the determination of whether the biometric data matches biometric data of a registered user may be implemented with another computing device, such as the network computer 22 or the gaming unit 20. For instance, the gaming unit 20 may compare the biometric data obtained from the player and compare it to biometric data stored on a smart card.

In another embodiment, at block 970, operational control may pass from the gaming unit 20 to the authentication server 58, or to whatever computing system that implements block 970. Then, operational control may pass back to the gaming unit 20 at block 972.

If the biometric data does match that of a registered user, and, optionally, the user identified by the biometric data is permitted to play, control may pass to block 984. If the biometric data does not match that of a registered user permitted to play, then the routine may end. Prior to ending, a display may be generated which indicates to the player that he or she has been refused access to play the game. The display may optionally indicate why access was denied. Additionally, instead of ending, the routine may branch back to block 964.

As discussed previously, submission of biometric data may be integrated with the determination of whether the player desires a new hand to be dealt. For example, the player may submit biometric data in order to request, or when requesting, a new hand to be dealt. Thus, blocks 982, 970, and 972 may be integrated, their order rearranged, etc.

At block 984, a video poker hand may be "dealt" by causing the display unit 170 to generate the playing card images 951. After the hand is dealt, at block 986 the routine may determine if the player selected a "Hold" button 952. If yes, data regarding which of the playing card images 951 are to be "held" may be stored in a memory (for example, the memory of the gaming unit controller 200) at block 388.

If the user selects the "Deal/Draw" button 958 as determined at block 990, each of the playing card images 951 -that was not "held" may be caused to disappear from the video display 950 and to be replaced by a new, randomly selected, playing card image 951 at block 992.

At block 994, the routine may determine whether the poker hand represented by the playing card images 951 currently displayed is a winner. That determination may be made by comparing data representing the currently displayed poker hand with data representing all possible winning hands, which may be stored in a memory (for example, the memory of the gaming unit controller 200). If there is a winning hand, a payout value corresponding to the winning hand may be determined at block 996. At block 998, the player's cumulative value or number of credits may be updated by subtracting the bet made by the player and adding, if the hand was a winner, the payout value determined at block 996. The cumulative value or number of credits may also be displayed in the display area 959 (FIG. 23).

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a read-only memory (ROM), etc.

Further, although the examples described above were described with reference to various flow diagrams, one of ordinary skill in the art will appreciate that many other methods may alternatively be used. For instance, various levels of authentication may alternatively be used. As one example, for small wagers may require submission of biometric data corresponding to one fingerprint, whereas large wagers may require submitting finger prints from multiple different fingers, submitting to an eye scan in addition to a finger print scan, etc. Also, the order of execution of the blocks may be changed, and/or some or all of the blocks may be changed, eliminated, or combined.

What is claimed is:

1. A gaming system that allows players to play games via a plurality of remote player devices, said gaming system comprising:

a registration unit, said registration unit located in a controlled environment and configured to obtain first biometric data of a player to be registered;

a plurality of gaming servers, each gaming server of said plurality of gaming servers configured to facilitate play of a respective game of a plurality of games by a player utilizing one of said remote player devices, each gaming server of said plurality of gaming servers including a controller that includes a processor, a memory, and an input/output device to facilitate communication via a network, each respective controller of each gaming server being programmed to facilitate play of said respective game and said respective game being one of the following games: poker, blackjack, slots, keno or bingo;

a portable location determination device, said portable location determination device removably coupled to said one remote player device and movable between said remote player devices by said player; and a website server, said website server capable of being operatively coupled via said network to said remote player devices, said website server comprising:

a controller that comprises a processor, a memory, and an input/output circuit to facilitate communication via said network, said input/output circuit allowing data to be communicated between said controller of said website server and said remote player devices, said controller of said website server being programmed to cause data representing a game selection display to be transmitted to said one remote player device prior to the transfer of operational control to a gaming server, said game selection display comprising a plurality of images, each image representing a respective game of said plurality of games, said controller of said website server being programmed to determine a game selection of a player at said one remote player device prior to the transfer of operational control to a gaming server, said controller of said website server programmed to transfer operational control to one of said gaming servers based on said game selection and based on a comparison of second biometric data obtained via a biometric device operatively coupled to said one remote player device to said first biometric data, said biometric device being integrated with a button for making a game play selection within said one game such that operation of the button provides a single message, wherein said single message automatically includes said second biometric data and automatically does not include said game play selection in response to being able to determine said game play selection based on a context provided by said game, and wherein, second biometric data comprises multiple scans of a biometric feature averaged into a composite scan, said controller of said website server being programmed to determine whether said one remote player device is in a permitted location based on a location determination by said portable location determination device, and said controller of said website server being programmed to transfer operational control to one of said gaming servers further based on whether said one remote player device is in a permitted location.

2. A gaming system as defined in claim 1, further comprising an authentication server capable of being operatively coupled to said website server via said network;

wherein said controller of said website server is programmed to receive from said authentication server data indicative of whether said second biometric data obtained via said biometric device matches said first biometric data of a registered player; and wherein said controller of said website server is programmed to not transfer operational control to said one gaming server if said data indicative of whether said second biometric data obtained via said biometric device matches said first biometric data of a registered player indicates that said second biometric data obtained via said biometric device does not match said second biometric data of a registered player.

3. A gaming system as defined in claim 1, wherein said controller of said website server is programmed to receive from said from said one remote player device data indicative of whether said second biometric data obtained via said biometric device matches said first biometric data of a registered player; and wherein said controller of said website server is programmed to not transfer operational control to said one gaming server if said data indicative of whether said second biometric data obtained via said biometric device matches said first biometric data of a registered player indicates that said second biometric data obtained via said biometric device does not match said first biometric data of a registered player.

4. A gaming system as defined in claim 1, wherein said controller of said website server is programmed to determine whether said one remote player device is in a permitted location;

wherein said controller of said website server is programmed to transfer operational control to one of said gaming servers further based on whether said one remote player device is in a permitted location; and wherein said controller of said website server is programmed to receive from said one remote player device data indicative of a location of said one remote player device.

5. A gaming system as defined in claim 1, wherein said biometric device comprises at least one of a fingerprint scanner, an eye scanner, a microphone coupled to a digital-to-analog converter, a camera.

6. A gaming system as defined in claim 1, wherein a first game of a first gaming server and a second game of a second gaming server are the same type of game.

7. A gaming system as defined in claim 1, wherein play of each game of said plurality of games is facilitated by only a corresponding one gaming server of said plurality of gaming servers.

8. A gaming system as defined in claim 1, wherein said controller of said website server is programmed to select logon display data and to cause said logon display data to be transmitted to one of said remote player devices via said network when said one remote player device is operatively coupled to said website server; and wherein said controller of said website server is programmed to cause logon data received from said one remote player device to be stored in memory.

9. A gaming system as defined in claim 2, wherein said controller of said website server is programmed to receive from said one remote player device said second biometric data obtained via said biometric device; and wherein said controller of said website server is programmed to transmit said second biometric data obtained via said biometric device to said authentication server.

10. A gaming system as defined in claim 2, wherein said controller of said website server is programmed to receive from said authentication server data indicative of whether said one remote player device is in a permitted location.

11. A gaming system as defined in claim 10, wherein said controller of said website server is programmed to receive from said one remote player device said data indicative of a location of said one remote player device; and wherein said controller of said website server is programmed to transmit said data indicative of said location of said one remote player device to said authentication server.

12. A gaming system as defined in claim 6, wherein said first game comprises a single-hand poker game and wherein said second game comprises a multi-hand poker game.

13. A website server, comprising:

a controller that controls the operation of said website server, said controller comprising a processor, a memory, and an input/output circuit operatively coupled to said processor, said input/output circuit allowing data to be communicated between said website server and a plurality of remote player devices when said remote player devices are operatively coupled to said website server, said controller being programmed to cause data representing a game selection display to be transmitted to said one remote player device prior to the transfer of operational control to a gaming server, said game selection display comprising a plurality of images, each image of said plurality of images representing a respective game of a plurality of games, said controller being programmed to determine a game selection of a player at said one remote player device prior to the transfer of operational control to a gaming server, said game selection indicating one game of said plurality of games, said controller being programmed to access first biometric data of a player to be registered obtained via a registration unit located in a controlled area;

said controller programmed to transfer operational control to a gaming server of a plurality of gaming servers based on said game selection and based on second biometric data obtained via a biometric device operatively coupled to said one remote player device, said one gaming server configured to facilitate play of said one game, said biometric device being integrated with a button for making a game play selection within said one game such that operation of the button provides a single message, wherein said single message automatically includes said second biometric data and automatically does not include said game play selection in response to being able to determine said game play selection based on a context provided by said game, and wherein said second biometric data comprises multiple scans of a biometric feature averaged into a composite scan, said second biometric data compared with the first biometric data of a registered player, said controller programmed to determine whether said one remote player device is in a permitted location based on a location determination made by a portable location determination device removably coupled to said one remote player device and moveable between said remote player devices by said player, and said controller programmed to transfer operational control to one of said gaming servers further based on whether said one remote player device is in a permitted location.

14. A website server as defined in claim 13, wherein said controller is programmed to receive from an authentication server operatively coupled to said website server data indicative of whether said second biometric data obtained via said biometric device matches said first biometric data of a registered player; and wherein said controller is programmed to not transfer operational control to said one gaming server if said data indicative of whether said second biometric data obtained via said biometric device matches said first biometric data of a registered player indicates that said second biometric data obtained via said biometric device does not match said first biometric data of a registered player.

15. A website server as defined in claim 13, wherein said controller is programmed to receive from said from said one remote player device data indicative of whether said second biometric data obtained via said biometric device matches said first biometric data of a registered player; and wherein said controller is programmed to not transfer operational control to said one gaming server if said data indicative of whether said second biometric data obtained via said biometric device matches said first biometric data of a registered player indicates that said second biometric data obtained via said biometric device does not match said first biometric data of a registered player.

16. A website server as defined in claim 13, wherein said controller is programmed to receive from said one remote player device data indicative of a location of said one remote player device.

17. A website server as defined in claim 13, wherein said biometric device comprises at least one of a fingerprint scanner, an eye scanner, a microphone coupled to a digital-to-analog converter, a camera.

18. A website server as defined in claim 13, wherein said controller is programmed to transfer operational control to a first gaming server if said game selection is for a single-hand poker game and to transfer operational control to a second gaming server if said game selection is for a multi-hand poker game.

19. A website server as defined in claim 13, wherein said controller is programmed to transfer operational control to a first gaming server if said game selection is for a first type of game and to transfer operational control to a second gaming server if said game selection is for a second type of game.

20. A website server as defined in claim 13, wherein said controller is programmed to select logon display data and to cause said logon display data to be transmitted to one of said remote player devices via said network when said one remote player device is operatively coupled to said website server; and wherein said controller is programmed to cause logon data received from said one remote player device to be stored in memory.

21. A website server as defined in claim 14, wherein said controller is programmed to receive from said one remote player device said second biometric data obtained via said biometric device; and wherein said controller is programmed to transmit said second biometric data obtained via said biometric device to said authentication server.

22. A website server as defined in claim 14, wherein said controller is programmed to receive from said authentication server data indicative of whether said one remote player device is in a permitted location.

23. A website server as defined in claim 22, wherein said controller is programmed to receive from said one remote player device said data indicative of a location of said one remote player device; and wherein said controller is programmed to transmit said data indicative of said location of said one remote player device to said authentication server.

24. A method of operating a website computing apparatus, comprising:

transmitting logon display data from said website computing apparatus to a remote player device via a network;

receiving player logon data from said remote player device via the network;

receiving first biometric data of a player to be registered via a registration unit located in a controlled environment;

transmitting data representing a game selection display to said remote player device via the network prior to the transfer of operational control to a gaming server, said game selection display comprising a first image representing a first game and a second image representing a second game;

determining a game selection of a player at said remote player device prior to the transfer of operational control to a gaming server, said game election indicating one game of said plurality of games;

transferring operational control to a gaming server of a plurality of gaming servers based on said game selection and based on a comparison of second biometric data obtained via a biometric device coupled to said remote player device to said first biometric data, said one gaming server configured to facilitate play of said one game, said biometric device being integrated with a button for making a game play selection within said one game such that operation of the button provides a single message, wherein said single message automatically includes said second biometric data and automatically does not include said game play selection in response to being able to determine said game play selection based on a context provided by said game, and wherein second biometric data comprises multiple scans of a biometric feature averaged into a composite scan;

determining whether said one remote player device is in a permitted location based on a location determination made by a portable location determination device removably coupled to said remote player device and moveable to other remote player devices by said player; and transferring operational control to one of said gaming servers further based on whether said one remote player device is in a permitted location.

25. A method as defined in claim 24, further comprising receiving from an authentication server operatively coupled to said website server data indicative of whether said second biometric data obtained via said biometric device matches said first biometric data of a registered player; and wherein transferring operational control to said one gaming server comprises not transferring operational control to said one gaming server if said data indicative of whether said second biometric data obtained via said biometric device matches said first biometric data of the registered player indicates that said second biometric data obtained via said biometric device does not match said first biometric data of a registered player.

26. A method as defined in claim 24, further comprising:

receiving data indicative of whether said remote player device is in a permitted location.

27. A method as defined in claim 24, receiving from said from said remote player device data indicative of whether said second biometric data obtained via said biometric device matches said first biometric data of the registered player.

28. A method as defined in claim 24, further comprising:

receiving from said remote player device data indicative of a location of said remote player device.

29. A method as defined in claim 24, wherein said biometric device comprises at least one of a fingerprint scanner, an eye scanner, a microphone coupled to a digital-to-analog converter, a camera.

30. A method as defined in claim 24, wherein transferring operational control to said one gaming server comprises:

transferring operational control to a first gaming server of said plurality of gaming servers if said game selection is for a single-hand poker game; and transferring operational control to a second gaming server of said plurality of gaming servers if said game selection is for a multi-hand poker game.

31. A method as defined in claim 24, wherein transferring operational control to said one gaming server comprises:

transferring operational control to a first gaming server of said plurality of gaming servers if said game selection is for a first type of game; and transferring operational control to a second gaming server of said plurality of gaming servers if said game selection is for a second type of game.

32. A method as defined in claim 24, further comprising:

transmitting logon data to said remote player device via said network;

receiving logon data from said remote player device via said network; and causing logon data received from said remote player device to be stored in memory.

33. A method as defined in claim 25, further comprising:

receiving from said remote player device said first biometric data obtained via said biometric device; and transmitting said first biometric data obtained via said biometric device to said authentication server.

34. A method as defined in claim 25, further comprising:

receiving from said remote player device data indicative of a location of said remote player device; and transmitting said data indicative of said location of said remote player device to said authentication server.

* * * * *